(12) United States Patent
Chen et al.

(10) Patent No.: US 10,553,091 B2
(45) Date of Patent: Feb. 4, 2020

(54) METHODS AND SYSTEMS FOR SHAPE ADAPTATION FOR MERGED OBJECTS IN VIDEO ANALYTICS

(71) Applicant: QUALCOMM Incorporated, San Diego, CA (US)

(72) Inventors: Ying Chen, San Diego, CA (US); Ning Bi, San Diego, CA (US); Yang Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 15/655,065

(22) Filed: Jul. 20, 2017

(65) Prior Publication Data

US 2018/0286199 A1 Oct. 4, 2018

Related U.S. Application Data

(60) Provisional application No. 62/479,922, filed on Mar. 31, 2017.

(51) Int. Cl.
*G06K 9/00* (2006.01)
*G08B 13/196* (2006.01)
(Continued)

(52) U.S. Cl.
CPC ... *G08B 13/19608* (2013.01); *G06K 9/00744* (2013.01); *G06K 9/00771* (2013.01); *G06K 9/342* (2013.01); *G06K 9/38* (2013.01); *G06K 9/4638* (2013.01); *G06K 9/48* (2013.01); *G06K 9/6201* (2013.01); *G06K 9/6277* (2013.01); *G06K 9/68* (2013.01); *G06T 7/215* (2017.01); *G06T 7/251* (2017.01); *G06T 7/254* (2017.01);
(Continued)

(58) Field of Classification Search
CPC combination set(s) only.
See application file for complete search history.

(56) References Cited

U.S. PATENT DOCUMENTS

| 6,031,935 A | * | 2/2000 | Kimmel | G06K 9/48 382/170 |
| 6,335,985 B1 | * | 1/2002 | Sambonsugi | G06K 9/3241 382/190 |

(Continued)

*Primary Examiner* — Vu Le
*Assistant Examiner* — Guillermo M Rivera-Martinez
(74) *Attorney, Agent, or Firm* — Qualcomm Incorporated

(57) ABSTRACT

Methods, apparatuses, and computer-readable media are provided for splitting one or more merged blobs for one or more video frames. For example, a merged blob detected for a current video frame is identified. The merged blob includes pixels of at least a portion of at least two foreground objects in the current video frame. The merged blob is associated with a first blob tracker and a second blob tracker. A shape of the first blob tracker can be adjusted. For instance, adjusting the shape of the first blob tracker can include shifting at least one boundary of a bounding region of the first blob tracker based on the shape of the merged blob. The merged blob can be split into a first blob and a second blob, with the first blob being associated with the adjusted bounding region of the first blob tracker and the second blob being associated with a bounding region of the a second blob tracker. The first blob and the second blob can then be output for object tracking for the current video frame.

30 Claims, 32 Drawing Sheets

(51) Int. Cl.
*G06T 7/215* (2017.01)
*G06T 7/246* (2017.01)
*G06K 9/34* (2006.01)
*G06K 9/68* (2006.01)
*G06K 9/38* (2006.01)
*G06T 7/277* (2017.01)
*G06K 9/62* (2006.01)
*G06K 9/46* (2006.01)
*G06K 9/48* (2006.01)
*G06T 7/254* (2017.01)
*G06K 9/32* (2006.01)

(52) U.S. Cl.
CPC ........ *G06T 7/277* (2017.01); *G08B 13/19604* (2013.01); *G06K 2009/00738* (2013.01); *G06K 2009/3291* (2013.01); *G06T 2207/10016* (2013.01); *G06T 2207/20036* (2013.01); *G06T 2207/30201* (2013.01); *G06T 2207/30232* (2013.01)

(56) References Cited

U.S. PATENT DOCUMENTS

| | | | |
|---|---|---|---|
| 6,400,846 B1 | 6/2002 | Lin et al. | |
| 7,095,786 B1 | 8/2006 | Schonfeld et al. | |
| 8,253,802 B1* | 8/2012 | Anderson | G06T 7/149 |
| | | | 348/169 |
| 8,284,258 B1* | 10/2012 | Cetin | H04N 7/183 |
| | | | 348/169 |
| 9,213,904 B1* | 12/2015 | Maali | G06T 7/60 |
| 9,390,506 B1* | 7/2016 | Asvatha Narayanan | |
| | | | G06T 7/194 |
| 2006/0257048 A1* | 11/2006 | Lin | G06K 9/00711 |
| | | | 382/276 |
| 2007/0058836 A1* | 3/2007 | Boregowda | G06K 9/00771 |
| | | | 382/103 |
| 2007/0071100 A1 | 3/2007 | Shi et al. | |
| 2007/0127774 A1* | 6/2007 | Zhang | G06K 9/00771 |
| | | | 382/103 |
| 2008/0181453 A1 | 7/2008 | Xu et al. | |
| 2010/0027846 A1* | 2/2010 | Xu | G06K 9/00335 |
| | | | 382/107 |
| 2010/0027892 A1* | 2/2010 | Guan | G06K 9/00355 |
| | | | 382/203 |
| 2010/0201820 A1* | 8/2010 | Lopota | G08B 13/1961 |
| | | | 348/152 |
| 2014/0079297 A1* | 3/2014 | Tadayon | G06K 9/00 |
| | | | 382/118 |
| 2014/0195138 A1* | 7/2014 | Stelzig | G08G 1/0116 |
| | | | 701/119 |
| 2015/0063651 A1* | 3/2015 | Ishihara | G06K 9/48 |
| | | | 382/110 |
| 2017/0039765 A1* | 2/2017 | Zhou | G06T 19/006 |
| 2017/0083790 A1* | 3/2017 | Risinger | G06T 1/20 |

* cited by examiner

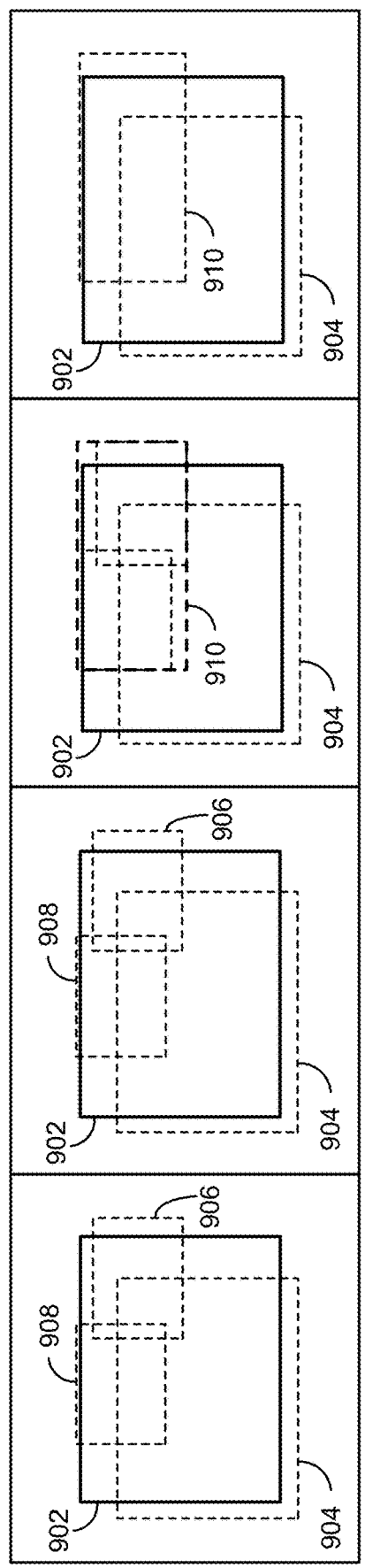

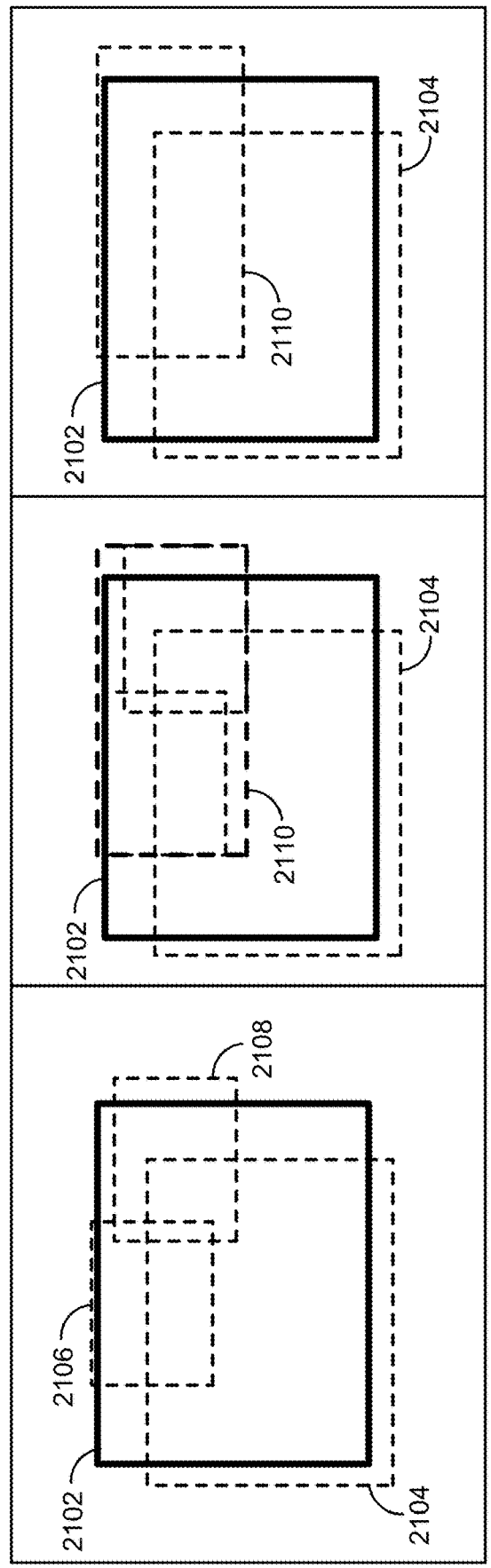

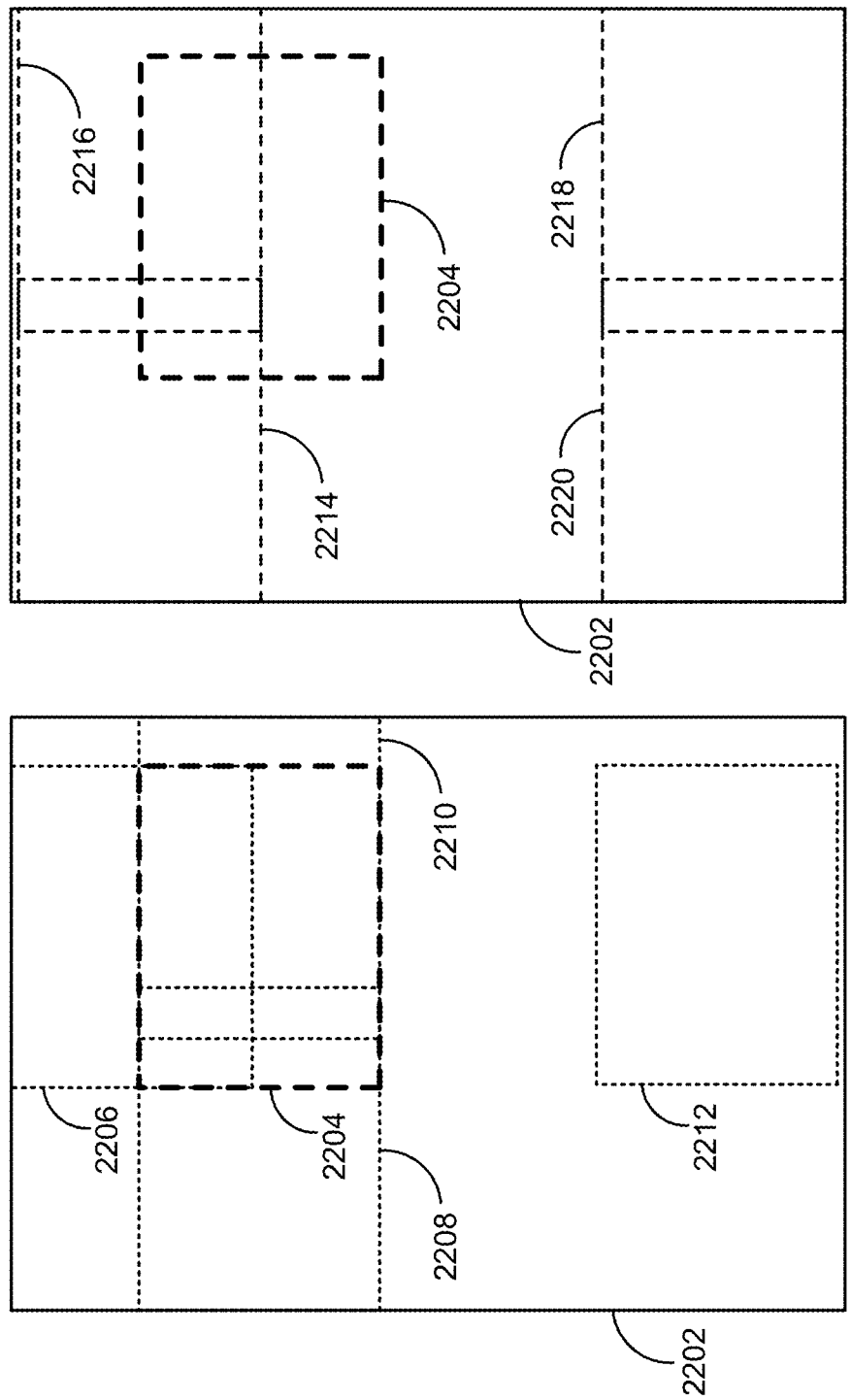

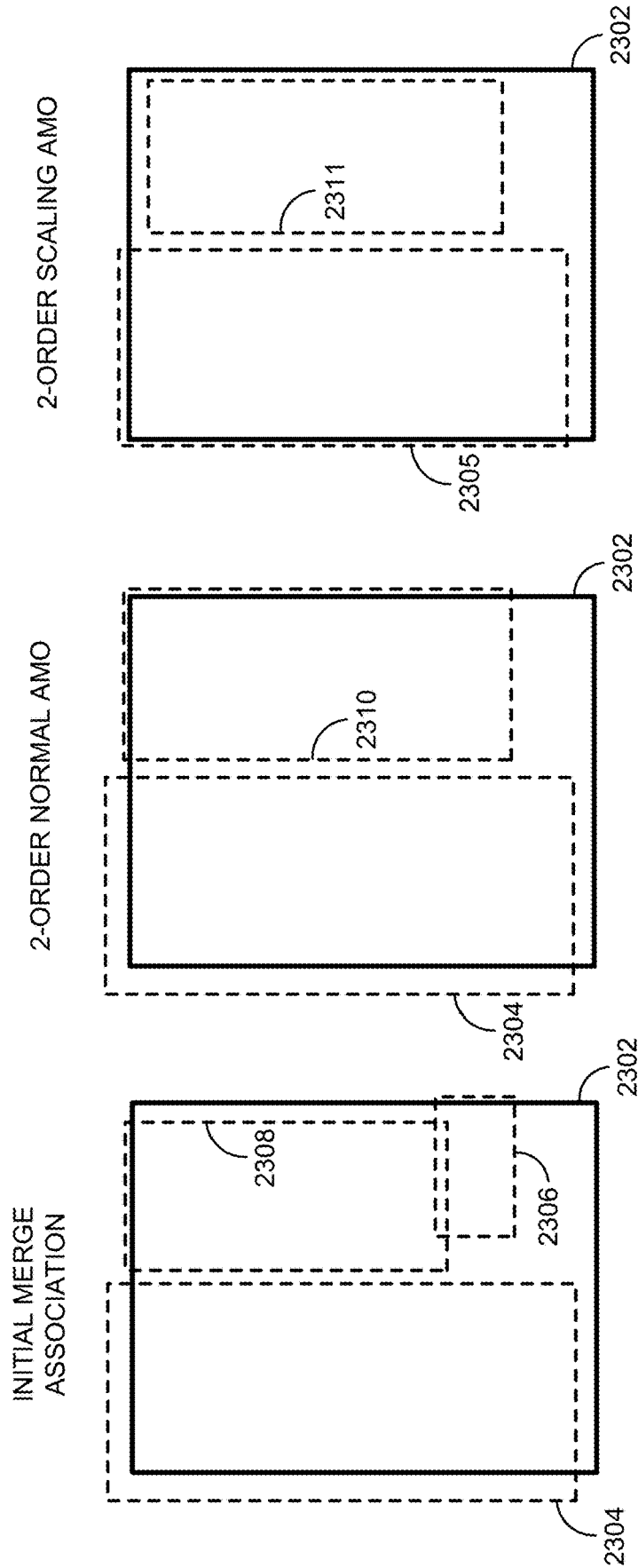

2400

IDENTIFY A MERGED BLOB DETECTED FOR A CURRENT VIDEO FRAME, WHEREIN THE MERGED BLOB INCLUDES PIXELS OF AT LEAST A PORTION OF AT LEAST TWO FOREGROUND OBJECTS IN THE CURRENT VIDEO FRAME
2402

ASSOCIATE THE MERGED BLOB WITH A FIRST BLOB TRACKER AND A SECOND BLOB TRACKER
2404

ADJUST A SHAPE OF THE FIRST BLOB TRACKER, WHEREIN ADJUSTING THE SHAPE OF THE FIRST BLOB TRACKER INCLUDES SHIFTING AT LEAST ONE BOUNDARY OF A BOUNDING REGION OF THE FIRST BLOB TRACKER BASED ON THE SHAPE OF THE MERGED BLOB
2406

SPLIT THE MERGED BLOB INTO A FIRST BLOB AND A SECOND BLOB, THE FIRST BLOB BEING ASSOCIATED WITH THE ADJUSTED BOUNDING REGION OF THE FIRST BLOB TRACKER AND THE SECOND BLOB BEING ASSOCIATED WITH A BOUNDING REGION OF THE SECOND BLOB TRACKER
2408

OUTPUT THE FIRST BLOB AND THE SECOND BLOB FOR OBJECT TRACKING FOR THE CURRENT VIDEO FRAME
2410

FIG. 24

METHODS AND SYSTEMS FOR SHAPE ADAPTATION FOR MERGED OBJECTS IN VIDEO ANALYTICS

CROSS-REFERENCE TO RELATED APPLICATIONS

This application claims the benefit of U.S. Provisional Application No. 62/479,922, filed Mar. 31, 2017, which is hereby incorporated by reference, in its entirety.

FIELD

The present disclosure generally relates to video analytics, and more specifically to techniques and systems for performing shape adaptation of merged objects using video analytics.

BACKGROUND

Many devices and systems allow a scene to be captured by generating video data of the scene. For example, an Internet protocol camera (IP camera) is a type of digital video camera that can be employed for surveillance or other applications. Unlike analog closed circuit television (CCTV) cameras, an IP camera can send and receive data via a computer network and the Internet. The video data from these devices and systems can be captured and output for processing and/or consumption.

Video analytics, also referred to as Video Content Analysis (VCA), is a generic term used to describe computerized processing and analysis of a video sequence acquired by a camera. Video analytics provides a variety of tasks, including immediate detection of events of interest, analysis of pre-recorded video for the purpose of extracting events in a long period of time, and many other tasks. For instance, using video analytics, a system can automatically analyze the video sequences from one or more cameras to detect one or more events. In some cases, video analytics can send alerts or alarms for certain events of interest. More advanced video analytics is needed to provide efficient and robust video sequence processing.

BRIEF SUMMARY

In some embodiments, techniques and systems are described for performing shape adaptation of merged objects using video analytics. Video analytics is based on background subtraction to detect and track motion objects. Such a video analytics system can contain a blob (or object) detection component and a blob (or object) tracking component. The blob detection component can use data from one or more video frames to generate or identify blobs for the one or more video frames. A blob represents at least a portion of one or more objects in a video frame (also referred to as a "picture"). Blob detection can utilize background subtraction to determine a background portion of a scene and a foreground portion of scene. Blobs can then be detected based on the foreground portion of the scene. The detected blobs can be provided, for example, for blob processing, object tracking by the blob (or object) tracking component, and other video analytics functions. For example, temporal information of the blobs can be used to identify stable objects or blobs so that a tracking layer can be established.

In some cases, tracked objects can move close together for a certain amount of time. For example, two people may walk toward each other and have a conversation. When objects become close enough, the blob detection component may detect a single blob for some or all of the objects. Multiple objects that are detected as a single blob are referred to as merged objects (e.g., two objects being merged together into one blob). Blob trackers associated with the merged objects are also merged in such cases, and are referred to as merged trackers. The accuracy of the entire tracking system drops whenever such a merge happens. In addition, a conventional object tracking system may not be accurate enough to re-identify the merged trackers even after the associated objects split apart in the future (e.g., the two people walk away from one another).

Preventing blob trackers from being merged can significantly improve the video analytics system. For example, techniques can be used to split merged blobs detected for a current frame before blobs (and the objects represented by the blobs) are tracked for the current frame by the tracking system. However, there are sensitive scenarios that make splitting of merged objects more difficult. For example, when the sizes of objects are relatively small, even small blob detection errors and/or noise can cause relatively significant size changes of the bounding box region corresponding to an object. In another example, one of the merged objects may become relatively still, causing, in a very short period of time, the object's corresponding background region to become smaller, and thus its corresponding foreground area size will change significantly. In another example, when merged objects start to overlap with other objects, it is critical to maintain a relatively more accurate bounding box size to avoid merging the objects together.

The techniques and systems described herein adapt to the sizes of merged objects more aggressively under the sensitive scenarios, so that the objects merged into a merged blob under such situations can still be identified and tracked individually. For example, the techniques and systems can perform shape and/or position adaptation processes to adjust the shapes and/or positions of bounding boxes (or other bounding regions) associated with merged objects. The techniques and systems may apply on top of any other merge splitting techniques (splitting merged objects within a detected merged blob), such as those that allow access to the foreground-background mask. For example, the shape and/or position processes can modify the shape and/or position of bounding boxes associated with a merged blob, and the modified bounding boxes can be input to a blob splitting process that can determine whether to split the merged blob into two or more individual blobs (thus splitting merged objects). In some examples, the shape and position adaptation processes provide important enhancements for merged blob splitting techniques that assume merged objects (e.g., bounding boxes of the objects or the objects themselves) are rigid or aspect ratio invariant.

According to at least one example, a method of splitting one or more merged blobs for one or more video frames is provided. The method includes identifying a merged blob detected for a current video frame. The merged blob includes pixels of at least a portion of at least two foreground objects in the current video frame. The method further includes associating the merged blob with a first blob tracker and a second blob tracker. The method further includes adjusting a shape of the first blob tracker. Adjusting the shape of the first blob tracker includes shifting at least one boundary of a bounding region of the first blob tracker based on the shape of the merged blob. The method further includes splitting the merged blob into a first blob and a second blob. The first blob is associated with the adjusted bounding region of the first blob tracker and the second blob is associated with a bounding region of the second blob tracker. The method further includes outputting the first blob and the second blob for object tracking for the current video frame.

In another example, an apparatus is provided for splitting one or more merged blobs for one or more video frames. The apparatus includes a processor and a memory configured to store video data associated with one or more video frames. The processor is configured to and can identify a merged blob detected for a current video frame. The merged blob includes pixels of at least a portion of at least two foreground objects in the current video frame. The processor is configured to and can associate the merged blob with a first blob tracker and a second blob tracker. The processor is configured to and can adjust a shape of the first blob tracker. Adjusting the shape of the first blob tracker includes shifting at least one boundary of a bounding region of the first blob tracker based on the shape of the merged blob. The processor is configured to and can split the merged blob into a first blob and a second blob. The first blob is associated with the adjusted bounding region of the first blob tracker and the second blob is associated with a bounding region of the second blob tracker. The processor is configured to and can output the first blob and the second blob for object tracking for the current video frame.

In another example, non-transitory computer-readable medium having stored thereon instructions that, when executed by one or more processors, cause the one or more processor to: identify a merged blob detected for a current video frame, wherein the merged blob includes pixels of at least a portion of at least two foreground objects in the current video frame; associate the merged blob with a first blob tracker and a second blob tracker; adjust a shape of the first blob tracker, wherein adjusting the shape of the first blob tracker includes shifting at least one boundary of a bounding region of the first blob tracker based on the shape of the merged blob; split the merged blob into a first blob and a second blob, the first blob being associated with the adjusted bounding region of the first blob tracker and the second blob being associated with a bounding region of the second blob tracker; and output the first blob and the second blob for object tracking for the current video frame.

In another example, an apparatus is provided for splitting one or more merged blobs for one or more video frames. The apparatus includes means for identifying a merged blob detected for a current video frame. The merged blob includes pixels of at least a portion of at least two foreground objects in the current video frame. The apparatus further includes means for associating the merged blob with a first blob tracker and a second blob tracker. The apparatus further includes means for adjusting a shape of the first blob tracker. Adjusting the shape of the first blob tracker includes shifting at least one boundary of a bounding region of the first blob tracker based on the shape of the merged blob. The apparatus further includes means for splitting the merged blob into a first blob and a second blob. The first blob is associated with the adjusted bounding region of the first blob tracker and the second blob is associated with a bounding region of the second blob tracker. The apparatus further includes means for outputting the first blob and the second blob for object tracking for the current video frame.

In some aspects, the first blob tracker and the second blob tracker are received from an object tracking operation performed for a previous video frame.

In some aspects, adjusting the shape of the first blob tracker includes shifting the at least one boundary of the bounding region of the first blob tracker towards a center of the bounding region of the first blob tracker, wherein the at least one boundary is shifted until the at least one boundary intersects with a foreground pixel of the merged blob.

In some aspects, adjusting the shape of the first blob tracker includes performing a first shape adjustment by shifting at least one boundary pair of the first blob tracker towards a center of the bounding region of the first blob tracker. In such aspects, the at least one boundary pair includes the at least one boundary. Also in such aspects, the at least one boundary pair is shifted until one or more boundaries of the at least one boundary pair intersect with a foreground pixel of the merged blob.

In some aspects, the methods, apparatuses, and computer readable medium described above further comprise: maintaining a list of historical merge groups, the historical merge groups including associations between merged blobs and blob trackers associated with the merged blobs across one or more previous video frames; searching the maintained list of historical merge groups to identify a historical merge group that corresponds to a preliminary association of the merged blob, the preliminary association including at least the bounding region of the first blob tracker associated with the merged blob and the bounding region of the second blob tracker associated with the merged blob; and performing the first shape adjustment when a historical merge group corresponding to the preliminary association of the merged blob is not identified.

In some aspects, the at least one boundary pair of the first blob tracker includes at least one or more of a left boundary and a right boundary of the bounding region of the first blob tracker or a top boundary and a bottom boundary of the bounding region of the first blob tracker.

In some aspects, the methods, apparatuses, and computer readable medium described above further comprise: determining, before the shape of the first blob tracker is adjusted, a first boundary and a second boundary of the at least one boundary pair do not intersect with any foreground pixel of the merged blob. In such aspects, shifting the at least one boundary pair includes shifting the first boundary and the second boundary towards the center of the bounding region of the first blob tracker when the first boundary and the second boundary do not intersect with any foreground pixel of the merged blob before the shape of the first blob tracker is adjusted.

In some aspects, the methods, apparatuses, and computer readable medium described above further comprise: determining, before the shape of the first blob tracker is adjusted, a first boundary of the at least one boundary pair intersects with a foreground pixel of the merged blob; and determining, before the shape of the first blob tracker is adjusted, a second boundary of the at least one boundary pair does not intersect with any foreground pixel of the merged blob. In such aspects, shifting the at least one boundary pair includes shifting the second boundary towards the center of the bounding region of the first blob tracker when the first boundary intersects with the foreground pixel and the second boundary does not intersect with any foreground pixel of the merged blob before the shape of the first blob tracker is adjusted.

In some aspects, adjusting the shape of the first blob tracker associated with the merged blob further includes performing a second shape adjustment by individually shifting each boundary of the bounding region of the first blob tracker towards the center of the bounding region of the first blob tracker. In such aspects, each boundary is shifted until each boundary intersects with a foreground pixel of the merged blob.

In some aspects, the methods, apparatuses, and computer readable medium described above further comprise: determining the shape of the first blob tracker was adjusted in a previous video frame, the previous video frame being obtained earlier in time than the current video frame; and performing the second shape adjustment when the shape of the first blob tracker was adjusted in a previous video frame.

In some aspects, the methods, apparatuses, and computer readable medium described above further comprise: determining a size of the bounding region of the first blob tracker is less than a size threshold; and performing the second shape adjustment when the size of the bounding region of the first blob tracker is less than the size threshold.

In some aspects, the methods, apparatuses, and computer readable medium described above further comprise: determining a size ratio, the size ratio including a size of the bounding region of the first blob tracker over a size of a bounding region of the merged blob; determining the size ratio is less than a size ratio threshold; and performing the second shape adjustment when the size ratio is less than the size ratio threshold.

In some aspects, the methods, apparatuses, and computer readable medium described above further comprise: determining a size of the bounding region of the first blob tracker is less than a size threshold; determining a size ratio, the size ratio including a size of the bounding region of the first blob tracker over a size of a bounding region of the merged blob; determining the size ratio is less than a size ratio threshold; and performing the second shape adjustment when the size of the bounding region of the first blob tracker is less than the size threshold and when the size ratio is less than the size ratio threshold.

In some aspects, the methods, apparatuses, and computer readable medium described above further comprise: obtaining a background-foreground mask for the current frame, the background-foreground mask including a first value assigned to background pixels of the current frame and a second value assigned to foreground pixels of the current frame; and modifying the background-foreground mask by assigning a common value to each foreground pixel of the merged blob, wherein the common value is different than the first value and the second value. In some aspects, adjusting the shape of the first blob tracker includes shifting the at least one boundary of the bounding region of the first blob tracker towards a center of the bounding region of the first blob tracker. In such aspects, the at least one boundary is shifted until the at least one boundary intersects with a foreground pixel having the common value.

In some aspects, associating the merged blob with the first blob tracker and the second blob tracker includes: determining an intersection region between the bounding region of the first blob tracker and a bounding region of the merged blob; determining a size ratio, the size ratio including a size of the intersection region over a size of the bounding region of the merged blob; determining the size ratio is greater than a minimum size ratio; and determining the first blob tracker is associated with the merged blob when the size ratio is greater than the minimum size ratio.

In some aspects, the methods, apparatuses, and computer readable medium described above further comprise re-associating the merged blob with the first blob tracker and the second blob tracker after the shape of the first blob tracker is adjusted. The re-association is performed using a second size ratio that is less than the size ratio.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 9A-FIG. 9D are diagrams illustrating an example of an application of a blob splitting process to a blob associated with multiple tracker bounding boxes, in accordance with some examples.

FIG. 21A-FIG. 21C are diagrams illustrating an example of an application of an Area Movement Optimization (AMO) process performed during a blob splitting process for a blob associated with multiple tracker bounding boxes, in accordance with some examples.

FIG. 22A and FIG. 22B are diagrams illustrating examples of candidate bounding box locations for a bounding box associated with a merged blob, in accordance with some examples.

FIG. 23A-FIG. 23C are diagrams illustrating examples of inputs for normal AMO and scaling AMO processes, in accordance with some examples.

FIG. 24 is a flowchart illustrating an example of a process of adjusting one or more bounding boxes of one or more merged blobs, in accordance with some examples.

DETAILED DESCRIPTION

Figure 1:
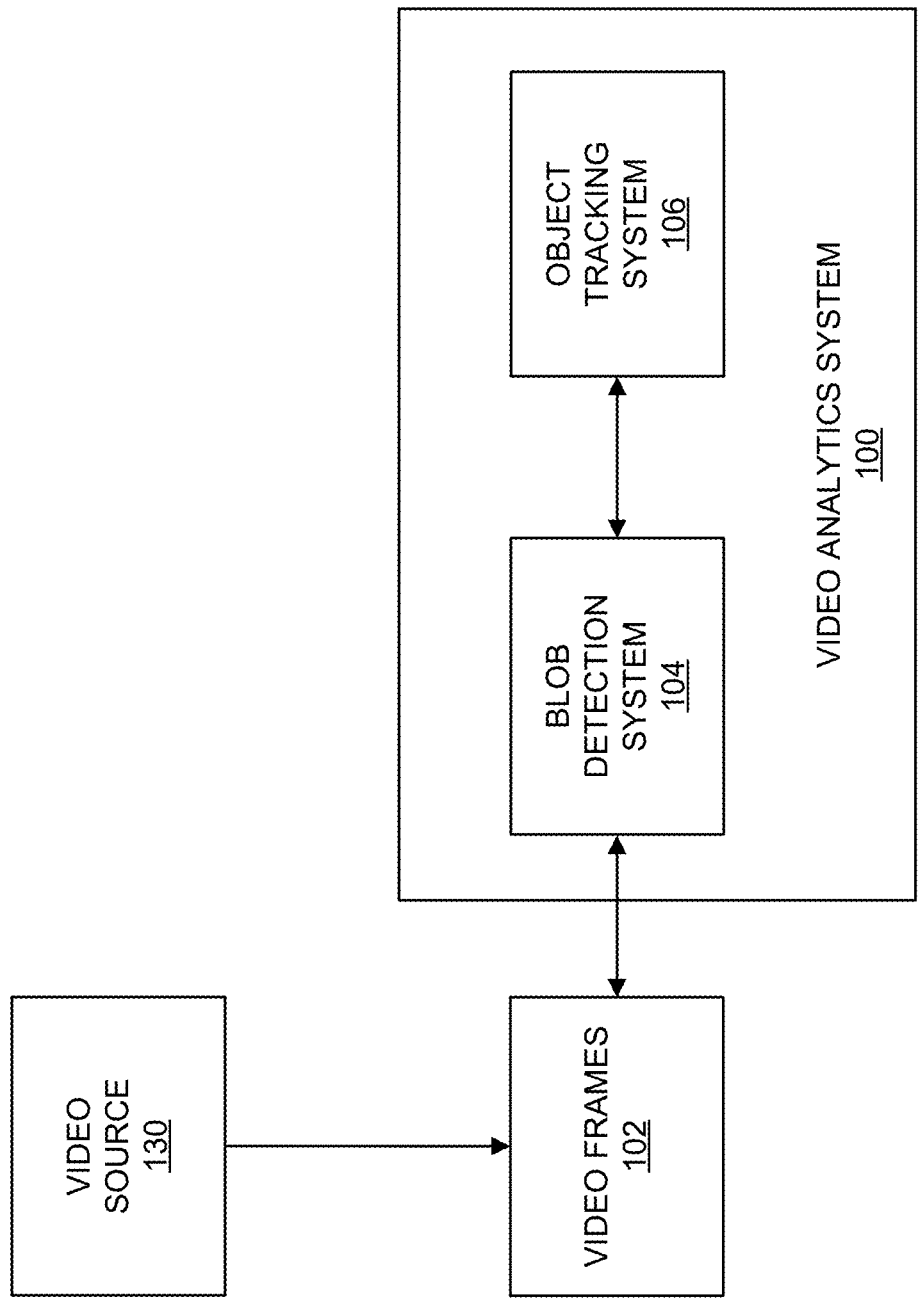
FIG. 1 is a block diagram illustrating an example of a system including a video source and a video analytics system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

A video analytics system can obtain a sequence of video frames from a video source and can process the video sequence to perform a variety of tasks. One example of a video source can include an Internet protocol camera (IP camera) or other video capture device. An IP camera is a type of digital video camera that can be used for surveillance, home security, or other suitable application. Unlike analog closed circuit television (CCTV) cameras, an IP camera can send and receive data via a computer network and the Internet. In some instances, one or more IP cameras can be located in a scene or an environment, and can remain static while capturing video sequences of the scene or environment.

An IP camera can be used to send and receive data via a computer network and the Internet. In some cases, IP camera systems can be used for two-way communications. For example, data (e.g., audio, video, metadata, or the like) can be transmitted by an IP camera using one or more network cables or using a wireless network, allowing users to communicate with what they are seeing. In one illustrative example, a gas station clerk can assist a customer with how to use a pay pump using video data provided from an IP camera (e.g., by viewing the customer's actions at the pay pump). Commands can also be transmitted for pan, tilt, zoom (PTZ) cameras via a single network or multiple networks. Furthermore, IP camera systems provide flexibility and wireless capabilities. For example, IP cameras provide for easy connection to a network, adjustable camera location, and remote accessibility to the service over Internet. IP camera systems also provide for distributed intelligence. For example, with IP cameras, video analytics can be placed in the camera itself. Encryption and authentication is also easily provided with IP cameras. For instance, IP cameras offer secure data transmission through already defined encryption and authentication methods for IP based applications. Even further, labor cost efficiency is increased with IP cameras. For example, video analytics can produce alarms for certain events, which reduces the labor cost in monitoring all cameras (based on the alarms) in a system.

Video analytics provides a variety of tasks ranging from immediate detection of events of interest, to analysis of pre-recorded video for the purpose of extracting events in a long period of time, as well as many other tasks. Various research studies and real-life experiences indicate that in a surveillance system, for example, a human operator typically cannot remain alert and attentive for more than 20 minutes, even when monitoring the pictures from one camera. When there are two or more cameras to monitor or as time goes beyond a certain period of time (e.g., 20 minutes), the operator's ability to monitor the video and effectively respond to events is significantly compromised. Video analytics can automatically analyze the video sequences from the cameras and send alarms for events of interest. This way, the human operator can monitor one or more scenes in a passive mode. Furthermore, video analytics can analyze a huge volume of recorded video and can extract specific video segments containing an event of interest.

Video analytics also provides various other features. For example, video analytics can operate as an Intelligent Video Motion Detector by detecting moving objects and by tracking moving objects. In some cases, the video analytics can generate and display a bounding box around a valid object. Video analytics can also act as an intrusion detector, a video counter (e.g., by counting people, objects, vehicles, or the like), a camera tamper detector, an object left detector, an object/asset removal detector, an asset protector, a loitering detector, and/or as a slip and fall detector. Video analytics can further be used to perform various types of recognition functions, such as face detection and recognition, license plate recognition, object recognition (e.g., bags, logos, body marks, or the like), or other recognition functions. In some cases, video analytics can be trained to recognize certain objects. Another function that can be performed by video analytics includes providing demographics for customer metrics (e.g., customer counts, gender, age, amount of time spent, and other suitable metrics). Video analytics can also perform video search (e.g., extracting basic activity for a given region) and video summary (e.g., extraction of the key movements). In some instances, event detection can be performed by video analytics, including detection of fire, smoke, fighting, crowd formation, or any other suitable even the video analytics is programmed to or learns to detect. A detector can trigger the detection of an event of interest and can send an alert or alarm to a central control room to alert a user of the event of interest.

As described in more detail herein, a blob detection component of a video analytics system can generate and/or detect foreground blobs that represent at least a portion of a foreground object in a scene. The detected blobs can be used to perform various operations, such as object tracking (also called blob tracking) or other operations described above. In some cases, objects in a scene move close together, causing the blob detection component to detect a single blob for some or all of the objects. Such objects are thus merged into the single blob and are called merged objects. The single blob is referred to as a merged blob (containing multiple merged objects). A merged blob is also referred to herein as a container blob, and the bounding box of a merged blob is also referred to herein as a container bounding box. The blob trackers associated with objects merged into a single blob (e.g., a first blob tracker associated with a first merged object and a second blob tracker associated with a second merged object) are also merged. Such a merging of objects and trackers leads to issues when attempting to track the merged objects during and after the merge. As described in more detail below, systems and methods are described for splitting merged objects resulting from blob detection before the detected blobs are output to the tracking component of the video analytics system. Systems and methods are also described for adjusting a shape of trackers being used to track merged objects.

FIG. 1 is a block diagram illustrating an example of a video analytics system 100. The video analytics system 100 receives video frames 102 from a video source 130. The video frames 102 can also be referred to herein as a video picture or a picture. The video frames 102 can be part of one or more video sequences. The video source 130 can include a video capture device (e.g., a video camera, a camera phone, a video phone, or other suitable capture device), a video storage device, a video archive containing stored video, a video server or content provider providing video data, a video feed interface receiving video from a video server or content provider, a computer graphics system for generating computer graphics video data, a combination of such sources, or other source of video content. In one example, the video source 130 can include an IP camera or multiple IP cameras. In an illustrative example, multiple IP cameras can be located throughout an environment, and can provide the video frames 102 to the video analytics system 100. For instance, the IP cameras can be placed at various fields of view within the environment so that surveillance can be performed based on the captured video frames 102 of the environment.

In some embodiments, the video analytics system 100 and the video source 130 can be part of the same computing device. In some embodiments, the video analytics system 100 and the video source 130 can be part of separate computing devices. In some examples, the computing device (or devices) can include one or more wireless transceivers for wireless communications. The computing device (or devices) can include an electronic device, such as a camera (e.g., an IP camera or other video camera, a camera phone, a video phone, or other suitable capture device), a mobile or stationary telephone handset (e.g., smartphone, cellular telephone, or the like), a desktop computer, a laptop or notebook computer, a tablet computer, a set-top box, a television, a display device, a digital media player, a video gaming console, a video streaming device, or any other suitable electronic device.

The video analytics system 100 includes a blob detection system 104 and an object tracking system 106. Object detection and tracking allows the video analytics system 100 to provide various end-to-end features, such as the video analytics features described above. For example, intelligent motion detection, intrusion detection, and other features can directly use the results from object detection and tracking to generate end-to-end events. Other features, such as people, vehicle, or other object counting and classification can be greatly simplified based on the results of object detection and tracking.

The blob detection system 104 can detect one or more blobs in video frames (e.g., video frames 102) of a video sequence, and the object tracking system 106 can track the one or more blobs across the frames of the video sequence. As used herein, a blob refers to foreground pixels of at least a portion of an object (e.g., a portion of an object or an entire object) in a video frame. For example, a blob can include a contiguous group of pixels making up at least a portion of a foreground object in a video frame. In another example, a blob can refer to a contiguous group of pixels making up at least a portion of a background object in a frame of image data. A blob can also be referred to as an object, a portion of an object, a blotch of pixels, a pixel patch, a cluster of pixels, a blot of pixels, a spot of pixels, a mass of pixels, or any other term referring to a group of pixels of an object or portion thereof. In some examples, a bounding region can be associated with a blob. In some examples, a tracker can also be represented by a tracker bounding region. A bounding region of a blob or tracker can include a bounding box, a bounding circle, a bounding ellipse, or any other suitably-shaped region representing a tracker or blob. While examples are described herein using bounding boxes for illustrative purposes, the techniques and systems described herein can also apply using other suitably shaped bounding regions. A bounding box associated with a tracker and/or a blob can have a rectangular shape, a square shape, or other suitable shape. In the tracking layer, in case there is no need to know how the blob is formulated within a bounding box, the term blob and bounding box may be used interchangeably.

As described in more detail below, blob detection can be performed to segment moving foreground objects from the global static background in a video sequence. In some cases, there are two major steps in blob detection, including background subtraction and blob analysis. For example, blob detection can contain a background subtraction engine that detects foreground pixels and one or more foreground pixel processing engines that process and group the foreground pixels into foreground blobs for tracking purposes. In some cases, background subtraction can be performed to provide a foreground/background mask (referred to herein as a foreground mask) of a current input frame (the current frame being processed), while the blob analysis takes the foreground mask and produces foreground blobs. The foreground blobs can be represented as bounding boxes (e.g., having a rectangular, square, or other suitable shape) or other bounding region. In some examples, the blob detection system 104 and object tracking system 106 take as input a current frame, and output the metadata of each current frame. The metadata contains a list of bounding boxes (e.g., bounding boxes of the blob trackers, bounding boxes of the detected foreground blobs, or the bounding boxes of the blob trackers and the detected foreground blobs), each with a bounding box identifier (ID). In some cases, the metadata is on a per frame basis, recording the results of the blob detection and tracking engines. Such metadata can be further interrupted, depending on the particular system configuration.

As described in more detail below, blobs can be tracked using blob trackers. A blob tracker can be associated with a tracker bounding box and can be assigned a tracker identifier (ID). In some examples, a bounding box for a blob tracker in a current frame can be the bounding box of a previous blob in a previous frame for which the blob tracker was associated. For instance, when the blob tracker is updated in the previous frame (after being associated with the previous blob in the previous frame), updated information for the blob tracker can include the tracking information for the previous frame and also prediction of a location of the blob tracker in the next frame (which is the current frame in this example). The prediction of the location of the blob tracker in the current frame can be based on the location of the blob in the previous frame. A history or motion model can be maintained for a blob tracker, including a history of various states, a history of the velocity, and a history of location, of continuous frames, for the blob tracker, as described in more detail below.

In some examples, a motion model for a blob tracker can determine and maintain two locations of the blob tracker for each frame. For example, a first location for a blob tracker for a current frame can include a predicted location in the current frame. The first location is referred to herein as the predicted location. The predicted location of the blob tracker in the current frame includes a location in a previous frame of a blob with which the blob tracker was associated. Hence, the location of the blob associated with the blob tracker in the previous frame can be used as the predicted location of the blob tracker in the current frame. A second location for the blob tracker for the current frame can include a location in the current frame of a blob with which the tracker is associated in the current frame. The second location is referred to herein as the actual location. Accordingly, the location in the current frame of a blob associated with the blob tracker is used as the actual location of the blob tracker in the current frame. The actual location of the blob tracker in the current frame can be used as the predicted location of the blob tracker in a next frame. The location of the blobs can include the locations of the bounding boxes of the blobs.

The velocity of a blob tracker can include the displacement of a blob tracker between consecutive frames. For example, the displacement can be determined between the centers (or centroids) of two bounding boxes for the blob tracker in two consecutive frames. In one illustrative example, the velocity of a blob tracker can be defined as $V_t = C_t - C_{t-1}$, where $C_t - C_{t-1} = (C_{tx} - C_{t-1x}, C_{ty} - C_{t-1y})$. The term $C_t(C_{tx}, C_{ty})$ denotes the center position of a bounding box of the tracker in a current frame, with $C_{tx}$ being the x-coordinate of the bounding box, and Cry being the y-coordinate of the bounding box. The term $C_{t-1}(C_{t-1x}, C_{t-1y})$ denotes the center position (x and y) of a bounding box of the tracker in a previous frame. In some implementations, it is also possible to use four parameters to estimate x, y, width, height at the same time. In some cases, because the timing for video frame data is constant or at least not dramatically different overtime (according to the frame rate, such as 30 frames per second, 60 frames per second, 120 frames per second, or other suitable frame rate), a time variable may not be needed in the velocity calculation. In some cases, a time constant can be used (according to the instant frame rate) and/or a timestamp can be used.

Using the blob detection system 104 and the object tracking system 106, the video analytics system 100 can perform blob generation and detection for each frame or picture of a video sequence. For example, the blob detection system 104 can perform background subtraction for a frame, and can then detect foreground pixels in the frame. Foreground blobs are generated from the foreground pixels using morphology operations and spatial analysis. Further, blob trackers from previous frames need to be associated with the foreground blobs in a current frame, and also need to be updated. Both the data association of trackers with blobs and tracker updates can rely on a cost function calculation. For example, when blobs are detected from a current input video frame, the blob trackers from the previous frame can be associated with the detected blobs according to a cost calculation. Trackers are then updated according to the data association, including updating the state and location of the trackers so that tracking of objects in the current frame can be fulfilled. Further details related to the blob detection system 104 and the object tracking system 106 are described with respect to FIGS. 3-4.

Figure 2:
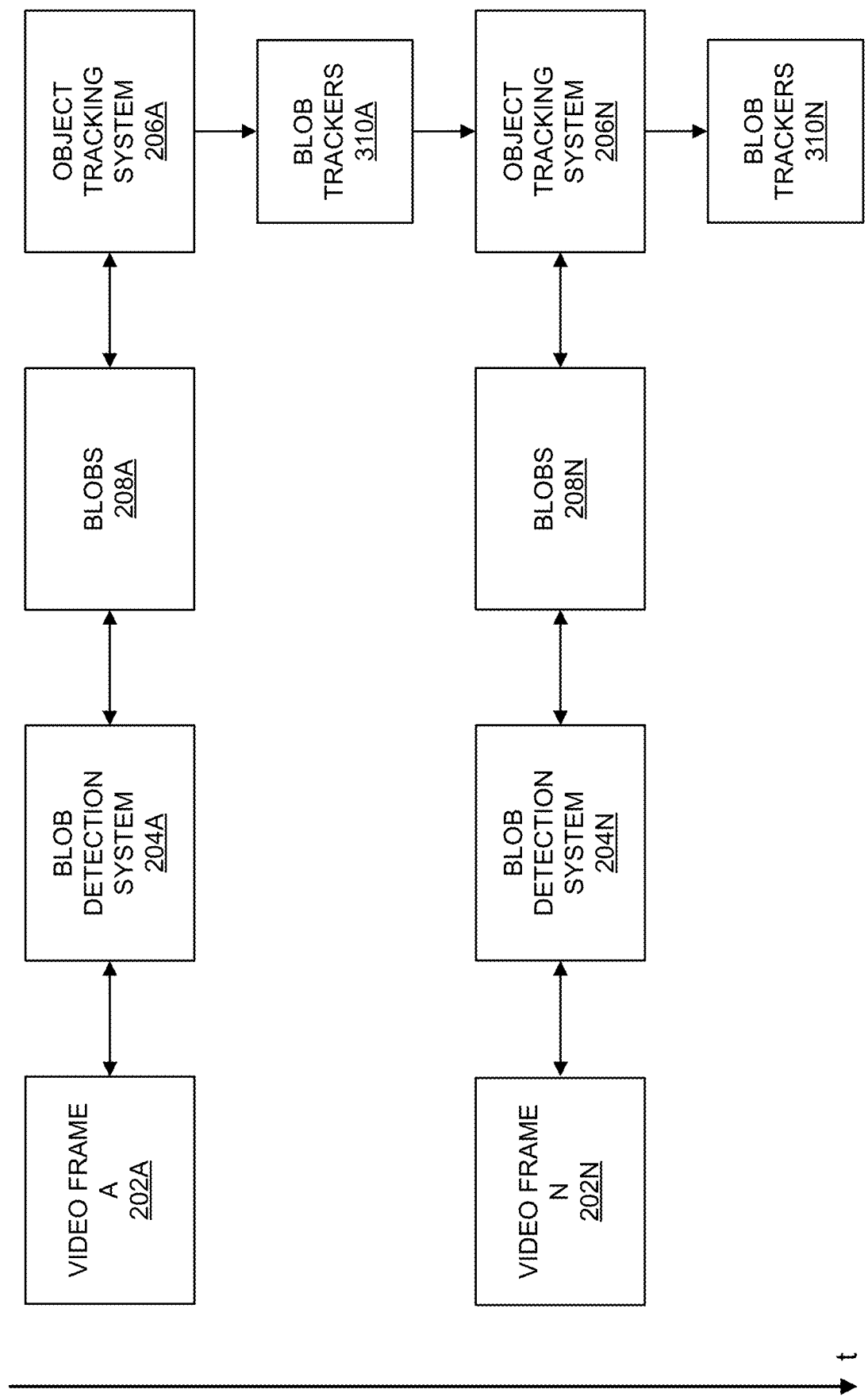
FIG. 2 is an example of a video analytics system processing video frames, in accordance with some examples.

FIG. 2 is an example of the video analytics system (e.g., video analytics system 100) processing video frames across time t. As shown in FIG. 2, a video frame A 202A is received by a blob detection system 204A. The blob detection system 204A generates foreground blobs 208A for the current frame A 202A. After blob detection is performed, the foreground blobs 208A can be used for temporal tracking by the object tracking system 206A. Costs (e.g., a cost including a distance, a weighted distance, or other cost) between blob trackers and blobs can be calculated by the object tracking system 206A. The object tracking system 206A can perform data association to associate or match the blob trackers (e.g., blob trackers generated or updated based on a previous frame or newly generated blob trackers) and blobs 208A using the calculated costs (e.g., using a cost matrix or other suitable association technique). The blob trackers can be updated, including in terms of positions of the trackers, according to the data association to generate updated blob trackers 310A. For example, a blob tracker's state and location for the video frame A 202A can be calculated and updated. The blob tracker's location in a next video frame N 202N can also be predicted from the current video frame A 202A. For example, the predicted location of a blob tracker for the next video frame N 202N can include the location of the blob tracker (and its associated blob) in the current video frame A 202A. Tracking of blobs of the current frame A 202A can be performed once the updated blob trackers 310A are generated.

When a next video frame N 202N is received, the blob detection system 204N generates foreground blobs 208N for the frame N 202N. The object tracking system 206N can then perform temporal tracking of the blobs 208N. For example, the object tracking system 206N obtains the blob trackers 310A that were updated based on the prior video frame A 202A. The object tracking system 206N can then calculate a cost and can associate the blob trackers 310A and the blobs 208N using the newly calculated cost. The blob trackers 310A can be updated according to the data association to generate updated blob trackers 310N.

Figure 3:
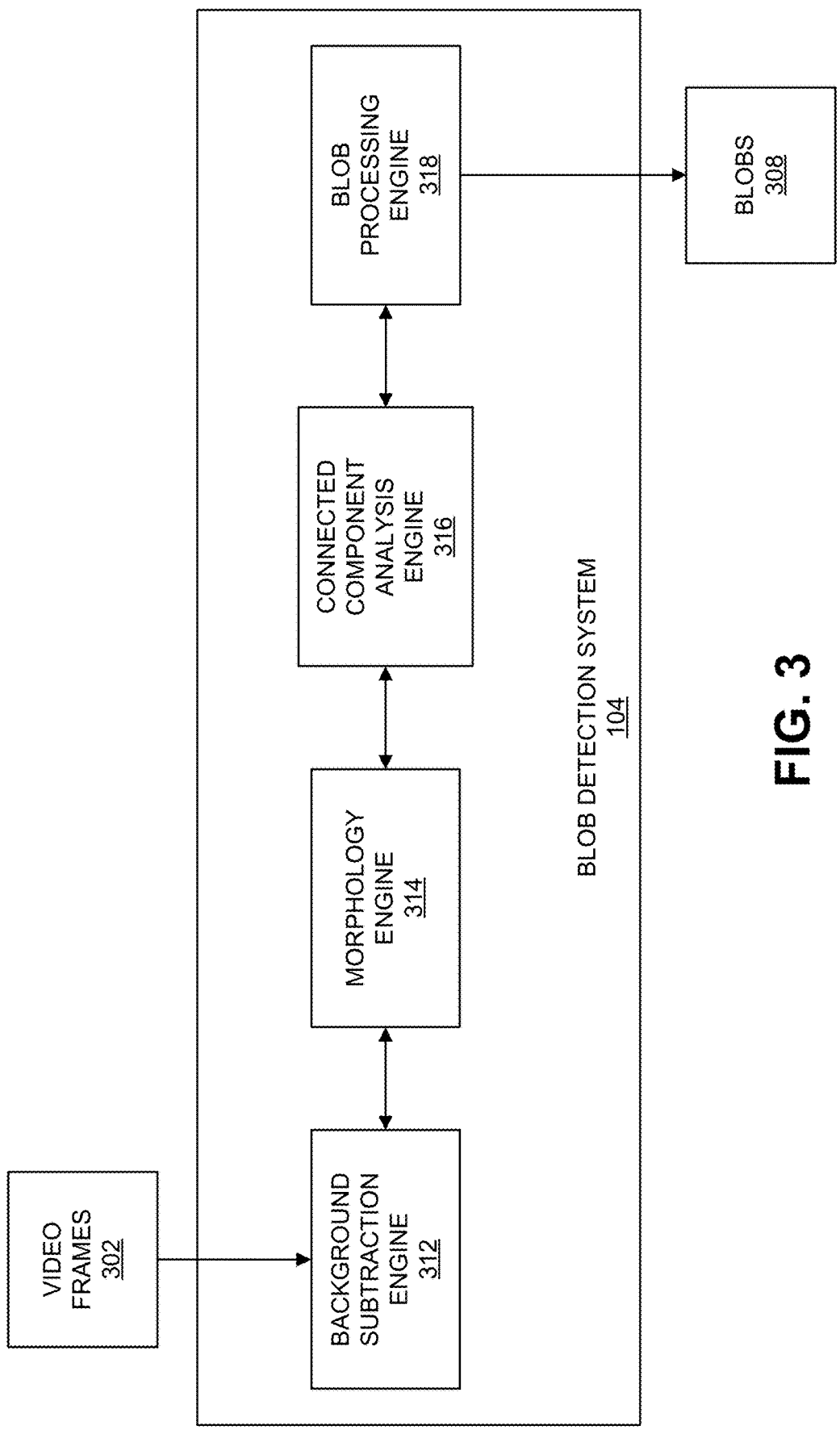
FIG. 3 is a block diagram illustrating an example of a blob detection system, in accordance with some examples.

FIG. 3 is a block diagram illustrating an example of a blob detection system 104. Blob detection is used to segment moving objects from the global background in a scene. The blob detection system 104 includes a background subtraction engine 312 that receives video frames 302. The background subtraction engine 312 can perform background subtraction to detect foreground pixels in one or more of the video frames 302. For example, the background subtraction can be used to segment moving objects from the global background in a video sequence and to generate a foreground-background binary mask (referred to herein as a foreground mask). In some examples, the background subtraction can perform a subtraction between a current frame or picture and a background model including the background part of a scene (e.g., the static or mostly static part of the scene). Based on the results of background subtraction, the morphology engine 314 and connected component analysis engine 316 can perform foreground pixel processing to group the foreground pixels into foreground blobs for tracking purpose. For example, after background subtraction, morphology operations can be applied to remove noisy pixels as well as to smooth the foreground mask. Connected component analysis can then be applied to generate the blobs. Blob processing can then be performed, which may include further filtering out some blobs and merging together some blobs to provide bounding boxes as input for tracking.

The background subtraction engine 312 can model the background of a scene (e.g., captured in the video sequence) using any suitable background subtraction technique (also referred to as background extraction). One example of a background subtraction method used by the background subtraction engine 312 includes modeling the background of the scene as a statistical model based on the relatively static pixels in previous frames which are not considered to belong to any moving region. For example, the background subtraction engine 312 can use a Gaussian distribution model for each pixel location, with parameters of mean and variance to model each pixel location in frames of a video sequence. All the values of previous pixels at a particular pixel location are used to calculate the mean and variance of the target Gaussian model for the pixel location. When a pixel at a given location in a new video frame is processed, its value will be evaluated by the current Gaussian distribution of this pixel location. A classification of the pixel to either a foreground pixel or a background pixel is done by comparing the difference between the pixel value and the mean of the designated Gaussian model. In one illustrative example, if the distance of the pixel value and the Gaussian Mean is less than 3 times of the variance, the pixel is classified as a background pixel. Otherwise, in this illustrative example, the pixel is classified as a foreground pixel. At the same time, the Gaussian model for a pixel location will be updated by taking into consideration the current pixel value.

The background subtraction engine 312 can also perform background subtraction using a mixture of Gaussians (also referred to as a Gaussian mixture model (GMM)). A GMM models each pixel as a mixture of Gaussians and uses an online learning algorithm to update the model. Each Gaussian model is represented with mean, standard deviation (or covariance matrix if the pixel has multiple channels), and weight. Weight represents the probability that the Gaussian occurs in the past history.

$$P(X_t) = \sum_{i=1}^{K} \omega_{i,t} N(X_t | \mu_{i,t}, \Sigma_{i,t}) \quad \text{Eq. (1)}$$

An equation of the GMM model is shown in equation (1), wherein there are K Gaussian models. Each Guassian model has a distribution with a mean of μ and variance of Σ, and has a weight ω. Here, i is the index to the Gaussian model and t is the time instance. As shown by the equation, the parameters of the GMM change over time after one frame (at time t) is processed. In GMM or any other learning based background subtraction, the current pixel impacts the whole model of the pixel location based on a learning rate, which could be constant or typically at least the same for each pixel location. A background subtraction method based on GMM (or other learning based background subtraction) adapts to local changes for each pixel. Thus, once a moving object stops, for each pixel location of the object, the same pixel value keeps on contributing to its associated background model heavily, and the region associated with the object becomes background.

The background subtraction techniques mentioned above are based on the assumption that the camera is mounted still, and if anytime the camera is moved or orientation of the camera is changed, a new background model will need to be calculated. There are also background subtraction methods that can handle foreground subtraction based on a moving background, including techniques such as tracking key points, optical flow, saliency, and other motion estimation based approaches.

The background subtraction engine 312 can generate a foreground mask with foreground pixels based on the result of background subtraction. For example, the foreground mask can include a binary image containing the pixels making up the foreground objects (e.g., moving objects) in a scene and the pixels of the background. In some examples, the background of the foreground mask (background pixels) can be a solid color, such as a solid white background, a solid black background, or other solid color. In such examples, the foreground pixels of the foreground mask can be a different color than that used for the background pixels, such as a solid black color, a solid white color, or other solid color. In one illustrative example, the background pixels can be black (e.g., pixel color value 0 in 8-bit grayscale or other suitable value) and the foreground pixels can be white (e.g., pixel color value 255 in 8-bit grayscale or other suitable value). In another illustrative example, the background pixels can be white and the foreground pixels can be black.

Using the foreground mask generated from background subtraction, a morphology engine 314 can perform morphology functions to filter the foreground pixels. The morphology functions can include erosion and dilation functions. In one example, an erosion function can be applied, followed by a series of one or more dilation functions. An erosion function can be applied to remove pixels on object boundaries. For example, the morphology engine 314 can apply an erosion function (e.g., FilterErode3×3) to a 3×3 filter window of a center pixel, which is currently being processed. The 3×3 window can be applied to each foreground pixel (as the center pixel) in the foreground mask. One of ordinary skill in the art will appreciate that other window sizes can be used other than a 3×3 window. The erosion function can include an erosion operation that sets a current foreground pixel in the foreground mask (acting as the center pixel) to a background pixel if one or more of its neighboring pixels within the 3×3 window are background pixels. Such an erosion operation can be referred to as a strong erosion operation or a single-neighbor erosion operation. Here, the neighboring pixels of the current center pixel include the eight pixels in the 3×3 window, with the ninth pixel being the current center pixel.

A dilation operation can be used to enhance the boundary of a foreground object. For example, the morphology engine 314 can apply a dilation function (e.g., FilterDilate3×3) to a 3×3 filter window of a center pixel. The 3×3 dilation window can be applied to each background pixel (as the center pixel) in the foreground mask. One of ordinary skill in the art will appreciate that other window sizes can be used other than a 3×3 window. The dilation function can include a dilation operation that sets a current background pixel in the foreground mask (acting as the center pixel) as a foreground pixel if one or more of its neighboring pixels in the 3×3 window are foreground pixels. The neighboring pixels of the current center pixel include the eight pixels in the 3×3 window, with the ninth pixel being the current center pixel. In some examples, multiple dilation functions can be applied after an erosion function is applied. In one illustrative example, three function calls of dilation of 3×3 window size can be applied to the foreground mask before it is sent to the connected component analysis engine 316. In some examples, an erosion function can be applied first to remove noise pixels, and a series of dilation functions can then be applied to refine the foreground pixels. In one illustrative example, one erosion function with 3×3 window size is called first, and three function calls of dilation of 3×3 window size are applied to the foreground mask before it is sent to the connected component analysis engine 316. Details regarding content-adaptive morphology operations are described below.

After the morphology operations are performed, the connected component analysis engine 316 can apply connected component analysis to connect neighboring foreground pixels to formulate connected components and blobs. In some implementation of connected component analysis, a set of bounding boxes are returned in a way that each bounding box contains one component of connected pixels. One example of the connected component analysis performed by the connected component analysis engine 316 is implemented as follows:

for each pixel of the foreground mask {
  if it is a foreground pixel and has not been processed, the
    following steps apply:
    Apply FloodFill function to connect this pixel to other
      foreground and generate a connected component
    Insert the connected component in a list of connected
      components.
    Mark the pixels in the connected component as being
      processed}

The Floodfill (seed fill) function is an algorithm that determines the area connected to a seed node in a multi-dimensional array (e.g., a 2-D image in this case). This Floodfill function first obtains the color or intensity value at the seed position (e.g., a foreground pixel) of the source foreground mask, and then finds all the neighbor pixels that have the same (or similar) value based on 4 or 8 connectivity. For example, in a 4 connectivity case, a current pixel's neighbors are defined as those with a coordination being (x+d, y) or (x, y+d), wherein d is equal to 1 or −1 and (x, y) is the current pixel. One of ordinary skill in the art will appreciate that other amounts of connectivity can be used. Some objects are separated into different connected components and some objects are grouped into the same connected components (e.g., neighbor pixels with the same or similar values). Additional processing may be applied to further process the connected components for grouping. Finally, the blobs 308 are generated that include neighboring foreground pixels according to the connected components. In one example, a blob can be made up of one connected component. In another example, a blob can include multiple connected components (e.g., when two or more blobs are merged together).

The blob processing engine 318 can perform additional processing to further process the blobs generated by the connected component analysis engine 316. In some examples, the blob processing engine 318 can generate the bounding boxes to represent the detected blobs and blob trackers. In some cases, the blob bounding boxes can be output from the blob detection system 104. In some examples, there may be a filtering process for the connected components (bounding boxes). For instance, the blob processing engine 318 can perform content-based filtering of certain blobs. In some cases, a machine learning method can determine that a current blob contains noise (e.g., foliage in a scene). Using the machine learning information, the blob processing engine 318 can determine the current blob is a noisy blob and can remove it from the resulting blobs that are provided to the object tracking system 106. In some cases, the blob processing engine 318 can filter out one or more small blobs that are below a certain size threshold (e.g., an area of a bounding box surrounding a blob is below an area threshold). In some examples, there may be a merging process to merge some connected components (represented as bounding boxes) into bigger bounding boxes. For instance, the blob processing engine 318 can merge close blobs into one big blob to remove the risk of having too many small blobs that could belong to one object. In some cases, two or more bounding boxes may be merged together based on certain rules even when the foreground pixels of the two bounding boxes are totally disconnected. In some embodiments, the blob detection system 104 does not include the blob processing engine 318, or does not use the blob processing engine 318 in some instances. For example, the blobs generated by the connected component analysis engine 316, without further processing, can be input to the object tracking system 106 to perform blob and/or object tracking.

In some implementations, density based blob area trimming may be performed by the blob processing engine 318. For example, when all blobs have been formulated after post-filtering and before the blobs are input into the tracking layer, the density based blob area trimming can be applied. A similar process is applied vertically and horizontally. For example, the density based blob area trimming can first be performed vertically and then horizontally, or vice versa. The purpose of density based blob area trimming is to filter out the columns (in the vertical process) and/or the rows (in the horizontal process) of a bounding box if the columns or rows only contain a small number of foreground pixels.

The vertical process includes calculating the number of foreground pixels of each column of a bounding box, and denoting the number of foreground pixels as the column density. Then, from the left-most column, columns are processed one by one. The column density of each current column (the column currently being processed) is compared with the maximum column density (the column density of all columns). If the column density of the current column is smaller than a threshold (e.g., a percentage of the maximum column density, such as 10%, 20%, 30%, 50%, or other suitable percentage), the column is removed from the bounding box and the next column is processed. However, once a current column has a column density that is not smaller than the threshold, such a process terminates and the remaining columns are not processed anymore. A similar process can then be applied from the right-most column. One of ordinary skill will appreciate that the vertical process can process the columns beginning with a different column than the left-most column, such as the right-most column or other suitable column in the bounding box.

The horizontal density based blob area trimming process is similar to the vertical process, except the rows of a bounding box are processed instead of columns. For example, the number of foreground pixels of each row of a bounding box is calculated, and is denoted as row density. From the top-most row, the rows are then processed one by one. For each current row (the row currently being processed), the row density is compared with the maximum row density (the row density of all the rows). If the row density of the current row is smaller than a threshold (e.g., a percentage of the maximum row density, such as 10%, 20%, 30%, 50%, or other suitable percentage), the row is removed from the bounding box and the next row is processed. However, once a current row has a row density that is not smaller than the threshold, such a process terminates and the remaining rows are not processed anymore. A similar process can then be applied from the bottom-most row. One of ordinary skill will appreciate that the horizontal process can process the rows beginning with a different row than the top-most row, such as the bottom-most row or other suitable row in the bounding box.

One purpose of the density based blob area trimming is for shadow removal. For example, the density based blob area trimming can be applied when one person is detected together with his or her long and thin shadow in one blob (bounding box). Such a shadow area can be removed after applying density based blob area trimming, since the column density in the shadow area is relatively small. Unlike morphology, which changes the thickness of a blob (besides filtering some isolated foreground pixels from formulating blobs) but roughly preserves the shape of a bounding box, such a density based blob area trimming method can dramatically change the shape of a bounding box.

Figure 4:
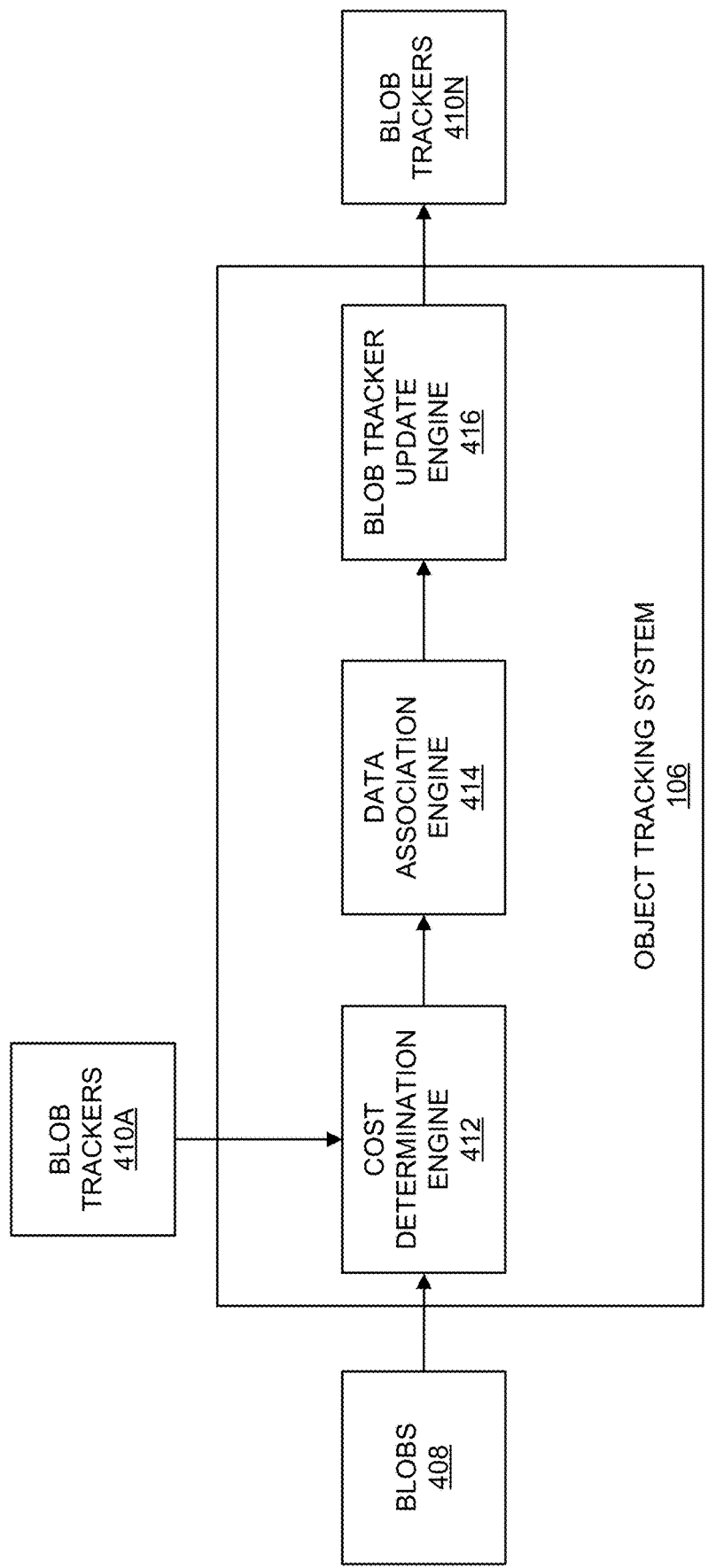
FIG. 4 is a block diagram illustrating an example of an object tracking system, in accordance with some examples.

Once the blobs are detected and processed, object tracking (also referred to as blob tracking) can be performed to track the detected blobs. FIG. 4 is a block diagram illustrating an example of an object tracking system 106. The input to the blob/object tracking is a list of the blobs 408 (e.g., the bounding boxes of the blobs) generated by the blob detection system 104. In some cases, a tracker is assigned with a unique ID, and a history of bounding boxes is kept. Object tracking in a video sequence can be used for many applications, including surveillance applications, among many others. For example, the ability to detect and track multiple objects in the same scene is of great interest in many security applications. When blobs (making up at least portions of objects) are detected from an input video frame, blob trackers from the previous video frame need to be associated to the blobs in the input video frame according to a cost calculation. The blob trackers can be updated based on the associated foreground blobs. In some instances, the steps in object tracking can be conducted in a series manner.

A cost determination engine 412 of the object tracking system 106 can obtain the blobs 408 of a current video frame from the blob detection system 104. The cost determination engine 412 can also obtain the blob trackers 410A updated from the previous video frame (e.g., video frame A 202A). A cost function can then be used to calculate costs between the blob trackers 410A and the blobs 408. Any suitable cost function can be used to calculate the costs. In some examples, the cost determination engine 412 can measure the cost between a blob tracker and a blob by calculating the Euclidean distance between the centroid of the tracker (e.g., the bounding box for the tracker) and the centroid of the bounding box of the foreground blob. In one illustrative example using a 2-D video sequence, this type of cost function is calculated as below:

$$\text{Cost}_{tb} = \sqrt{(t_x - b_x)^2 + (t_y - b_y)^2} \qquad \text{Eq. (2)}$$

The terms $(t_x, t_y)$ and $(b_x, b_y)$ are the center locations of the blob tracker and blob bounding boxes, respectively. As noted herein, in some examples, the bounding box of the blob tracker can be the bounding box of a blob associated with the blob tracker in a previous frame. In some examples, other cost function approaches can be performed that use a minimum distance in an x-direction or y-direction to calculate the cost. Such techniques can be good for certain controlled scenarios, such as well-aligned lane conveying. In some examples, a cost function can be based on a distance of a blob tracker and a blob, where instead of using the center position of the bounding boxes of blob and tracker to calculate distance, the boundaries of the bounding boxes are considered so that a negative distance is introduced when two bounding boxes are overlapped geometrically. In addition, the value of such a distance is further adjusted according to the size ratio of the two associated bounding boxes. For example, a cost can be weighted based on a ratio between the area of the blob tracker bounding box and the area of the blob bounding box (e.g., by multiplying the determined distance by the ratio).

In some embodiments, a cost is determined for each tracker-blob pair between each tracker and each blob. For example, if there are three trackers, including tracker A, tracker B, and tracker C, and three blobs, including blob A, blob B, and blob C, a separate cost between tracker A and each of the blobs A, B, and C can be determined, as well as separate costs between trackers B and C and each of the blobs A, B, and C. In some examples, the costs can be arranged in a cost matrix, which can be used for data association. For example, the cost matrix can be a 2-dimensional matrix, with one dimension being the blob trackers 410A and the second dimension being the blobs 408. Every tracker-blob pair or combination between the trackers 410A and the blobs 408 includes a cost that is included in the cost matrix. Best matches between the trackers 410A and blobs 408 can be determined by identifying the lowest cost tracker-blob pairs in the matrix. For example, the lowest cost between tracker A and the blobs A, B, and C is used to determine the blob with which to associate the tracker A.

Data association between trackers 410A and blobs 408, as well as updating of the trackers 410A, may be based on the determined costs. The data association engine 414 matches or assigns a tracker (or tracker bounding box) with a corresponding blob (or blob bounding box) and vice versa. For example, as described previously, the lowest cost tracker-blob pairs may be used by the data association engine 414 to associate the blob trackers 410A with the blobs 408. Another technique for associating blob trackers with blobs includes the Hungarian method, which is a combinatorial optimization algorithm that solves such an assignment problem in polynomial time and that anticipated later primal-dual methods. For example, the Hungarian method can optimize a global cost across all blob trackers 410A with the blobs 408 in order to minimize the global cost. The blob tracker-blob combinations in the cost matrix that minimize the global cost can be determined and used as the association.

In addition to the Hungarian method, other robust methods can be used to perform data association between blobs and blob trackers. For example, the association problem can be solved with additional constraints to make the solution more robust to noise while matching as many trackers and blobs as possible. Regardless of the association technique that is used, the data association engine 414 can rely on the distance between the blobs and trackers.

Once the association between the blob trackers 410A and blobs 408 has been completed, the blob tracker update engine 416 can use the information of the associated blobs, as well as the trackers' temporal statuses, to update the status (or states) of the trackers 410A for the current frame. Upon updating the trackers 410A, the blob tracker update engine 416 can perform object tracking using the updated trackers 410N, and can also provide the updated trackers 410N for use in processing a next frame.

The status or state of a blob tracker can include the tracker's identified location (or actual location) in a current frame and its predicted location in the next frame. The location of the foreground blobs are identified by the blob detection system 104. However, as described in more detail below, the location of a blob tracker in a current frame may need to be predicted based on information from a previous frame (e.g., using a location of a blob associated with the blob tracker in the previous frame). After the data association is performed for the current frame, the tracker location in the current frame can be identified as the location of its associated blob(s) in the current frame. The tracker's location can be further used to update the tracker's motion model and predict its location in the next frame. Further, in some cases, there may be trackers that are temporarily lost (e.g., when a blob the tracker was tracking is no longer detected), in which case the locations of such trackers also need to be predicted (e.g., by a Kalman filter). Such trackers are temporarily not shown to the system. Prediction of the bounding box location helps not only to maintain certain level of tracking for lost and/or merged bounding boxes, but also to give more accurate estimation of the initial position of the trackers so that the association of the bounding boxes and trackers can be made more precise.

As noted above, the location of a blob tracker in a current frame may be predicted based on information from a previous frame. One method for performing a tracker location update is using a Kalman filter. The Kalman filter is a framework that includes two steps. The first step is to predict a tracker's state, and the second step is to use measurements to correct or update the state. In this case, the tracker from the last frame predicts (using the blob tracker update engine 416) its location in the current frame, and when the current frame is received, the tracker first uses the measurement of the blob(s) to correct its location states and then predicts its location in the next frame. For example, a blob tracker can employ a Kalman filter to measure its trajectory as well as predict its future location(s). The Kalman filter relies on the measurement of the associated blob(s) to correct the motion model for the blob tracker and to predict the location of the object tracker in the next frame. In some examples, if a blob tracker is associated with a blob in a current frame, the location of the blob is directly used to correct the blob tracker's motion model in the Kalman filter. In some examples, if a blob tracker is not associated with any blob in a current frame, the blob tracker's location in the current frame is identified as its predicted location from the previous frame, meaning that the motion model for the blob tracker is not corrected and the prediction propagates with the blob tracker's last model (from the previous frame).

Other than the location of a tracker, the state or status of a tracker can also, or alternatively, include a tracker's temporal status. The temporal status can include whether the tracker is a new tracker that was not present before the current frame, whether the tracker has been alive for certain frames, or other suitable temporal status. Other states can include, additionally or alternatively, whether the tracker is considered as lost when it does not associate with any foreground blob in the current frame, whether the tracker is considered as a dead tracker if it fails to associate with any blobs for a certain number of consecutive frames (e.g., two or more), or other suitable tracker states.

There may be other status information needed for updating the tracker, which may require a state machine for object tracking. Given the information of the associated blob(s) and the tracker's own status history table, the status also needs to be updated. The state machine collects all the necessary information and updates the status accordingly. Various statuses can be updated. For example, other than a tracker's life status (e.g., new, lost, dead, or other suitable life status), the tracker's association confidence and relationship with other trackers can also be updated. Taking one example of the tracker relationship, when two objects (e.g., persons, vehicles, or other objects of interest) intersect, the two trackers associated with the two objects will be merged together for certain frames, and the merge or occlusion status needs to be recorded for high level video analytics.

Regardless of the tracking method being used, a new tracker starts to be associated with a blob in one frame and, moving forward, the new tracker may be connected with possibly moving blobs across multiple frames. When a tracker has been continuously associated with blobs and a duration (a threshold duration) has passed, the tracker may be promoted to be a normal tracker. A normal tracker is output as an identified tracker-blob pair. For example, a tracker-blob pair is output at the system level as an event (e.g., presented as a tracked object on a display, output as an alert, and/or other suitable event) when the tracker is promoted to be a normal tracker. In some implementations, a normal tracker (e.g., including certain status data of the normal tracker, the motion model for the normal tracker, or other information related to the normal tracker) can be output as part of object metadata. The metadata, including the normal tracker, can be output from the video analytics system (e.g., an IP camera running the video analytics system) to a server or other system storage. The metadata can then be analyzed for event detection (e.g., by rule interpreter). A tracker that is not promoted as a normal tracker can be removed (or killed), after which the tracker can be considered as dead.

As previously described, blob detection can be performed for one or more video frames capturing a scene to detect blobs representing one or more objects for the one or more video frames. The detected blobs can then be tracked by a tracking engine. In some cases, objects in the scene can move close together, in which case blob detection may detect a single blob for the objects. Multiple objects that are detected as a single blob are referred to as merged objects (e.g., two objects being merged together in a single blob). After blob analysis produces bounding boxes with one blob containing multiple merged objects, the tracking engine will try to match that single blob with existing trackers. Such a scenario can lead to a "merge" at the tracking level, in which case blob trackers (and the bounding boxes of the trackers) associated with the objects are merged together. For example, a merge may occur between a first blob tracker associated with a first object merged into the single blob and a second blob tracker associated with a second merged object merged into the single blob. The "merge" status of the multiple merged objects will continue until at least two of the objects are separated enough so that blob detection detects one of the cars individually. A split occurs when merged objects are later detected as individual objects. In one illustrative example, a single blob may be detected for two people that are walking closely together, and the individual trackers previously tracking the blobs for the two people are merged together. The merged blob may later be split into two or more blobs when the two people start walking in different directions, due to two separate blobs being detected for the two people by blob detection. This type of split that based on positions of objects in the scene is a different type of split than the merged blob splitting techniques described herein. As described in more detail below, the blob splitting (or object splitting) techniques described herein operate to split a merged blob bounding box (containing multiple objects) before the blob bounding box is output to the tracking engine.

A blob splitting technique that splits merged objects without considering and possibly adjusting a shape, size, and/or position of bounding boxes for the merged objects can work well for certain cases. For example, such a technique can work well when (1) an object will have a relatively continuous and smooth trajectory even if it has been merged with other objects, which also means that the location and velocity of an object, after being merged with one or more other objects, are more predictable; (2) when the merging of an object occurs for a small part of the life cycle of the whole object, and it can be expected that the duration of the merge status of an object will not be long; and (3) when the size of a merged object, while it is merged, will not change significantly, and thus the merged object can be assumed to be almost rigid.

In some cases, a merge association optimization can be performed to accommodate objects that are changing sizes and that are merged for long durations. A merge association denotes the bounding boxes within a detected merged blob, with each bounding box corresponding to one object within the blob. For example, the merge association optimization can include a normal AMO process that can more precisely optimize the positions of an initial merge association so that the positions of the bounding boxes within a merged blob can be more accurately updated. The normal AMO process can maintain each rigid object (bounding box) to be size and aspect ratio invariant. To further accommodate cases when object sizes can change overtime, a history based AMO process (also referred to as scaling AMO) can also be performed, which further modifies bounding boxes for objects that are changing size (e.g., getting smaller). For example, a center-based scaling can be applied for the bounding boxes of an initial merge association (with the size of the merged blob's container bounding box being unchanged). After scaling is done, the normal AMO process can be applied to optimize the positions of the bounding boxes in the merge association (which have been scaled). In some examples, the scaling itself can be based on a history by utilizing a complete mechanism to maintain historical merge groups, which can be used to match future merge associations. For example, historical merge groups can be maintained for continuous frames, with each historical merge group containing at least one merge association for each frame. In some implementations, the results of the normal AMO process (change in position or location) and the scaling AMO process (change in size and location) are compared, and the process that better covers the blob is chosen to be the final merge association.

Blob splitting techniques have various limitations in some situations. For example, as described in more detail below, video analytics can associate a bounding box with a blob's merge association based on an amount of overlap between the bounding box and the blob. When a current bounding box of a merge association of a merged blob is overlapping with other objects, and if the size and/or shape (or at least the boundary) of an object detected in the merged blob cannot be more precisely described by the current bounding box, the splitting may fail and the bounding boxes of the merge association may be merged into other bounding boxes of other merge associations, preventing the merged blob from being split. In one illustrative example, an object may be in merge association A in frame N, and may be in merge association B in frame N+1. During the transition of the object from merge association A to merge association B, the size of the object needs to be better estimated. For example, merge association A belongs to a first blob that is to the left of a second blob containing the merge association B, and the object has just switched from the left blob to the right blob (from association A to association B). If the size of the object is relatively large, it is highly possible that the left part of the estimated bounding box (e.g., the left 25% of the bounding box) of the object actually contains no foreground pixels, in which case the object should be considered to be in association B. However, due to the wrong estimation of the shape and/or size of the bounding box, the object is determined to be in association A. Once such a situation occurs, the error starts to accumulate, and by the time the object A is not associated to A, the object's location is largely biased towards the left (towards the first blob and association A) and it may not be possible to assign the object to merge association B since a large part of the estimated bounding box (e.g., the left 25% of the bounding box) will not overlap with the blob containing merge association B.

Another problem may occur because a background subtraction process may introduce noise that causes the width or height of the blob representing the object to randomly increase or decrease by several pixels (e.g., 3-5 pixels). If the width or height of the object is already small, the percentage (in terms of area) of the object that does not belong to a current blob can become high when pixels are added or subtracted, causing the object to not be considered as part of the merge association associated with the current blob.

Another problem may occur in situations where an object is relatively still and turns smaller (e.g., when the object is being absorbed into the background due to the object not moving). In these situations, in some cases, the normal AMO and/or the history based AMO may not be able to model this change and may result in wrong estimated locations for such an object.

Methods and systems are described herein for adapting shapes of bounding boxes to the sizes of merged objects more aggressively under sensitive scenarios, such as those described above. By adapting the shapes of the associated bounding boxes, the objects merged into a merged blob under such situations can still be identified and tracked individually by the bounding boxes. The shape adaptation methods and systems may apply on top of any other merge splitting techniques (e.g., techniques of splitting merged objects within a detected merged blob before tracking), such as those that allow access to the foreground-background mask. For example, a shape adaptation process can be performed to adjust the shapes and/or positions of bounding boxes associated with a merged object (in the merged object's merge association), and the modified bounding boxes can be input to a blob splitting process that can determine whether to split the merged blob into two or more individual blobs using the associated bounding boxes (thus splitting merged objects). In some examples, the shape and position adaptation processes provide important enhancements for merged blob splitting techniques that assume merged objects (e.g., bounding boxes of the objects or the objects themselves) are rigid or aspect ratio invariant.

The merge splitting methods and systems (that the shape adaptation can be applied with) can split merged objects that are encompassed within a single bounding box as a result of blob detection. For example, a merged blob bounding box containing multiple merged objects can be split into multiple individual bounding boxes representing the individual objects. The blobs and associated bounding boxes from blob detection can be analyzed and possibly split before the bounding boxes are output to the tracking engine. The blob splitting methods and systems can more accurately split a bounding box of a merged blob into multiple bounding boxes for objects merged within the merged blob, so as to identify merged objects within the bounding box even when two or more of the merged objects have size changes during a long duration. In some cases, a modified list of blobs and associated bounding boxes (the split bounding boxes) can be output for optimization by an initial shape adaptation system and a merge association optimization system that can optimize the shape, size, and/or location of the associated bounding boxes. The optimized, modified blobs can then be output to a tracking system that can then individually track the merged objects using the split bounding boxes. The blob splitting methods and systems can process the bounding boxes of blobs and trackers, with very limited need to access pixel level information. As a result, the methods and systems have a low complexity and add a negligible complexity increase (or delay) to the video analytics system.

In some cases, the blob splitting methods and systems described herein can apply a longer-term historical module to determine the attributes and association of the objects that are being merged within a single blob. For example, historical merge groups can be maintained that include associations between merged blobs and bounding boxes associated with the merged blobs. Using the attributes and associations of the merged objects, the initial shape adaptation system and the merge association optimization system can perform shape adaptation and/or an Area Movement Optimization (AMO) process. In some cases, the shape adaptation can adapt the shape of bounding boxes associated with a merged blob for situations where objects in the merged blob are largely overlapped with other objects, situations where noise is introduced by background subtraction, and situations where the objects are relatively small. In some cases, the AMO process can handle splitting of blobs having merged objects that are moving and that have changing sizes over time. In some implementations, different types of AMO can be applied, including a normal AMO and a scaling AMO, based on the historical merge groups. The normal AMO adjusts the locations of one or more bounding boxes associated with a merged blob, while the scaling AMO adjusts the locations and sizes of the one or more bounding boxes. By adjusting the shape, locations, and/or sizes of the associated bounding boxes, a more accurate representation of objects merged within a merged blob can be identified, leading to more accurate object tracking results.

In some implementations, the AMO blob splitting techniques described herein work with the several assumptions. For example, it can be assumed that merged objects can stay merged for a long period of time (e.g., when two persons walk shoulder to shoulder, but relatively casually). Further, it can be assumed that the duration of a merge process impacts the sizes of the objects, since one or more objects may be much farther from the camera from when they were initially merged. For instance, an object may experience a size drop of 25% or more of its original size. Although size changes may be relatively significant for each object, it can be assumed that the shape of each object (e.g., approximately the aspect ratio) is invariant. It can also be assumed that, after a long period of time, blobs that each contain multiple merged objects may merge to each other. In such situations, which object belongs to which blob may not be constant.

Figure 5:
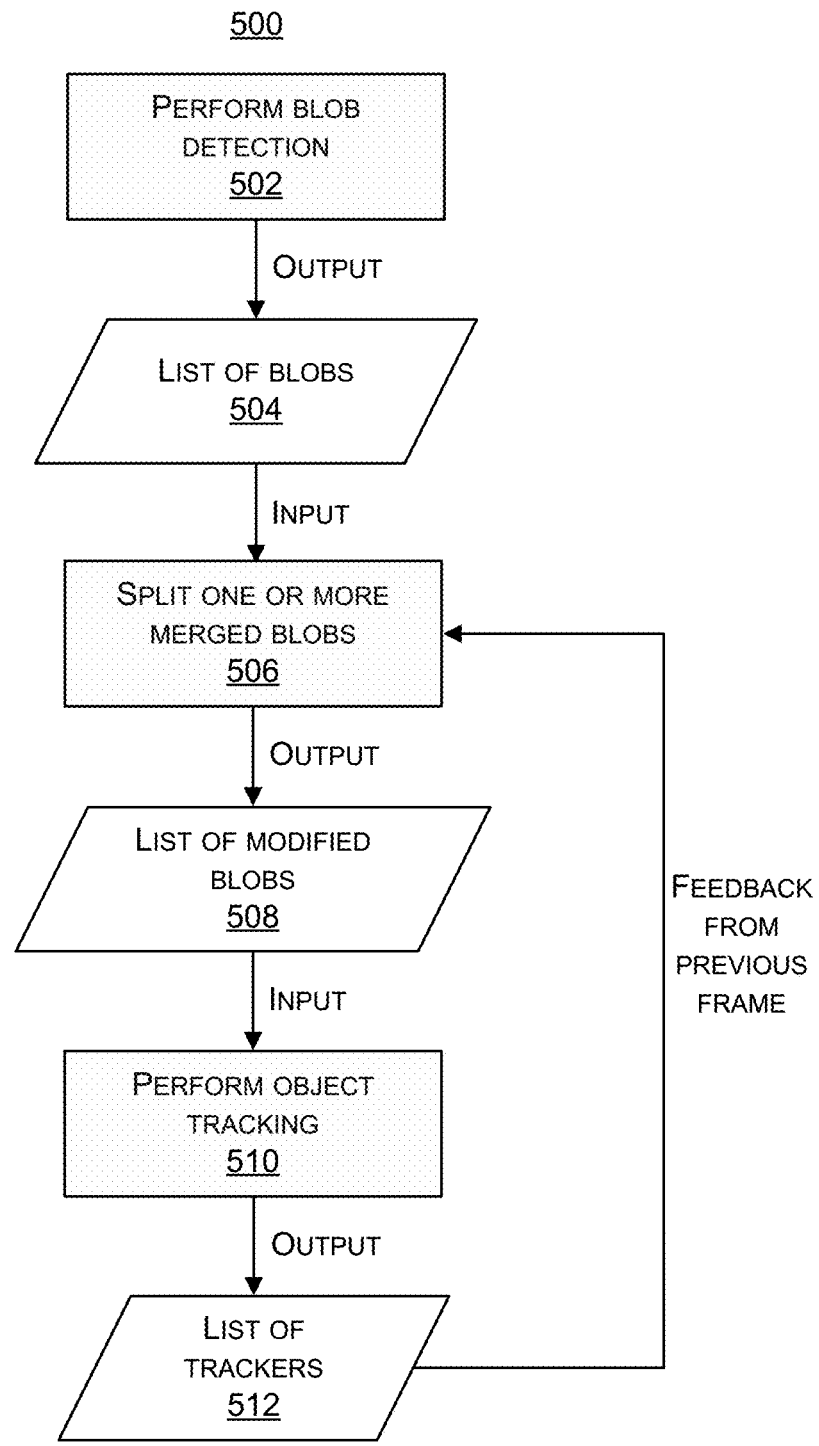
FIG. 5 is a flowchart illustrating an example of a blob detection and tracking process with blob splitting, in accordance with some examples.

FIG. 5 illustrates an example of a blob detection and tracking process 500 with blob splitting. At 502, the process 500 includes performing blob detection for a current frame. For example, a blob detection system (e.g., blob detection system 104) can generate or detect the blobs from the current frame using the blob detection techniques described above. As used herein, the frame currently being processed is referred to as the current frame. The blob detection system can output the list of blobs 504 as a result of the blob detection performed at step 502. The list of blobs 504 can include the bounding boxes associated with the blobs or can include the actual blobs. The list of blobs 504 can include at least one merged blob containing two or more merged objects.

At step 506, a blob splitting process can be performed on the list of blobs 504. The blob splitting process can determine whether bounding boxes associated with merged blobs should be split and/or can actually split merged blobs into two or more bounding boxes. In some examples, a blob splitting system (e.g., blob splitting system 620 described with respect to FIG. 6) can receive the list of blobs 504 from the blob detection system and can also receive a list of blob trackers 512 as feedback from the output of the object tracking system based on object tracking performed for a previous frame. The blobs detected for the current frame and the blob trackers from the previous frame can be used to possibly split at least one of the detected blobs into two or more blobs, and/or can determine that one or more of the blobs should not be split. In some cases, as described below, the blob splitting system can also receive and use a background-foreground mask (also referred to as a foreground mask) generated for the current frame (e.g., generated using a background subtraction engine) to split one or more of the blobs from the list of blobs 504. The foreground mask can be used as a reference point so that tracker bounding boxes can be compared to the various blob bounding boxes.

The blob trackers 512 that are fed back to the blob splitting system can include blob trackers resulting from object tracking performed on a previous frame. For example, the predicted location of a blob tracker bounding box for a current frame can be used, which is based on a previous location of the tracker in a previous frame. For instance, as described above, the predicted location of a blob tracker in a current frame can include a location in a previous frame of a blob with which the blob tracker was associated.

The list of blobs 504 output from the blob detection system can be modified by the blob splitting system based on the results of step 506. For example, the blob splitting system can generate a new list of modified blobs 508. Such a new list of blobs are called a modified list of blobs since the original list output from the blob tracking engine is modified when a blob bounding box containing merged objects is split into multiple bounding boxes. In some implementations, the list of modified blobs 508 can be output to the object tracking system, which performs object tracking on the current frame at step 510 using the techniques described above.

In some implementations, the list of modified blobs 508 can be output to an initial shape adaptation system (e.g., initial shape adaptation system 1340 shown in FIG. 13), which can modify the shape and/or position of the bounding boxes that are to be split based on the results of step 506. In some cases, the list of modified blobs 508 can be output from the initial shape adaptation system to a merge association optimization system (merge association optimization system 1340 shown in FIG. 13), which can further modify the shape of the bounding boxes and/or can modify the location and/or size of the bounding boxes that are to be split based on the results of step 506. The blobs (e.g., the bounding boxes) modified by the merge association optimization system can then be output to the tracking engine for object tracking. After object tracking is performed at step 510, a list of trackers 512 is generated and can be output for use in a subsequent iteration of the process 500 (e.g., for a next frame) as well as for other video analytics functions, as described above. The list of trackers 512 can include the bounding boxes of the trackers and the tracker IDs for the trackers to which the bounding boxes are assigned.

During the blob splitting process 500, a blob may be split into two blobs, three blobs, or even more blobs when certain conditions are met. In some cases, it is possible that some blobs will not be split into two or more blobs. For example, in most of the cases when a merge has not happened, each blob is not modified and the list of blobs 504 is kept the same even after the blob splitting process is performed at step 506. Further details on the blob splitting system and process are described below.

Figure 6:
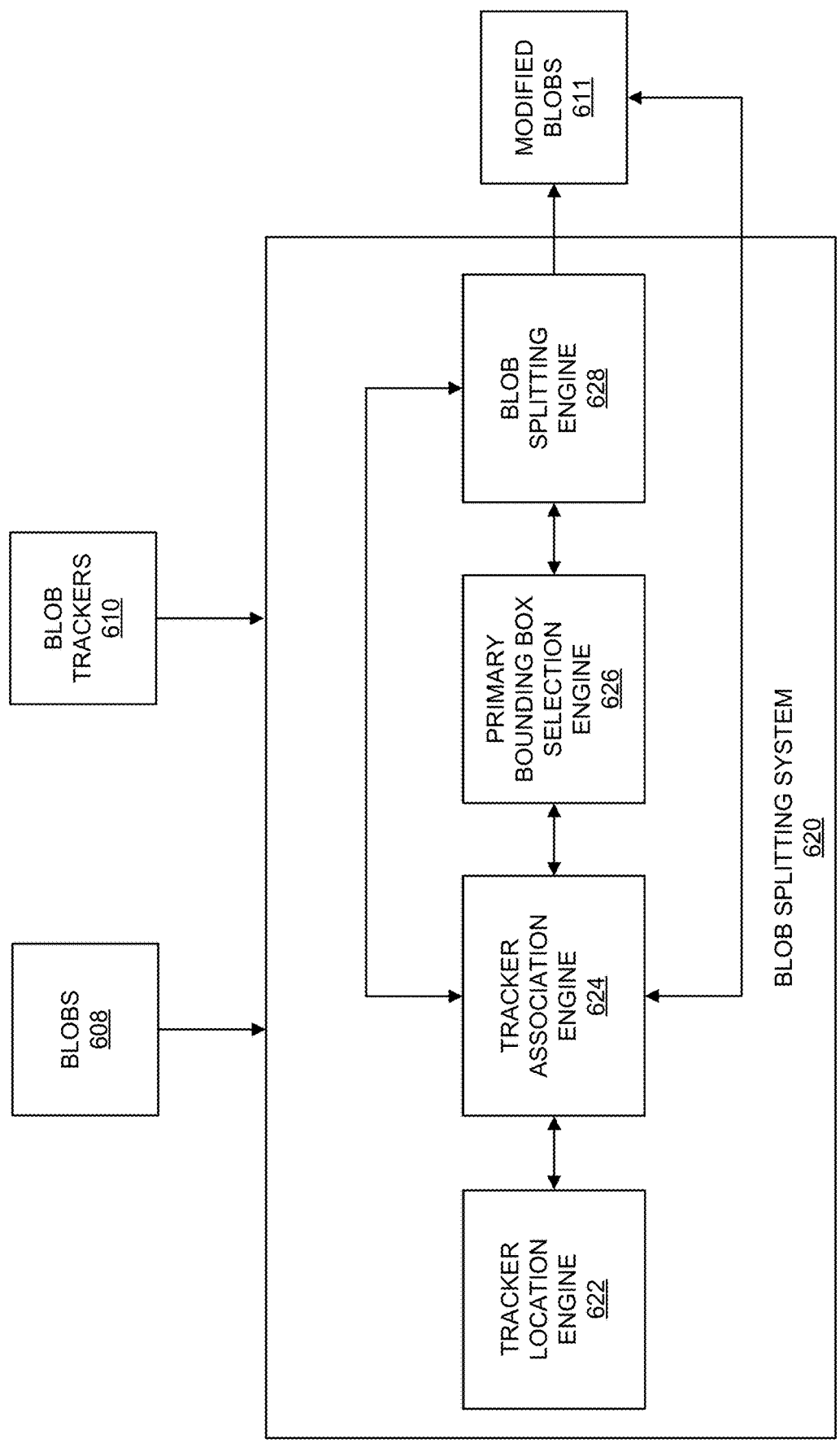
FIG. 6 is a block diagram illustrating an example of a blob splitting system, in accordance with some examples.

FIG. 6 shows an example of a blob splitting system 620 that can be used to perform a blob splitting process (e.g., step 506 of process 500). The blob splitting system 620 can determine whether bounding boxes associated with merged blobs should be split. A detected merged blob (e.g., a bounding box of a blob) and the tracker bounding boxes associated with the merged blob (the bounding boxes to be split corresponding to objects contained in the blob) are referred to herein as a merge association or as an association. The blob splitting system 620 can then actually split a merged blob into two or more associated bounding boxes, or can output merge associations for the merged blob (the bounding boxes associated with the merged blob that are determined to be split by the blob splitting system 620) to an initial shape adaptation system. An example of an initial shape adaptation system 1230 is discussed below with respect to FIG. 12. As described below, the initial shape adaptation system can modify the shapes and/or positions of bounding boxes (of one or more merge associations) that are to be split, and can output resulting initial merge associations to a merge association optimization system for further shape, size, and/or location optimization. In some examples, as described below, the initial shape adaptation system may operate using any predicted bounding boxes. The merged blobs and the predicted bounding boxes associated with the merged blobs are referred to below as preliminary merge associations (e.g., preliminary merge associations 1231). The predicted bounding boxes can include, for example, predicted bounding boxes from a previous frame (e.g., predicted tracker bounding boxes fed back from object tracking performed for the previous frame), bounding boxes of the modified blobs 611 resulting from the blob splitting process performed by the blob splitting system 620, on intermediate results of the blob splitting process, or a combination thereof.

The blob splitting system 620 includes a tracker location engine 622, a tracker association engine 624, a primary bounding box selection engine 626, and a blob splitting engine 628. The blob splitting system 620 receives as input the blobs 608 and the blob trackers 610. The blobs 608 correspond to the list of blobs 504 shown in FIG. 5, and can include the blob bounding boxes or the blobs themselves. The blob trackers 610 correspond to the list of trackers 512 shown in FIG. 5, and can include the bounding boxes of the trackers and the tracker IDs for the trackers that are assigned to the bounding boxes. The blob splitting process can be performed by the blob splitting system 620 on each blob that is detected for a current frame being processed. For example, when the blob splitting process is performed on a current frame, the blobs 608 can include the blobs (e.g., the blob bounding boxes) detected for the current frame of a video sequence. When the blobs 608 include the blobs detected for a current frame, the blob trackers 610 can include predicted bounding boxes of the blob trackers (and the tracker IDs) predicted from a previous frame of the video sequence.

In some examples, the input to the blob splitting system 620 for the current frame can also include a background-foreground mask (also referred to herein as a foreground mask) generated for the current frame, in addition to the blobs 608 and the blob trackers 610. In some cases, when analyzing a particular blob, the blob splitting system 620 can use the relevant trackers (e.g., the tracker bounding boxes) associated with that blob and the foreground mask as input. In some examples, all trackers that are associated or matched with detected blobs in the previous frame are considered as inputs to the blob splitting system 620. Alternatively, only those trackers that have been used for output (normal trackers) will be considered as inputs to the blob splitting system 620.

The output of the blob splitting system 620 includes the modified blobs 611, which corresponds to the list of modified blobs 508 shown in FIG. 5. The modified blobs 611 include, for example, the merge associations for one or more merged blobs (e.g., the bounding boxes of a merged blob that the blob splitting engine 628 determines should be split). For example, the input blobs 608 can include a single bounding box for a merged blob (including multiple objects), and the modified blobs 611 can include at least two associated tracker bounding boxes that the merged blob is to be split into. In some cases, the modified blobs 611 can be output to an object tracking system (e.g., object tracking system 106) for performing object tracking on the current frame. The object tracking system can thus perform object tracking for the current frame based on the modified blobs 611 (with one or more blob bounding boxes resulting from one or more previously merged blobs being split) instead of the original list of blobs 608 output from the blob detection system. In some implementations, the merge associations of the modified blobs 611 can be output as preliminary merge associations to an initial shape adaptation system, which can modify the shapes and/or positions of bounding boxes (of one or more merge associations) that are to be split before the modified blobs 611 are provided to the tracking engine.

Figure 7:
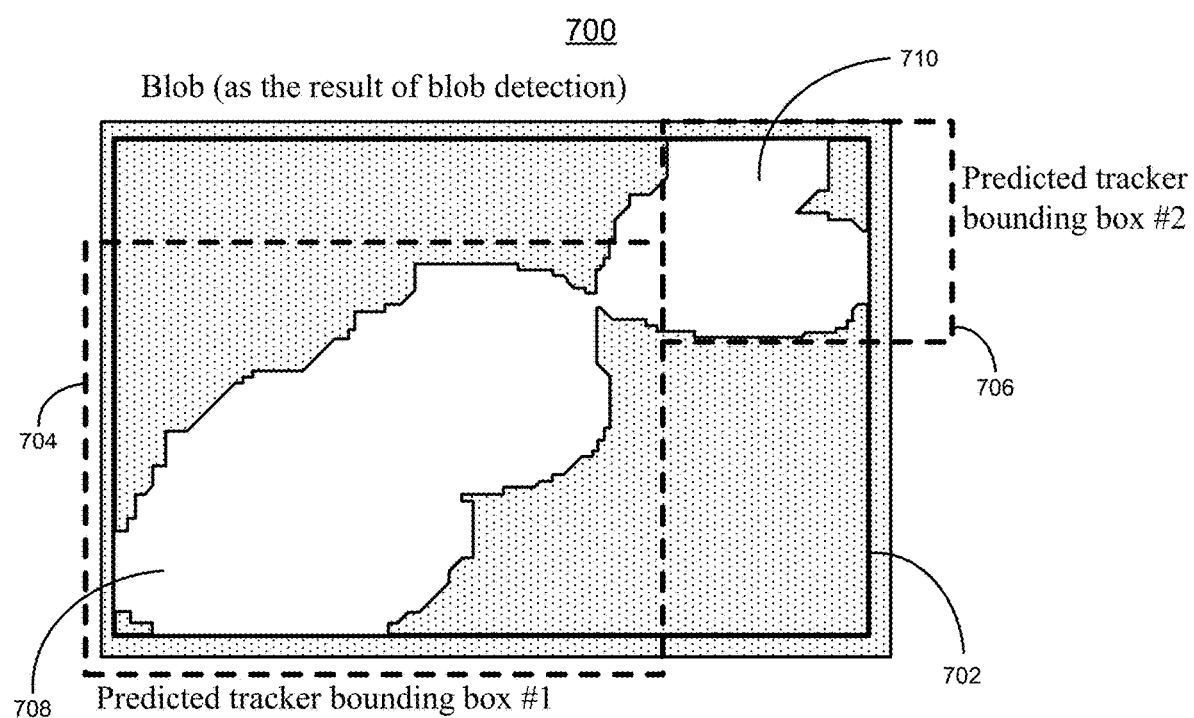
FIG. 7 is a diagram illustrating an example of a portion of a background-foreground mask with a merged blob representing merged objects, in accordance with some examples.

As noted above, the blob splitting process is performed on a blob-by-blob basis for a current frame that is being processed by the blob splitting system 620. For example, the blob splitting system 620 can analyze each blob of the list of blobs detected for the current frame. When analyzing a current blob, the blob splitting system 620 can use the foreground mask for the current frame, the bounding box of the current blob, and the bounding boxes of the blob trackers 610 fed back from object tracking performed on a previous frame. FIG. 7 illustrates an example of a cropped portion of a foreground mask 700 with a merged blob 702 (shown as merged blob bounding box) that includes two blobs 708 and 710 merged together into one. The merged blob 702 includes a first blob 708 that represents a first object and a second blob 710 that represents a second object. The first and second objects are merged together due to the blob detection system detecting and outputting the single merged blob 702 for the two objects.

To begin processing a current blob, the tracker location engine 622 can predict or determine locations of the trackers 610 in the current frame and the tracker association engine 624 can determine the one or more trackers (bounding boxes) from the trackers 610 that are associated with the current blob being processed. In some cases, the tracker location engine 622 can determine or predict locations of the trackers 610 in the current frame using predicted locations of the trackers 610 predicted using information from a previous frame. For example, assuming that two trackers are not merged yet in the previous frame (e.g., the frame immediately before the current frame, or another previous frame), each of the tracker bounding boxes can be predicted with a relatively new tracker location in the current frame (e.g., using a Kalman filter, as described above). For instance, the predicted location of the tracker (determined using a location of a blob associated with the tracker in the previous frame) can be used as the new location of the tracker in the current frame. In some cases, a velocity of the tracker may also be taken into account when determining the predicted location (e.g., the location of the tracker bounding box may be moved in the current frame relative to its location in a previous frame according to its velocity or trajectory). In some cases, the predicted location of the trackers 610 can be determined and output to the blob splitting system 620 from the object tracking system in cases when tracker location information is updated as part of the object tracking process.

Using FIG. 7 as an example of a foreground mask for a current frame, the tracker bounding box 704 can be associated with a blob representing the first object (represented by the blob 708 in the current frame) in the previous frame and the tracker bounding box 706 can be associated with a blob representing the second object (represented by the blob 710 in the current frame) in the previous frame. The location of the first blob in the previous frame can be used as the predicted location of the tracker bounding box 704 in the current frame, and the location of the second blob in the previous frame can be used as the predicted location of the tracker bounding box 706 in the current frame.

The tracker association engine 624 can identify one or more associated trackers for the current blob and/or the blob's bounding box. In some examples, a tracker associated with a current blob can be identified using the geometry information of the bounding box associated with the tracker (e.g., after prediction) as well as the bounding box of the current blob. In one illustrative example, the tracker association engine 624 can calculate an intersection between the candidate bounding box of a candidate tracker and the bounding box of the current blob. The intersection is also referred to herein as an intersection region or an intersecting region.

Figure 8:
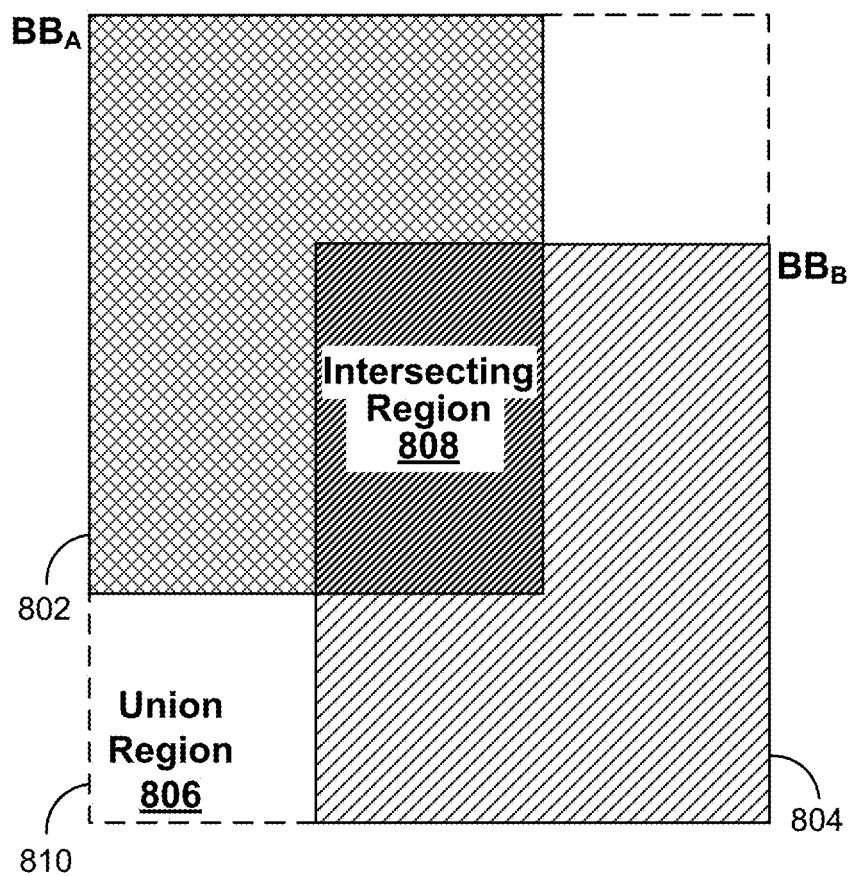
FIG. 8 is a diagram illustrating an example of an intersection and union of two bounding boxes, in accordance with some examples.

FIG. 8 shows an example of an intersection I and union U of two bounding boxes, including a bounding box $BB_A$ 802 of the current blob in the current frame and a bounding box $BB_B$ 804 of the candidate tracker in the current frame. The intersecting region 808 includes the overlapped region between the bounding box $BB_A$ 802 and the bounding box $BB_B$ 804.

The union region 806 includes the union of bounding box $BB_A$ 802 and bounding box $BB_B$ 804. The union of bounding box $BB_A$ 802 and bounding box $BB_B$ 804 is defined to use the far corners of the two bounding boxes to create a new bounding box 810 (shown as the dotted line). More specifically, by representing each bounding box with (x, y, w, h), where (x, y) is the upper-left coordinate of a bounding box, w and h are the width and height of the bounding box, respectively, the union of the bounding boxes would be represented as follows:

$$\text{Union}(BB_A, BB_B) = (\min(x_1, x_2), \min(y_1, y_2), (\max(x_1 + w_1 - 1, x_2 + w_2 - 1) - \min(x_1, x_2)), (\max(y_1 + h_1 - 1, y_2 + h_2 - 1) - \min(y_1, y_2)))$$  Eq. (3)

The tracker association engine 624 can determine a size ratio of the intersection of the blob and candidate tracker bounding boxes over a size of the current blob bounding box (denoted as $$SR = \frac{BB_A \cup BB_B}{BB_A}).$$

If the size ratio is larger than a minimum size ratio (or equal to in some cases), the candidate bounding box and its tracker is considered as being associated with the current blob. Otherwise, if the size ratio is smaller than the minimum size ratio (or equal to in some cases), the candidate bounding box, as well as its tracker, is determined to not be associated with the current blob. The minimum size ratio can be set to any suitable threshold number or percentage (e.g., 0.5, 0.6, 0.7, 0.8, or other suitable threshold) representing a minimum amount of overlap between the blob bounding box and the bounding box of the candidate tracker.

In some examples, a tracker bounding box (e.g., predicted for the merged blob as the results of the tracker in the previous frame) can be associated with a detected merged blob and the merge association of the merged blob without requiring the tracker bounding box to overlap for a certain percentage. For instance, in some cases, any blob that has a maximum overlap with a current bounding box will be associated with the bounding box. In one illustrative example, given a bounding box O (of a tracker tracking an object in a previous frame), a first merged blob A detected for a current frame, and a second merged blob B detected for the current frame, the tracker association engine 624 can determine which merge association (the merge association for blob A or the merge association for blob B) to associate the bounding box O with. For instance, if the bounding box O is overlapped at all with the first merged blob A and not the second merged blob B, the bounding box O will be associated with the first merged blob A. In another example, if the bounding box O overlaps with both the first merged blob A and the second merged blob B, the merged blob A or the merged blob B that has the maximum overlap with the bounding box O is selected as the merge association with which to associate the bounding box O. For instance, if the bounding box O overlaps 30% with the first merged blob A and overlaps 20% with the second merged blob B, the bounding box O will be associated with the first merged blob A and not the second merged blob B.

The tracker association engine 624 can perform similar processes for the current blob using bounding boxes of the trackers 610 to determine whether more trackers and their bounding boxes are associated with the current blob. Returning to FIG. 7 as an example, the bounding box 704 and bounding box 706 can be determined to be associated with the merged blob 702 by the tracker association engine 624 (e.g., based on the size ratios between the blob 702 bounding box and the two candidate bounding boxes 704 and 706 being greater than the minimum size ratio). The tracker association engine 624 can also perform a similar process for the trackers 610 relative to each of the blobs 608 for the current frame to determine which trackers are associated with each blob.

In some cases, a merge association for a merged blob includes the container bounding box of the merged blob and the bounding boxes that are determined to be associated with the merged blob by the tracker association engine 624. In other cases, a merge association for a merged blob includes the container bounding box of the merged blob and the bounding boxes that are determined to be split by the blob splitting engine 628.

In some cases, a current blob may not be associated with any tracker or may be associated with just one tracker by the tracker association engine 624. When the number of tracker bounding boxes associated with a current blob is equal to or smaller than one, no splitting is performed. For example, if the current blob is not associated with any tracker or is associated with just one tracker, the blob splitting process terminates for the current blob, in which case the current blob is not modified (or split). The current blob can then be included in the modified blobs 611 list the same as it was included in the input blobs 608.

When a blob is associated with multiple tracker bounding boxes by the tracker association engine 624, a recursive process can be performed to determine whether to split the blob into multiple blobs (e.g., into multiple blob bounding boxes). In addition to the bounding box of the blob and, in some cases, the foreground mask for the current frame, the input to the blob splitting engine 628 can be two tracker bounding boxes that are associated with the blob. In such cases, the process includes applying different functions based on whether the number of tracker bounding boxes associated with the current blob is larger than two or is equal to two. For example, when the number of tracker bounding boxes associated with a current blob is equal to two, the tracker bounding boxes are processed directly by the blob splitting engine 628 (bypassing the primary bounding box selection engine 626). When the number of tracker bounding boxes associated with a current blob is larger than two, one primary or optimal bounding box is selected by the primary bounding box selection engine 626. In some cases, the primary bounding box may be defined in a way that the union of the remaining bounding boxes associated with the blob has the smallest size. The remaining two or more bounding boxes associated with the current blob can then be unified or combined into a combined bounding box. The primary bounding box and the combined bounding box are then processed by the blob splitting engine 628.

FIG. 9A-FIG. 9D include diagrams illustrating an application of the blob splitting process to a current blob that is associated with more than two tracker bounding boxes. FIG. 9A shows the initial inputs for analyzing the current blob. The initial inputs include the bounding box 902 for the current blob and the tracker bounding boxes 904, 906, and 908 that are determined to be associated with the current blob bounding box 902 by the tracker association engine 624. The bounding box 902 of the merged blob can also be referred to herein as a container bounding box. As shown in FIG. 9B, the tracker bounding box 904 is determined to be the primary (or optimal) tracker bounding box. In some examples, the primary bounding box may be defined in a way that the union of the remaining associated bounding boxes has the smallest size. For example, the union of the bounding box 906 and the bounding box 908 (shown as combined bounding box 910 in FIG. 9C and FIG. 9D) provide the smallest size union among the possible unions between bounding boxes 904 and 906, between bounding boxes 904 and 908, and between bounding boxes 906 and 908. Based on the union between the bounding boxes 906 and 908 providing the smallest size union among the possible unions, bounding box 904 is selected as the primary bounding box. Any other suitable technique for selecting the primary bounding box can also be performed. For example, the tracker bounding box with the largest intersection region (e.g., similar to intersecting region 1008 in FIG. 10) with the blob bounding box 902 can be defined or selected as the primary bounding box. In another illustrative example, the tracker bounding box having highest size ratio (ratio of the intersection of the blob bounding box and tracker bounding box over a size of the blob bounding box) can be defined or selected as the primary bounding box. According to any of these illustrative techniques, the tracker bounding box 904 would be selected as the primary bounding box.

After the primary bounding box is chosen, the remaining bounding boxes 906 and 908 are unified or combined to be a new combined bounding box 910, as shown in FIG. 9C and FIG. 9D. In some examples, the remaining bounding boxes can be combined by performing a union operation among all the remaining bounding boxes. For example, the bounding boxes 906 and 908 can be combined by performing a union operation between the bounding boxes 906 and 908, as illustrated in FIG. 9C. By unifying the remaining bounding boxes 906 and 908 into the combined bounding box 910, the blob splitting functions performed by the blob splitting engine 628 can be simplified. In some implementations, rather than processing only two bounding boxes, the blob splitting engine 628 can process more than two tracker bounding boxes for a given blob.

In some cases, the blob splitting engine 628 can process one blob and two associated bounding boxes. For example, the blob splitting engine 628 can obtain as input the current blob, the two tracker bounding boxes associated with the current blob, and the foreground mask for the current frame. In some cases, as noted above, the two tracker bounding boxes can include a primary bounding box and a combined bounding box when more than two tracker bounding boxes were associated with the blob bounding box. For example, referring to FIG. 9D, one associated tracker bounding box is the primary bounding box 904 and the other associated tracker bounding box is the unified bounding box 910. In other cases, the two tracker bounding boxes can include the actual bounding boxes of two trackers when only two trackers were associated with the blob bounding box.

The blob splitting engine 628 determines whether or not the current blob should be split into the two associated tracker bounding boxes. For simplicity, the bounding box of the blob to be split can be defined as a container box (denote as cBox), the two associated tracker bounding boxes (to be split to) can be denoted as bLBox and bRBox, and the number of foreground pixels within a generic bounding box bbox is denoted as area(bbox). Using FIG. 9D as an example, the blob bounding box 902 can be denoted as the cBox, the primary bounding box 904 can be denoted as bLBox, and the combined bounding box 910 can be denoted as bRBox. The same denotations could be used if the bounding boxes 904 and 910 were both actual bounding boxes of trackers (as opposed to the bounding box 910 being a union of two trackers bounding boxes 906 and 908).

In some examples, if the two associated tracker bounding boxes 904 and 910 (bLBox and bRBox) cover a majority of the foreground area of the blob bounding box 902 (cBox), a split is desirable. In some examples, a split is desirable if the associated tracker bounding boxes 904 and 910 (bLBox and bRBox) do not cover too large of a foreground area that is outside of the blob bounding box 902 (cBox). For example, if a foreground area (e.g., the number of foreground pixels area(bbox)) of the two associated tracker bounding boxes 904 and 910 (bLBox and bRBox) within the blob bounding box 902 (cBox) dominates the foreground area of the tracker bounding boxes 904 and 910 (bLBox and bRBox) and if most of the foreground area of the two associated tracker bounding boxes 904 and 910 (bLBox and bRBox) is within the blob bounding box 902 (cBox), the blob splitting engine 628 can split the blob bounding box 902 (cBox) into the two associated bounding boxes 904 and 910. One specific illustrative example of such an implementation is as follows:

a. Determine the intersection bounding boxes: bILBox=bLBox∩cBox and bIRBox=bRBox∩cBox
b. areaWithinBoxSum=area(bILBox)+area(bIRBox);
c. areaSum=area(bLBox)+area(bRBox);
d. areaContainer=area(cBox);
e. If areaWithinBoxSum is larger than areaSum*$T_1$ and areaSum is larger than areaContainer*$T_2$, the cBox is split into bLBox and bRBox; otherwise, no more splitting for all bounding boxes related to cBox. Here, $T_1$ and $T_2$ both reflect any suitable percentage ratio (e.g., $T_1$=0.8 and $T_2$=0.85, or any other suitable percentage ratios for $T_1$ and $T_2$).

Figure 10A:
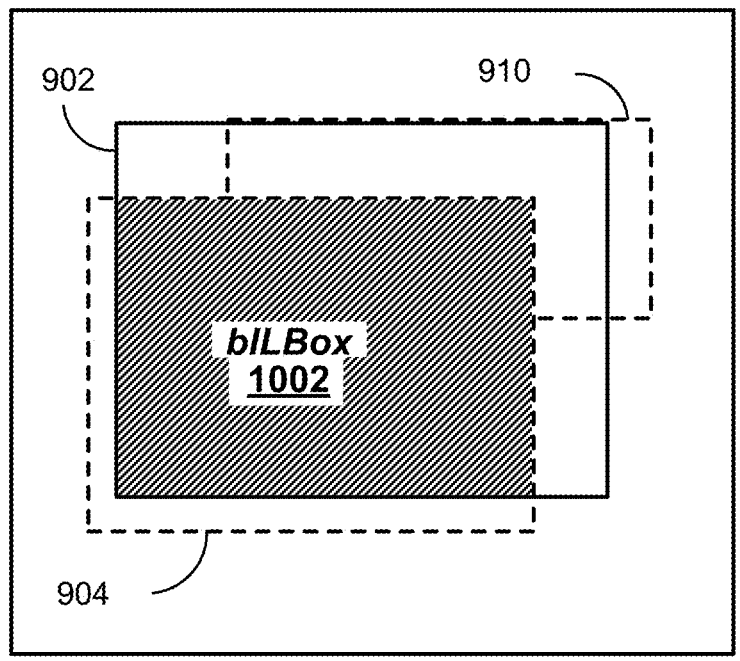
FIG. 10A-FIG. 10E are diagrams illustrating examples of different areas of tracker bounding boxes and a blob bounding box, in accordance with some examples.
Figure 10B:
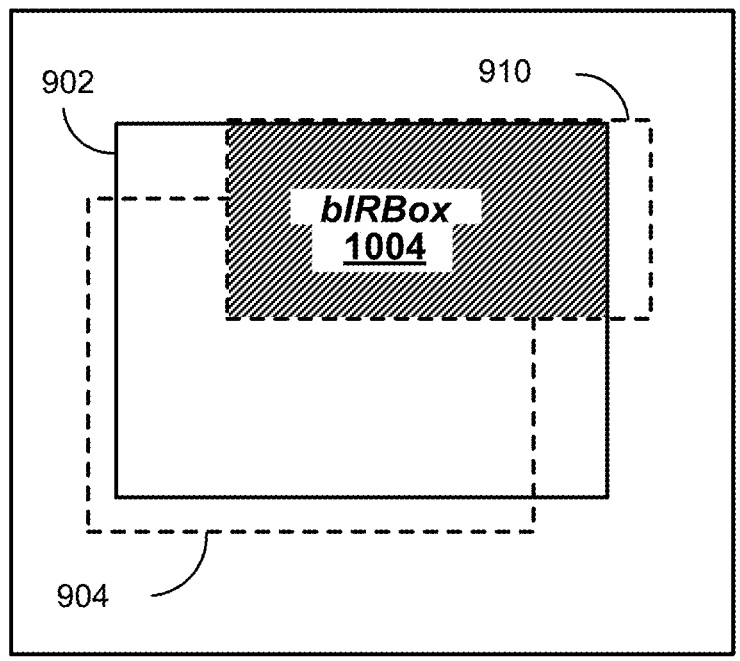
Figure 10C:
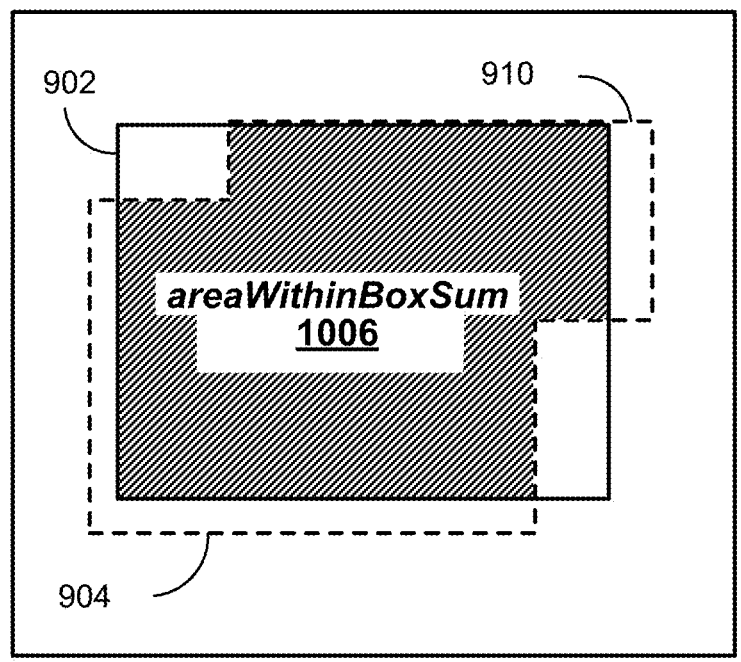
Figure 10D:
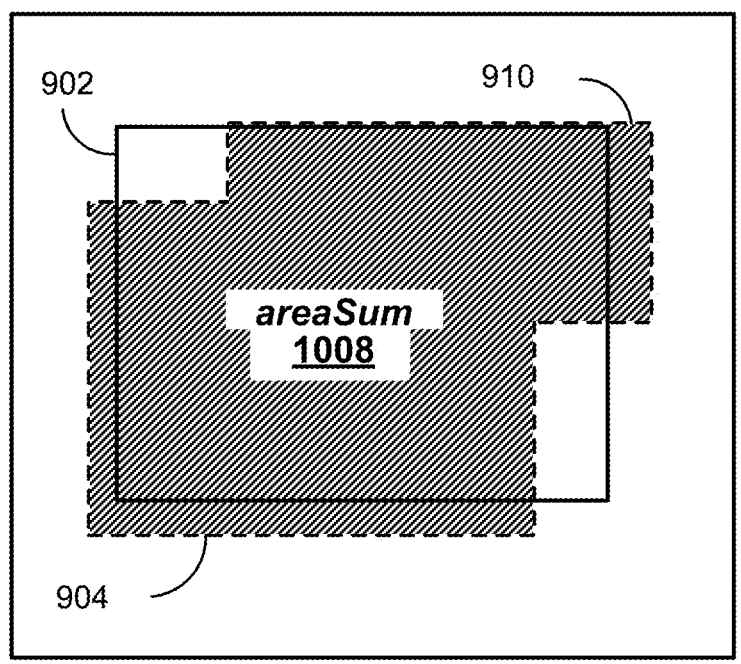
Figure 10E:
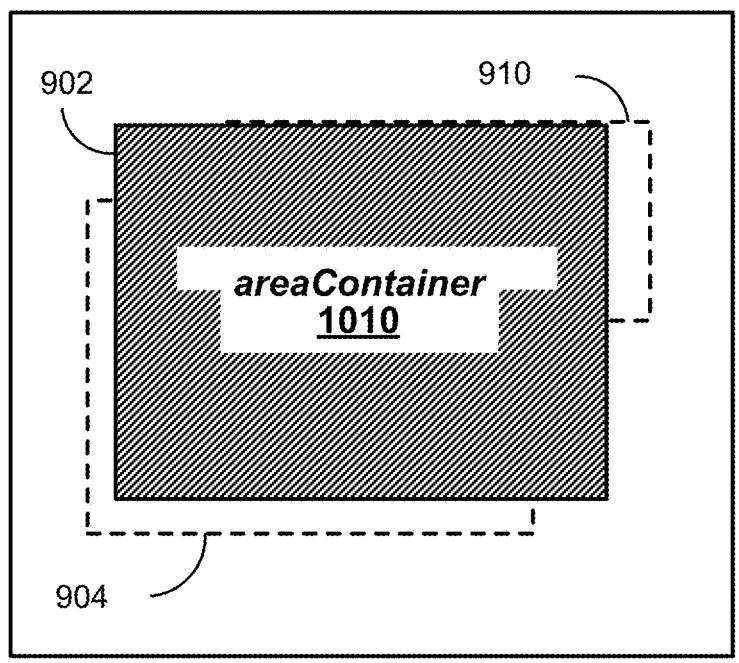

FIG. 10A shows an example of the intersection bounding box bILBox 1002, which includes the area of intersection (or intersection area) between the tracker bounding box 904 and the blob bounding box 902 from FIG. 9D. FIG. 10B shows an example of the intersection bounding box bIRBox 1004, which includes the area of intersection between the tracker bounding box 910 and the blob bounding box 902 from FIG. 9D. FIG. 10C shows an example of the areaWithinBoxSum 1006, which includes the area (e.g., number of foreground pixels) of the bILBox 102 and the bIRBox 1004 (representing the foreground pixels of the bounding boxes 904 and 910 that are within the blob bounding box 902). FIG. 10D shows an example of the areaSum 1008, which includes the total area (e.g., number of foreground pixels) of the tracker bounding box 904 (bLBox) and the tracker bounding box 910 (bRBox). FIG. 10E shows an example of the areaContainer 1010, which includes the total area (e.g., number of foreground pixels) of the blob bounding box 902 (cBox).

Using the notation above, the blob bounding box 902 (cBox) can be split into the tracker bounding box 904 (bLBox) and the combined bounding box 910 (bRBox) if areaWithinBoxSum 1006 is larger than $T_1$*areaSum 1008 and if areaSum 1008 is larger than $T_2$*areaContainer 1010. For example, if the area of the tracker bounding boxes 904 and 910 that is within the blob bounding box 902 (the areaWithinBoxSum 1006 region) is at least 80% of the total area of the tracker bounding boxes 904 and 910 (the areaSum 1008 region), it can be determined that the foreground area of the two associated tracker bounding boxes 904 and 910 that is within the blob bounding box 902 dominates the total foreground area of the tracker bounding boxes 904 and 910. Further, if the total area of the tracker bounding boxes 904 and 910 (the areaSum 1008 region) is at least 85% of the area of the blob bounding box 902 (the areaContainer 1010 region), it can be determined that most of the foreground area of the two associated tracker bounding boxes 904 and 910 is within the blob bounding box 902. One of ordinary skill will appreciate that other suitable values of $T_1$ and $T_2$ can be used other than 0.8 and 0.85, respectively. In some cases, the split can occur only if both of the conditions are met. In some cases, the split can occur if only one of the conditions are met. If one or both of the two conditions are not met, the blob splitting engine 628 can perform no more splitting for all bounding boxes related to the blob bounding box 902 (cBox).

In other implementations, the blob splitting engine 628 can determine whether to split a blob bounding box into two associated tracker bounding boxes by checking the intersection bounding boxes (bILBox and bIRBox) and calculating the number of foreground pixels within the intersection bounding boxes. For example, the blob splitting engine 628 can split the blob bounding box 902 (cBox) into the two associated bounding boxes 904 and 910 if the areaWithinBoxSum 1006 region is greater than a threshold amount. In one illustrative example, the blob bounding box 902 can be split if the areaWithinBoxSum 1006 region is greater than a threshold amount of the area of the blob (areaWithinBoxSum>$T_3$*areaContainer, with $T_3$ being a percentage ratio, such as 0.75, 0.8, 0.85, or other suitable percentage ratio). In other implementations, the union of the associated tracker bounding boxes maybe used instead of the intersection.

Based on the recursive process performed by the blob splitting engine 628, if the blob splitting engine 628 determines that the blob should not be split, the whole blob splitting process can be terminated for the current blob and a next blob or next frame can be analyzed. Otherwise, the blob splitting engine 628 determines that the blob should be split, and the blob bounding boxes is split into the two associated tracker bounding boxes. For example, the blob bounding box 902 can be split into the bounding boxes 904 and 910. In cases in which the blob is split by the blob splitting engine 628, the modified blobs 611 will include separate blob bounding boxes 904 and 910 (and thus separate blobs) instead of the blob bounding box 902. In some cases, the blob splitting engine 628 outputs the blobs it determines should be split to an initial shape adaptation system, an example of which is described below with respect to FIG. 12. For example, the modified blobs 611 can include the bounding boxes that a merged blob will be split into (one or more of the tracker bounding boxes associated with the merged blob). The bounding boxes of the modified blobs 611 can be output to the initial shape adaptation system for possible shape and/or position adjustment.

Figure 11:
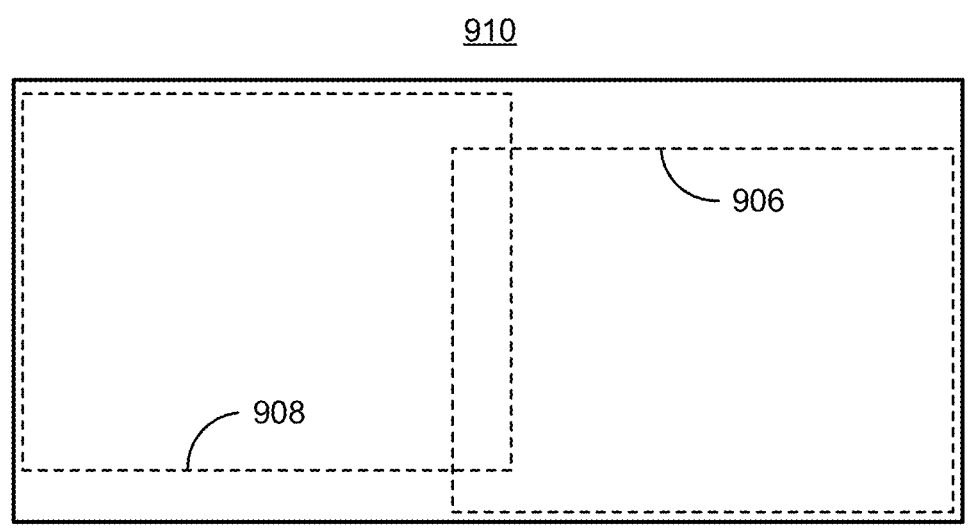
FIG. 11 is a diagram further illustrating the example application of the blob splitting process to the blob associated with multiple tracker bounding boxes, in accordance with some examples.

In cases where a primary bounding box and a combined bounding box were processed (when more than two tracker bounding boxes are associated with a blob bounding box), the blob splitting engine 628 can recursively perform the same blob splitting process on the newly split blob (e.g., the newly split blob corresponding to the combined bounding box 910) and the remaining bounding boxes making up the combined bounding box (e.g., remaining bounding boxes 906 and 908 of the combined bounding box 910). The combined bounding box 910 is shown in FIG. 11 along with the remaining bounding boxes 906 and 908 making up the combined bounding box 910. In one illustrative example, the blob splitting engine 628 can determine that the new blob bounding box 910 (now denoted as cBox) should be split into the bounding box 908 (now bLBox) and the bounding box 906 (now bRBox) if areaWithinBoxSum of the bounding boxes 906 and 908 is larger than $T_1$*areaSum of the bounding boxes 908 and 906, and if areaSum is larger than $T_2$*areaContainer of the new blob bounding box 910. If either condition is not met, the blob splitting engine 628 can end the splitting process for the blob 902. In some cases, the blob splitting process is ended only if both conditions are not met. The other blob splitting conditions provided above could also be used to determine whether to split the combined bounding box 910 into the separate bounding boxes 906 and 908.

In the above recursive splitting process, if there are N original associated tracker bounding boxes associated with one blob output from the blob detection system, up to N−1 levels of recursive simple splitting processes may apply. However, in each level, once the blob splitting engine 628 decides the blob splitting should not be done for a bounding box, the whole recursive process terminates for that blob. Therefore, the results of splitting one blob may lead to M bounding boxes, with M equal to 1 (the blob itself), 2, 3, . . . , or N bounding boxes. When M is smaller than N−1, the blob is actually split into one or more original associated bounding boxes plus a union of the remaining original associated bounding boxes.

Figure 12:
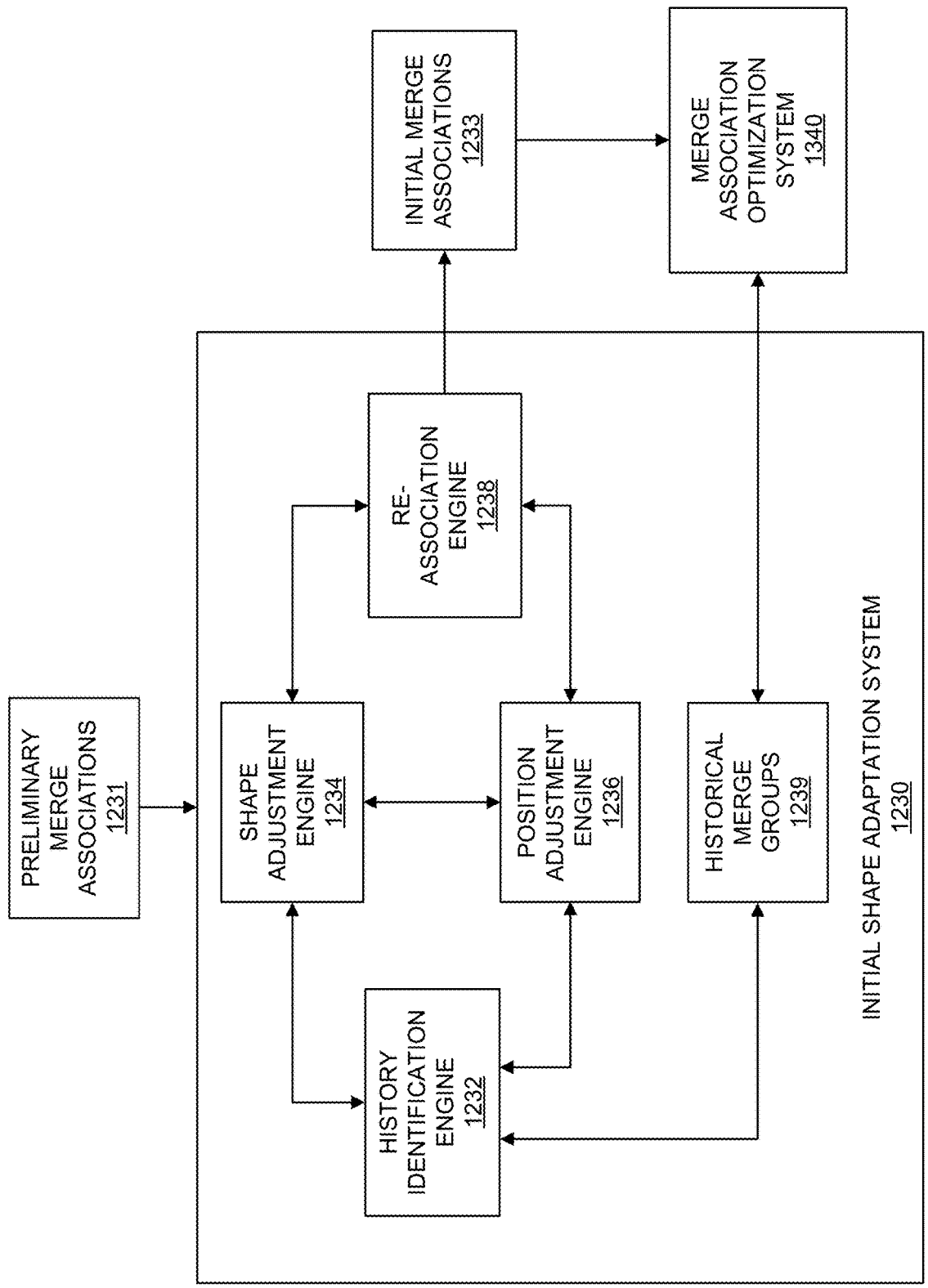
FIG. 12 is a block diagram illustrating an example of an initial shape adaptation system, in accordance with some examples.

FIG. 12 is an example of an initial shape adaptation system 1230 that can adapt bounding boxes to the shapes of the merged blobs that the bounding boxes are associated with. The initial shape adaptation system 1230 includes a history identification engine 1232, a size adjustment engine 1234, a position adjustment engine 1236, and a re-association engine 1238. The various engines of the initial shape adaptation system 1230 can perform an initial shape adaptation process to adjust the shapes and/or positions of the bounding boxes associated with merged blobs, and can provide initial merge associations 1233 as output to a merge association optimization system 1340 (described below). An example of a shape adaptation process 1500 is described below with respect to FIG. 15.

Figure 13:
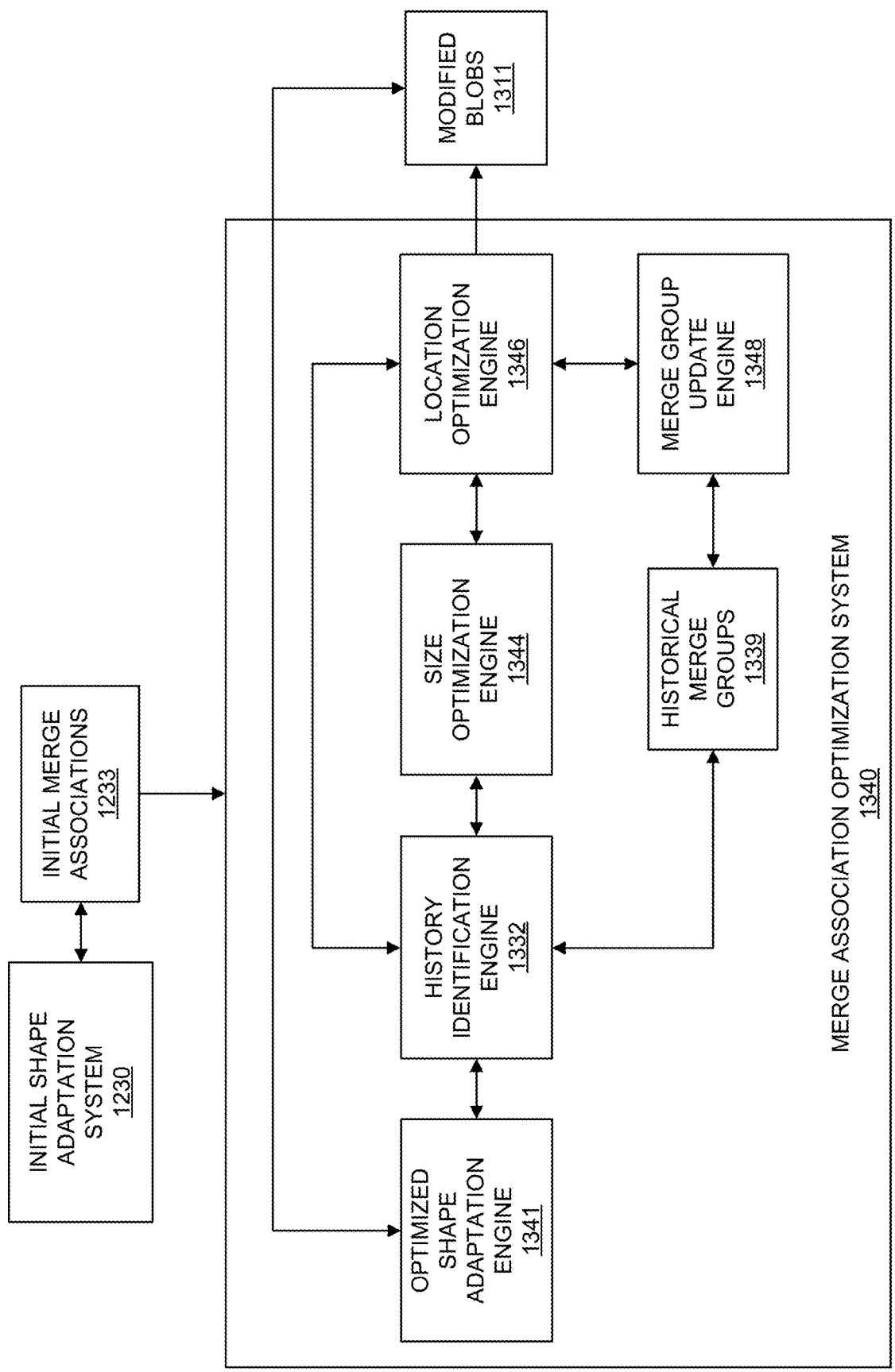
FIG. 13 is a block diagram illustrating an example of a merge association optimization system, in accordance with some examples.

The initial shape adaptation system 1230 obtains preliminary merge associations 1231, and can modify the shapes, the positions, or both the positions and shapes of bounding boxes of one or more of the preliminary merge associations 1231 to better adapt to the shapes of the objects being tracked. The shape and/or position adjusted bounding boxes are output as initial merge associations 1233 to a merge association optimization system 1340. FIG. 13 is an example of a merge association optimization system 1340. The merge association optimization system 1340 includes an optimized shape adaptation engine 1341, a history identification engine 1342, a size optimization engine 1344, a location optimization engine 1346, and a merge group update engine 1348. The various engines of the merge association optimization system 1340 can perform merge association optimization processes to further optimize the bounding boxes in the initial merge associations 1233. For example, the merge association optimization system 1340 can modify the shapes, sizes, and/or locations of bounding boxes of one or more of the initial merge associations 1233.

As described in more detail below, the initial shape adaptation system 1230 and the merge association optimization system 1340 can perform shape adaptation and/or an Area Movement Optimization (AMO) process. The shape adaptation performed by the initial shape adaptation system 1230 and the merge association optimization system 1340 allows a bounding box of a merged blob to be more accurately split into multiple bounding boxes in certain situations by adapting to the shape of objects. Illustrative situations when shape adaptation is useful include when objects in a merged blob are largely overlapped with other objects, when noise is introduced by background subtraction, when the objects are relatively small, or other sensitive situations. For example, by modifying the shape and/or position of a tracker bounding box (associated with the merged blob) to a shape of the object being tracked, the object merged into the merged blob can be tracked more accurately. In some examples, shape adaptation can contains two steps, including a first step performed by the initial shape adaptation system 1230 that is referred to as initial shape adaptation or weak shape adaptation. The second step can be performed by the merge association optimization system 1340 and is referred to as optimized shape adaptation or aggressive shape adaptation. Both steps can make a bounding box associated with a merged blob more compactly cover a blob, thus more closely matching the potential shape of a corresponding object.

The merge association optimization system 1340 can also perform the AMO process to handle splitting of blobs having merged objects that are moving and that have changing sizes over time. In some implementations, different types of AMO can be applied, including a normal AMO and a scaling AMO. The normal AMO adjusts the locations of one or more bounding boxes associated with a merged blob, while the scaling AMO adjusts the locations and sizes of the one or more bounding boxes. The size and/or location optimizations performed by the merge association optimization system 1340 allows a bounding box of a merged blob to be more accurately split into multiple bounding boxes in some situations, such as when two or more objects have size changes during a long duration. The shape, position, and/or size adjusted bounding boxes can be output by merge association optimization system 1340 as modified blobs 1311 to the tracking system (e.g., the object tracking system 106), which can then individually track the split blobs (and the objects they represent) instead of the merged blob.

In some implementations, the blob splitting system 620 can determine if any bounding boxes associated with a merged blob are suitable for being split (as described above), and the actual splitting is done by the merge association optimization system 1340. For example, given a merged blob and two associated tracker bounding boxes that the blob splitting system 620 has determined the merged blob should be split into (making up a merge association for the merged blob), the initial shape adaptation system 1230 can adjust the shape and/or position of at least one of the associated bounding boxes, and the merge association optimization system 1340 can further adjust the shape, size, and/or position of at least one of the associated bounding boxes. The merge association optimization system 1340 can then split the merged blob into the two associated bounding boxes by outputting the bounding boxes as separate blobs in the modified blobs 1311. In some implementations, the blob splitting system 620 can split a bounding box of a blob into two or more of its associated tracker bounding boxes, and the initial shape adaptation system 1230 and the merge association optimization system 1340 can optimize the shapes, sizes, and/or locations (or positions) of the associated tracker bounding boxes.

The preliminary merge associations 1231 are provided as input to the initial shape adaptation system 1230. As described previously, a merge association (or association) for a detected merged blob (e.g., a container bounding box of a merged blob) includes the merged blob and the tracker bounding boxes associated with the merged blob. The initial shape adaptation system 1230 can operate using any predicted bounding boxes as input. For example, the preliminary merge associations 1231 can include any predicted bounding boxes associated with merged blobs.

In some examples, the preliminary merge associations 1231 can include predicted bounding boxes from a previous frame, such as predicted tracker bounding boxes fed back from object tracking performed for a previous frame (e.g., the frame immediately before the current frame, or another previous frame). For instance, a preliminary merge association of the preliminary merge associations 1231 can include a merged blob and the tracker bounding boxes that are determined to be associated with the blob by the tracker association engine 624. In some examples, the preliminary merge associations 1231 can include a merged blob and the bounding boxes that the blob splitting system 620 determines should be split for that merged blob. For example, the preliminary merge associations 1231 can include the bounding boxes that a merged blob is to be split into, which can be provided in the modified blobs 611 output from the blob splitting engine 628. In some examples, the preliminary merge associations 1231 can include intermediate results of the blob splitting process performed by the blob splitting system 620 (e.g., before the blob splitting engine 628 recursively performs the blob splitting process on a newly split blob, such as blob 910 in FIG. 11).

As noted above, the preliminary merge associations 1231 can include a merged blob and the tracker bounding boxes that the tracker association engine 624 determines are associated with the merged blob. In some cases, as described above, the tracker association engine 624 can associate a tracker bounding box (e.g., predicted for the merged blob as the results of the tracker in the previous frame) with a detected merged blob and the merge association of the merged blob by determining an amount of overlap (based on the minimum size ratio) between the tracker bounding box and the bounding box of the merged blob. In some cases, the tracker association engine 624 can associate a tracker bounding box with a merged blob without requiring the tracker bounding box to overlap the blob bounding box by a minimum percentage or ratio. For instance, if a candidate bounding box is overlapped with two merged blobs, the candidate bounding box can be associated with the merged blob that it has a maximum overlap with. In one illustrative example, if a candidate bounding box overlaps with a first merged blob and a second merged blob, the candidate bounding box can be associated with the merge association of the merged blob that has the maximum overlap with the candidate bounding box. For instance, if the candidate bounding box overlaps 10% with the first merged blob and overlaps 40% with the second merged blob, the candidate bounding box will be associated with the second merged blob.

In addition to the preliminary merge associations 1231, the initial shape adaptation system 1230 can also use a foreground mask when adjusting the shapes and/or positions of the bounding boxes in the preliminary merge associations 1231. In some implementations, the foreground mask generated for the current frame can be converted to a "foreground palette mask," and the initial shape adaptation engine 1230 can use the foreground palette mask during the shape adaptation process. To generate the foreground palette mask, each foreground pixel within a detected blob can be assigned a unique value (palette) that is different than values assigned to foreground pixels of other blobs. The unique value assigned to a blob is different than the value used for the foreground mask. For example, a foreground mask might include a 0 for background pixels and a 1 for foreground pixels, or a 1 for background pixels and a 0 for foreground pixels. The unique values of the palette mask can be different than a 1 or a 0. For example, for the palette mask, all foreground pixels of a first merged blob can be assigned a value of 3, all foreground pixels of a second merged blob can be assigned a value of 4, and all foreground pixels of a third merged blob can be assigned a value of 5. An index table or other structure can be stored and accessed that includes an index to each unique value and the blob corresponding to that unique value. When a palette foreground mask is used, instead of accessing the foreground mask, the initial shape adaptation system 1230 can access the foreground palette mask when performing shape adaptation.

In some cases, historical merge groups 1239 and 1339 can be used by the initial shape adaptation system 1230 and the merge association optimization system 1340, respectively. The historical merge groups 1239 and 1339 can be used by the history identification engine 1232 and the history identification engine 1332, respectively, to identify whether a current merge association (a merge association currently being processed) belongs to historical information of a historical merge group from the historical merge group 1239 or the historical merge group 1339. The historical merge groups 1239 and 1339 can be used for various other purposes to provide better temporal consistency as well as size variety of the objects within detected merged blobs. The historical information of a historical merge group contains a merge association for each time instance (e.g., for each frame), including a container bounding box (the bounding box of the merged blob) and a list of associated bounding boxes associated with the container bounding box. The container bounding box for a time instance is the bounding box of the detected blob of that time instance and is expected to encompass all the associated objects merged into the detected blob. In addition, each merge association includes a tracker ID label of for each associated bounding box after being tracked by the tracking engine.

Figure 14:
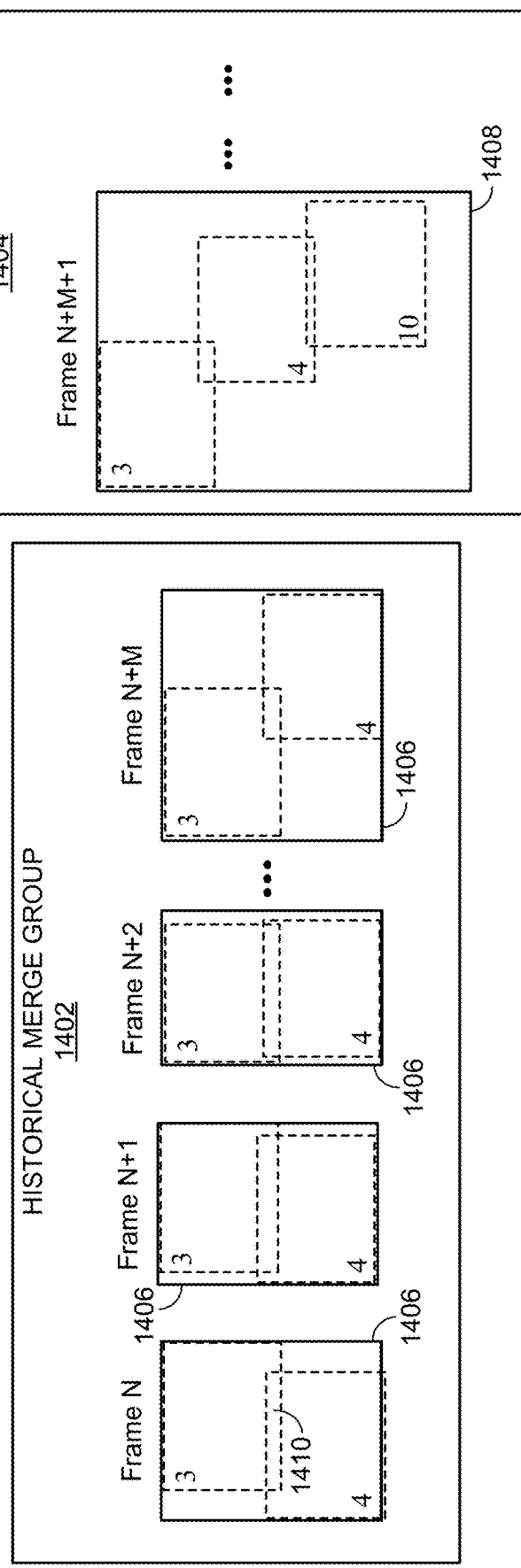
FIG. 14 is a diagram illustrating an example of historical merge groups containing merge associations for merged blobs over a sequence of video frames, in accordance with some examples.

FIG. 14 illustrates an example of historical merge groups 1402 and 1404 containing merge associations for merged blobs over a sequence of video frames. The solid rectangles represent a detected merged blob and the dashed rectangles represent predicted bounding boxes for objects associated with merged blobs. In each frame N, N+1, N+2, N+M, and N+M+1, a blob and its associated bounding boxes are shown, however, only at the relative geometry locations for illustrative purposes. The positions of a given blob within its frame may also change.

As shown in FIG. 14, a first historical merge group 1402 is maintained for a first detected merged blob represented by the bounding box 1406. The bounding box 1406 can also be referred to as a container bounding box, and the merged blob can be referred to as a container blob. The container bounding box 1406 contains two merged objects represented by associated bounding boxes with identifiers (IDs) 3 and 4 (referred to as bounding box 3 and bounding box 4), respectively. For example, the bounding boxes 3 and 4 can include the bounding boxes (as modified by the merge association optimization system 1340) that a merged blob was determined to be split into for the previous frames. A second historical merge group 1404 is also maintained for a second detected merged blob represented by the container bounding box 1408 that merges objects represented by associated bounding boxes 3, 4, and 10. The IDs 3, 4, and 10 refer to the IDs of the trackers with which each respective bounding box is associated. For example, as described above, the bounding boxes that a merged blob is split into include tracker bounding boxes associated with the merged blob.

As noted previously, each blob and its associated bounding boxes are referred to as a merge association. For example, the container bounding box 1406 of the first merged blob, the associated bounding box 3, and the associated bounding box 4 make up a different merge association for each of frames N, N+1, N+2, through N+M. The container bounding box 1408 of the second merged blob, the associated bounding box 3, the associated bounding box 4, and the bounding box 10 make up a merge association for the second merged blob in frame N+M+1. The objects within a merged blob can move around and change sizes from frame to frame, as shown, for example, by the shifting locations and size changes of the bounding boxes 3 and 4 from frame N to frame N+M.

Figure 15:
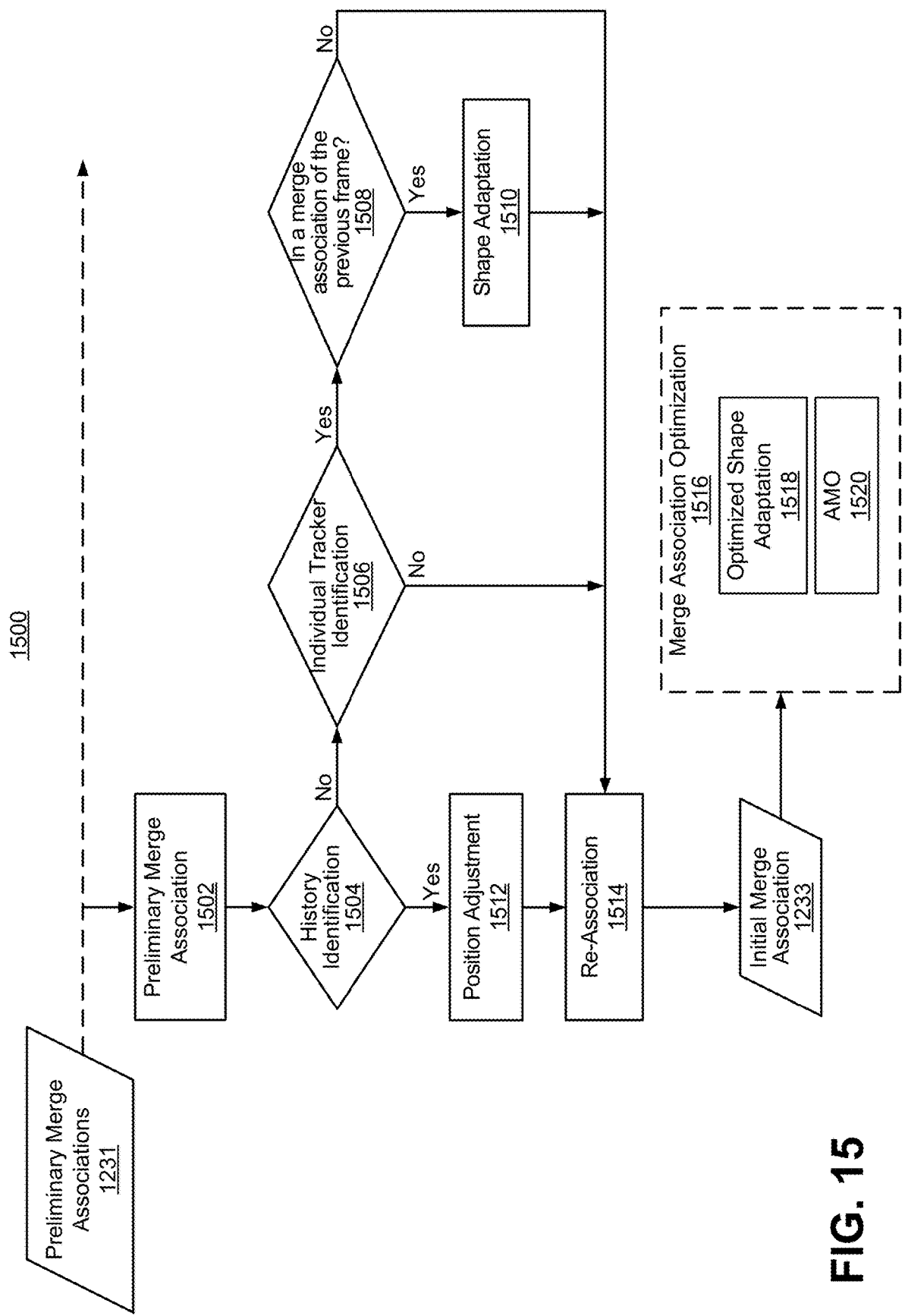
FIG. 15 is a flowchart illustrating an example of a process of adapting shapes of bounding boxes associated with merged blobs, in accordance with some examples.

FIG. 15 as an illustrative example of a shape adaptation process 1500. The shape adaptation process 1500 can be performed by the initial shape adaptation system 1230 and the merge association optimization engine 1340. For example, the initial shape adaptation system 1230 can perform an initial shape adaptation and the merge association optimization engine 1340 can perform an optimized shape adaptation (during merge association optimization 1518). The shape adaptation process 1500 is performed on each preliminary merge association for a current frame that is being processed by the initial shape adaptation system 1230. For example, shape adaptation can be performed for each estimated tracker bounding box associated with a container blob (also referred to as a merged blob).

In some implementations, the shape adaptation process 1500 applies in a way that it does not reduce the number of foreground pixels (of a merged blob) covered by an associated bounding box. In addition, in some cases, since shape adaptation can be sensitive to a dominant blob, and to avoid the case that one object is overlapping with two blobs already, the shape adaptation process 1500 can be further constrained such that it does not reduce the number of covered foreground pixels within the dominant blob. The dominant blob can be considered as the associated container blob.

As described above, a foreground mask generated for a current frame can be converted to a foreground palette mask, and the foreground palette mask can be used during the shape adaptation process 1500. For example, the palette mask can have a unique value assigned to each foreground pixel within a detected blob, with each detected blob being assigned a different unique value than values assigned to foreground pixels of other blobs. In some cases, the shape adaptation process 1500, when being performed for a merged blob, can be constrained in a way that it does not reduce the number of foreground pixels with a value equal to the unique value (assigned to the merged blob) within the foreground palette mask.

The preliminary merge associations 1231 are used as input by the shape adaptation process 1500. As noted previously, the preliminary merge associations 1231 can include any suitable predicted bounding boxes, such as predicted bounding boxes fed back from object tracking performed for a previous frame (e.g., the bounding boxes that are determined to be associated with a blob by the tracker association engine 624), the bounding boxes that the blob splitting system 620 determines should be split for that merged blob, or any other predicted bounding boxes.

At step 1506, a current preliminary merge association is identified and processed. The current preliminary merge association contains a current merged blob (or container blob) and two or more associated bounding boxes. The preliminary merge association can be modified so that one or more bounding boxes in the merge association is shape or position adjusted, so that a bounding box in the merge association no longer belongs to any merge association, or by performing some other modification. At step 1508, the current preliminary merge association is compared with the historical merge groups 1239 by the history identification engine 1232. For example, the historical merge groups 1239 can include a list of the historical merge groups for the current frame that can be searched to identify a relevant historical merge group for a given preliminary merge association. The process of searching the historical merge groups 1239 for a historical merge group corresponding to a preliminary merge association is denoted as history identification. To perform history identification for the current preliminary merge association identified at step 1502, for example, the history identification engine 1232 attempts to match the tracker ID labels of the associated bounding boxes of the current preliminary merge association with the associated bounding boxes in each historical merge group. The historical merge groups can be searched in a one-by-one fashion by searching each historical merge group one-by-one, or two or more of the historical merge groups can be searched in parallel. A historical merge group from the historical merge groups 1239 is identified as corresponding to the current preliminary merge association if the associated bounding boxes of the historical merge group have the same tracker bounding box IDs as the associated bounding boxes of the current preliminary merge association. Using FIG. 14 as an example, the current preliminary merge association can include two associated bounding boxes with tracker IDs equal to 3 and 4, respectively, in which case the historical merge group 1402 would be selected by the history identification engine 1232 as corresponding to the current preliminary merge association due to the historical merge group 1402 having trackers with IDS equal to 3 and 4.

If there is no historical merge group matched at step 1504 for the current preliminary merge association, an individual tracker identification is invoked at step 1506 for each tracker bounding box in the merge association. The trackers, if present, can be identified by identifying the tracker IDs of the trackers. If a current tracker is identified in the current preliminary merge association at step 1506 (assuming each bounding box has been associated with a tracker ID), the process 1500 determines, at step 1508, whether the current bounding box of the identified current tracker is in a merge association of the previous frame. Shape adaptation can be applied to modify the shape of the current bounding box if the current bounding box is found to be in a merge association of the previous frame. For example, shape adaptation may only be desired when the tracker previously tracked a foreground object in the previous frame.

As described above, shape adaptation can contain two steps, including initial shape adaptation (or weak shape adaptation) and optimized shape adaptation (or aggressive shape adaptation). The initial shape adaptation system 1230 performs the initial shape adaptation, and the merge association optimization engine 1340 performs the optimized shape adaptation. Shape adaption includes adjusting at least one boundary of the current bounding box towards a center of the bounding box, making the shape of the bounding box more narrow and compact. The one or more boundaries of the current bounding box can be shifted until at least one of the boundaries intersects with a foreground pixel of the current merged blob (as identified by the palette index corresponding to the current merged blob). One or both of initial shape adaptation and optimized shape adaptation can be performed for a given preliminary merge association. Both shape adaptation steps modify a shape of a bounding box associated with a merged blob so that the bounding box more compactly covers the foreground palette mask of the merged blob. Adjusting the shape of the bounding box allows it to have a shape that is close to the potential shape of the corresponding object, without allowing any foreground pixel (with the same palette index) to be excluded during the process.

If, at step 1508, the current tracker bounding box of the current preliminary merge association is found to be in a merge association of the previous frame, initial shape adaptation is applied at step 1510 to change the shape of the current bounding box. The shape adjustment engine 1234 can perform the initial shape adaption by adjusting one or more boundary pairs of the current bounding box toward a center of the current bounding box. A boundary pair can include a left-right boundary pair, a top-bottom boundary pair, or other pair of boundaries of a bounding box. A boundary pair can be shifted until at least one boundary of the boundary pair intersects with or aligns with a foreground pixel of the current merged blob (as identified by the palette index value assigned to the current merged blob).

Figure 16:
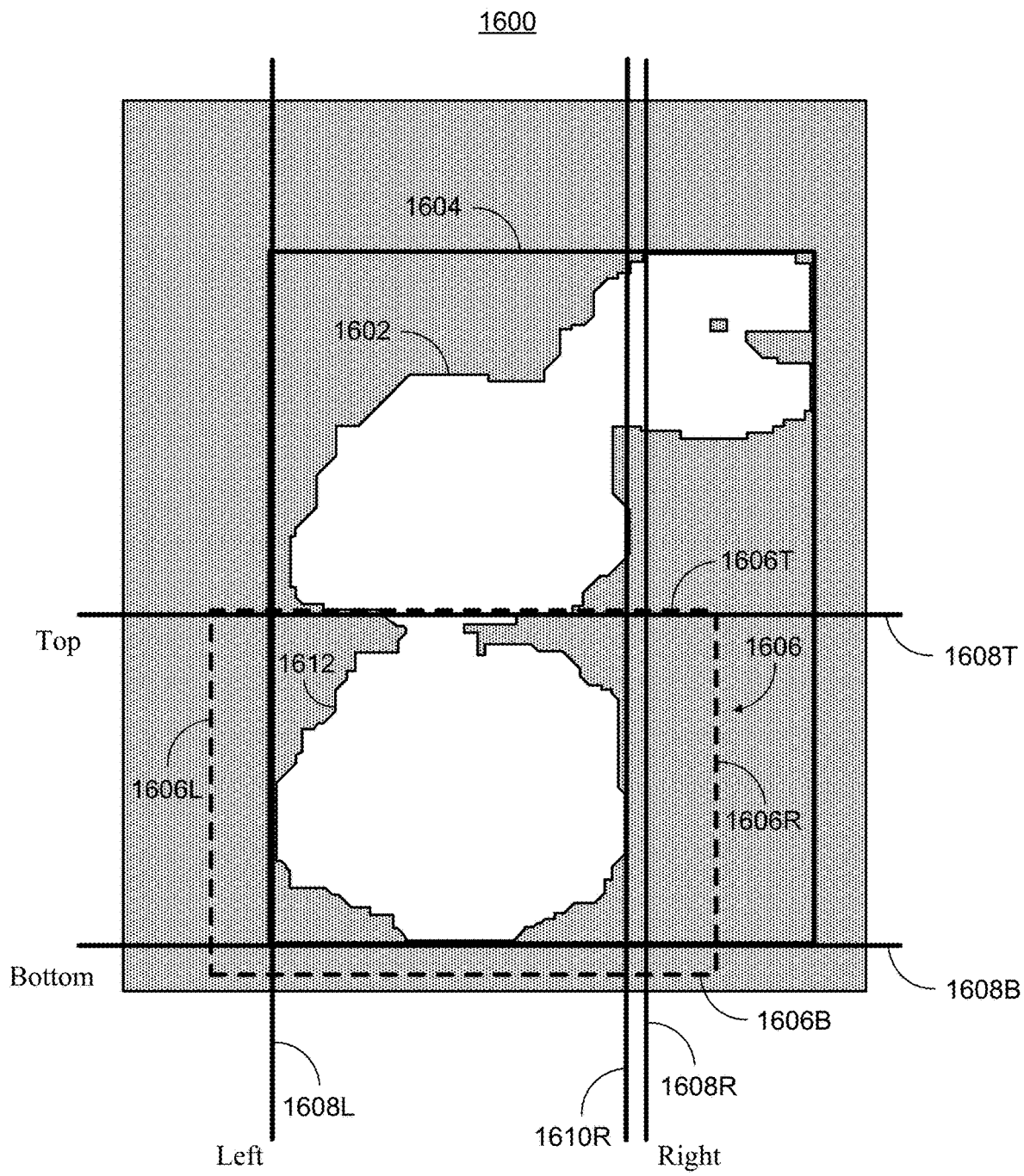
FIG. 16 is a diagram of a cropped foreground mask illustrating an example of application of the shape adaptation process, in accordance with some examples.

FIG. 16 shows an example of a cropped portion of a palette foreground mask 1600 illustrating an application of the initial shape adaptation. The foreground mask 1600 is cropped to show a merged blob 1602 and the container bounding box 1612 of the merged blob 1602. The initial shape adaptation can adjust the shape of a bounding box 1606 associated with the merged blob 1602 in order to adapt to the shape of the merged blob 1602. As included in the preliminary merge association and thus before shape adaptation, the bounding box 1606 includes a top boundary 1606T, a bottom boundary 1606B, a right boundary 1606R, and a left boundary 1606L. The final shape adjusted boundaries of the bounding box 1606 are shown as shifted top boundary 1608T, shifted bottom boundary 1608B, shifted right boundary 1608R, and shifted left boundary 1608L.

To adjust the shape of the bounding box 1606, the shape adjustment engine 1234 can start from a boundary pair of the bounding box and can shift at least one boundary of the boundary pair towards the center of the bounding box 1606. In one example, the initial shape adaptation can apply first for a left-right boundary pair (including right boundary 1606R and left boundary 1606L), and can then similarly apply for a top-bottom boundary pair (including top boundary 1606T and bottom boundary 1606B). Alternatively, the initial shape adaptation can apply first for the top-bottom boundary pair and then for the left-right boundary pair. In some examples, both boundary pairs can be adjusted at the same time in parallel.

In some examples, the initial boundary locations of each boundary of a boundary pair can be used to determine whether both boundaries need to be shifted towards the center, whether just one boundary of the boundary pair needs to be shifted, or if neither boundary of a boundary pair needs to be shifted. For instance, if none of the boundaries of a boundary pair (in their initial locations before being shifted) initially intersect with a foreground pixel, both boundaries will be shifted. In another example, if one boundary of a boundary pair initially intersects with a foreground pixel in its initial location and the other boundary of the boundary pair does not initially intersect with a foreground pixel, only the boundary that does not cover any foreground pixel of the merged blob is shifted towards the center. If both boundaries of a boundary pair initially intersect with a foreground pixel of a merged blob in their initial locations, the boundary pair does not need to be shifted, as the boundary pair of the bounding box is already conformed to the width and/or height of the merged blob.

Referring to FIG. 16, both the left boundary 1606L and the right boundary 1606R of the left-right boundary pair (in its initial shape) are not initially intersecting with a foreground pixel of the merged blob 1602. In such a situation, the left boundary 1606L and the right boundary 1606R are both adjusted toward the center of the bounding box 1606 until at least one of the boundaries 1606L and 1606R intersects with a foreground pixel of the merged blob 1602. Shifting of a boundary or a boundary pair can be an iterative process. For example, at each iterative step, each boundary that is allowed to be shifted (based on whether the initial locations of the boundaries intersect with a foreground pixel of the merged blob 1602) can be shifted one pixel. In other examples, each boundary can be shifted by more than one pixel at a time. Once a shifted boundary of a boundary pair intersects a foreground pixel, the initial shape adaptation process can stop for the boundary pair. For example, the right boundary 1606R and the left boundary 1606L are both shifted until the shifted left boundary 1608L intersects a foreground pixel of the merged blob 1602, as shown in FIG. 16. A foreground pixel of the merged blob 1602 can be identified (to determine whether a boundary has intersected with a foreground pixel of the merged blob 1602) using the unique palette index value assigned to the merged blob 1602 in the palette foreground mask of the current frame. For example, the boundaries are made up of pixels, and at each shifting iteration, the pixels making up the shifted boundaries can be identified and compared to the unique palette index value of the merged blob 1602. The shifted left boundary 1608L can be determined to include a foreground pixel with a unique palette index value of 5, which can be determined to match the unique palette index value assigned to the merged blob 1602. The initial shape adaptation process ends once the shifted left boundary 1608L contacts a foreground pixel, in which case the shifted right boundary 1608R does not intersect with a foreground pixel of the merged blob 1602.

The top-bottom boundary pair is then checked to determine if the top boundary 1606T or the bottom boundary 1606B initially intersects with a foreground pixel of the merged blob 1602. As shown in FIG. 16, the top boundary 1606T initially covers a foreground pixel of the merged blob 1602 in its initial location, and the bottom boundary 1606B does not initially intersect with a foreground pixel of the merged blob 1602. In such a situation, only the boundary that does not cover any foreground pixel is shifted towards the center. For example, the top boundary 1606T is not shifted, causing the shifted top boundary 1608T to be the same as the top boundary 1606T. Only the bottom boundary 1606B of the top-bottom boundary pair is shifted (e.g., by one pixel per iteration of the process, or by more than one pixel at each iteration) until the shifted bottom boundary 1608B intersects with a foreground pixel of the merged blob 1602.

As can be seen in FIG. 16, the shape adjusted bounding box with shifted top boundary 1608T, shifted bottom boundary 1608B, shifted right boundary 1608R, and shifted left boundary 1608L is adapted to better fit the shape of the merged blob than the initial bounding box with top boundary 1606T, bottom boundary 1606B, right boundary 1606R, and left boundary 1606L. The shape adaptation allows the bounding box 1606 to better conform to the shape of the blob 1612 (within the merged blob 1602) that represents a merged object that will be tracked by the bounding box 1606, allowing the object to be more accurately tracked by the tracking system.

In some examples, a limitation or constraint may be applied on the amount of shifting that is allowed for each boundary pair. For example, the limitation of the shifting amount may be set such that the width (for the right-left boundary pair) and the height (for the top-bottom boundary pair) of the bounding box after the initial shape adaption process will not be changed by more than a maximum shifting threshold P1. The maximum shifting threshold P1 can be set to a percentage of the size (e.g., the width and the height) of the bounding box, such as 10%, 15%, 20%, 25%, or other suitable percentage. For example, the limitation may indicate that the bounding box cannot be reduced in width by more than 25% of the original width of the bounding box, and that the height cannot be reduced by more than 25% of the original height of the bounding box.

Returning to FIG. 15, if a tracker is not identified in the current preliminary merge association at step 1506, or if an identified tracker is not in a merge association of the previous frame at step 1508, a bounding box of the current preliminary merge association will not be modified, and re-association is performed at step 1514 by the re-association engine 1238, as described further below. Such bounding boxes, potentially together with other bounding boxes, may form a modified merge association based on the re-association.

At step 1504, if the current preliminary merge association is determined to match a historical merge group based on the history identification process, position adjustment is applied at step 1512. For example, the position adjustment can apply to change a position of the bounding box, in which case shape adaptation is not applied for the bounding box. The position adjustment engine 1236 can determine whether there is a need to adjust each individual bounding box in the current preliminary merge association that matches a historical merge group. If the position adjustment engine 1236 determines a position of a current bounding box needs to be adjusted, the bounding box is adjusted.

The determination of whether a current bounding box associated with a container bounding box of a merged blob needs to be adjusted can be based on an overlap ratio indicating how much the associated bounding box overlaps with the container bounding box. For example, the overlap ratio can be the size of the intersection (similar to the intersecting region 808 shown in FIG. 8) of the current bounding box ($BB_{current}$) and the merged container bounding box ($BB_{container}$) over the size of the current bounding box. The overlap ratio can be denoted as $$OR = \frac{BB_{current} \cup BB_{container}}{BB_{current}}.$$

The size of a bounding box can include the number of pixels in the bounding box or the width times the height of the bounding box. If the overlap ratio is smaller than (or equal to in some cases) an overlap ratio threshold $T_{SR}$, the position adjustment engine 1236 can determine position adjustment is needed for the current bounding box. The overlap ratio threshold $T_{SR}$ can be set to any suitable value or percentage, such as 0.75 (or 75%), 0.8 (or 80%), 0.9 (or 90%), or any other suitable value.

Adjusting the position of the current bounding box can keep the width and height of the bounding box unchanged while shifting the center of the bounding box from a first initial position to a second adjusted position. For example, the position adjustment engine 1236 can determine whether the current bounding box is too far from a boundary (left, right, top, or bottom boundary) of the container bounding box. In one illustrative example, if the overlap ratio is smaller than the overlap ratio threshold, the bounding box is likely at least partially outside of the container bounding box of the merged blob. Once the current bounding box is determined to be too far from one or more boundaries, the bounding box can be shifted to align one or more of the boundaries of the current bounding box with one or more of the boundaries of the container bounding box. For example, the position of the current associated bounding box can be adjusted by shifting the bounding box from outside of the container bounding box so that the entire current bounding box is inside of the container bounding box or is not outside of the container bounding box. The current bounding box is thus pushed back into the container bounding box. For example, the boundary (e.g., the right boundary) of the current associated bounding box that has a largest distance from a corresponding boundary (e.g., the right boundary) of the container bounding box can be shifted so that it is aligned with the corresponding boundary of the container bounding box. In one illustrative example, the distance between the four boundary pairs of an associated bounding box and the container bounding box can be calculated. The four boundary pairs can include the two right boundaries of the two bounding boxes, the two left boundaries of the two bounding boxes, the two top boundaries of the two bounding boxes, and the two bottom boundaries of the two bounding boxes. The boundary pair that has the largest distance between the corresponding boundaries can be determined, and that boundary of the current bounding box can then be adjusted so that it is aligned with the corresponding boundary of the container bounding box. When both boundaries are shifted, these are shifted boundaries. However, in some cases, only one boundary will be shifted, and in such cases, the shifted boundary can be only one of the left, right, top, and bottom boundaries. For example, the shifted boundary can be the one with the largest distance between that specific boundary of the current bounding box and counterpart boundary of the container bounding box.

In some implementations, re-association is performed at step 1514 after shape adaptation is performed at step 1510, after position adjustment is performed at step 1512, when a tracker is not identified in the current preliminary merge association at step 1506, or when an identified tracker is not in a merge association of the previous frame at step 1508. For example, the re-association engine 1238 can re-associate the bounding boxes in the preliminary merge associations 1231 with the container bounding boxes of the merged blobs. The re-association of the tracker bounding boxes and container bounding boxes can be performed due to the adjusted shapes and/or positions of the tracker bounding boxes, since the association process is based on an amount of overlap between tracker bounding boxes and the container bounding boxes of merged blobs. In some implementations, re-association may not be performed, in which case the associations of the preliminary merge associations (with adjusted bounding boxes) can be used as the initial merge associations 1233.

The re-association can be applied in a way that the threshold (which can be referred to as a minimum re-association size ratio or a second size ratio) required for a bounding box to be associated with a merged blob may be made smaller than the minimum size ratio used by the tracker association engine 624 to determine the associations, such that a bounding box can more easily be associated with the container bounding box of the merged blob. For example, the re-association engine 1238 can determine a size ratio of the intersection of the container bounding box and a current tracker bounding box over a size of the container bounding box (denoted as $$SR = \frac{BB_{current} \cup BB_{container}}{BB_{container}}).$$

If the size ratio is larger than a minimum re-association size ratio (or equal to in some cases), the current bounding box and its tracker is associated with the merged blob. Otherwise, if the size ratio is smaller than the minimum re-association size ratio (or equal to in some cases), the current bounding box and its tracker is not associated with the merged blob. The minimum re-association size ratio can be set to any suitable threshold number or percentage that is less than the minimum size ratio used by the tracker association engine 624 (e.g., 0.3, 0.4, 0.5, 0.6, 0.7, or other suitable threshold).

The initial merge associations 1233 are output from the initial shape adaptation system 1230 to the merge association optimization system 1340. The initial merge associations 1233 include the shape and/or position adjusted bounding boxes and the merged blobs the adjusted bounding boxes are associated with. In some cases, when re-association is performed, the initial merge associations 1233 also include update merge associations based on the re-association process. The merge association optimization system 1340 can then perform merge association optimization at step 1516 using the initial merge associations 1233. The merge association optimization can include an optimized shape adaptation process 1518 and an Area Movement Optimization (AMO) process 1520. The AMO process 1520, as described in more detail below, can include a normal AMO process (location adjustment) and a scaling AMO process (size and location adjustment). An example of the AMO process 1920 is described below with respect to FIG. 19.

Figure 17:
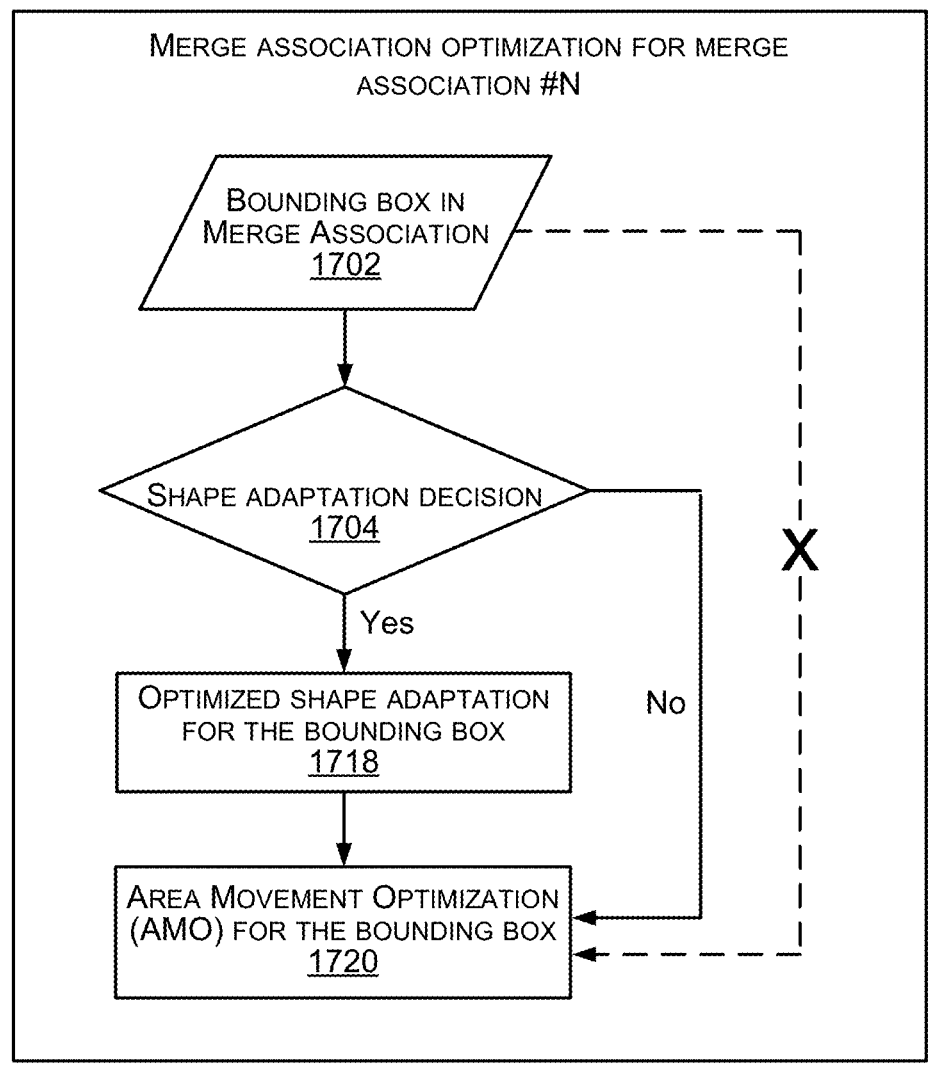
FIG. 17 is a flowchart illustrating an example of a merge association optimization process, in accordance with some examples.

FIG. 17 is a flowchart illustrating an example of the merge association optimization process 1716 for a current merge association (merge association # N). When the initial merge associations 1233 are fed into merge association optimization system 1340, the optimized shape adaptation engine 1341 can make a shape adaptation decision to decide, for each bounding box, whether or not optimized shape adaptation will be performed for each bounding box. For example, a current bounding box 1702 in the current merge association # N is processed by the merge association optimization process 1716. As shown by the dotted line with the "X" through it, the current bounding box 1702 is not fed directly to the AMO process 1720, but is instead first analyzed by the optimized shape adaptation engine 1341.

At step 1704, a shape adaptation decision is made by the optimized shape adaptation engine 1341 to determine whether optimized shape adaptation will be applied to the current bounding box. The shape adaptation decision can be based on information in the current frame as well as temporal information. For example, a current bounding box being processed can be shape adjusted using the optimized shape adaptation when the current bounding box was shape adapted in a previous frame (using either initial shape adaptation or optimized shape adaptation in the previous frame). In another example, the shape adaptation decision can be considered as failed for a current bounding box (no optimized shape adaptation will be performed) if no historical merge group is identified for the current merge association for which the current bounding box belongs. In another example, a size of the current bounding box can be considered when determining whether to perform optimized shape adaptation on the current bounding box. For instance, only bounding boxes that are small enough can be considered as eligible for the optimized shape adaptation process.

Figure 18:
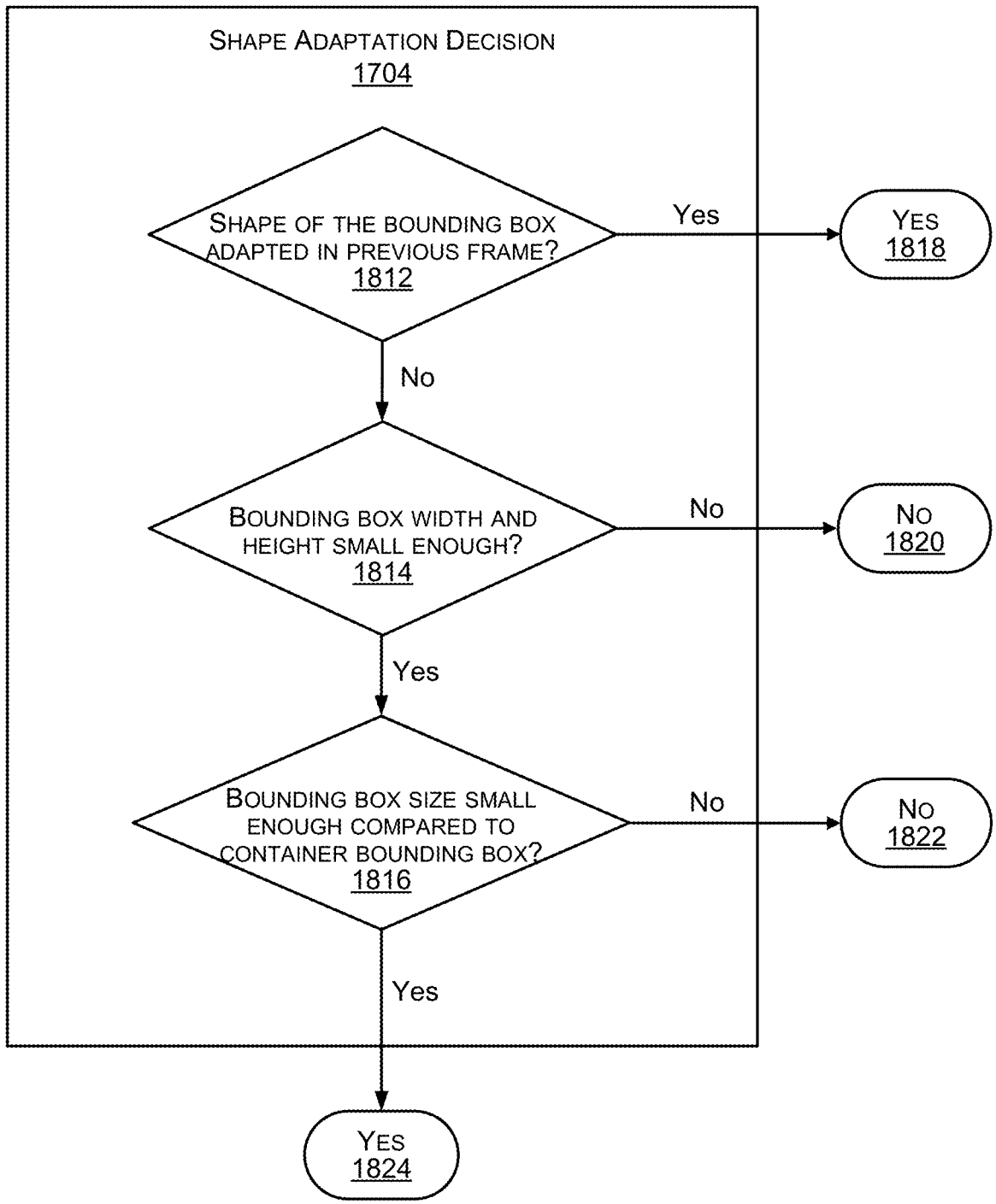
FIG. 18 is a flowchart illustrating an example of a shape adaptation decision process, in accordance with some examples.

FIG. 18 is a flowchart illustrating an example of the shape adaptation decision process 1704. At step 1812, the shape adaptation decision process 1704 determines whether the shape of the current bounding box was adapted in a previous frame (e.g., the frame immediately before the current frame, or another previous frame). If the shape of the current bounding box was adapted in the previous frame, the shape adaptation decision process 1704 determines that shape adaptation will be applied to the current bounding box in the current frame (as shown by the "Yes" decision 1818). For example, if in the previous frame, the corresponding bounding box is already determined to be "shape adapted" after passing a similar process, the current bounding box follows the same decision (returning a "Yes" decision 1818). The shape adaptation decision process 1704 can follow the same decision from a previous frame since the size of the bounding box has already been determined to be small enough at steps 1814 and 1816 for the previous frame.

In the event the shape of the current bounding box is determined (at step 1812) to not have been adapted in the previous frame, the process 1704 can determine whether the current bounding box is small enough. For example, at step 1814, the process 1704 can determine whether the bounding box width and height are small enough. For example, the optimized shape adaptation engine 1341 can compare the width and the height to a size threshold L to determine whether the width and height are small enough for optimized shape adaptation. The size of the width and height can be measured as a number of pixels, a length, or any other suitable measurement. The size threshold L can be any suitable maximum size, such as 5, 7, 10, or other suitable maximum size. The width and height can be individually compared to the size threshold L, or together as an area of the bounding box (width×height). For example, the area of the bounding box can be determined by the width times the height of the bounding box, and the area can be compared to the size threshold L. In another example, the width of the bounding box can be compared to the size threshold L, and the height can separately be compared to the size threshold L. When the width and height are compared individually, the size threshold for the width can be the same or can be different than the size threshold for the height.

If the current bounding box is small enough in terms of both width and height, as compared to the size threshold L, the shape adaptation decision process 1704 determines at step 1816 whether the bounding box is relatively small enough in terms of its size compared to the merged blob it is associated with. For example, the optimized shape adaptation engine 1341 can compare a ratio of the size of the current bounding box over a size of the container bounding box of a merged blob (denoted as $$R = \frac{BB_{current}}{BB_{container}})$$

to a size ratio threshold to determine whether the size of the bounding box relative to the size of the container bounding box is small enough for optimized shape adaptation. The size ratio threshold can be set to any suitable maximum number or percentage, such as 0.05 (5%), 0.1 (10%), 0.125 (12.5%), 0.15 (15%), 0.20 (20%), or any other suitable number or percentage. If the ratio R of the size of the current bounding box over the container bounding box is smaller than the size ratio threshold (or equal to in some cases), the shape adaptation decision process 1704 determines that shape adaptation will be applied to the current bounding box (as shown by the "Yes" decision 1824). In one illustrative example, if the ratio R is smaller than 0.125, the shape adaption decision returns a "Yes" decision 1824.

If the current bounding box is small enough in terms of both width and height (as compared to the size threshold L), and the bounding box is relatively small in terms of its size compared to its associated blob (as compared with the size ratio threshold), the shape adaption decision returns a "Yes" decision 1824. In other cases, the optimized shape adaptation is not performed for the current bounding box. For example, if the current bounding box height and/or width are not small enough, step 1814 determines that optimized shape adaptation will not be performed for the current bounding box (as shown by the "No" decision at step 1820). If the bounding box is determined to not be small enough in terms of its size compared to its associated blob (e.g., the ratio R is not smaller than the size ratio threshold), step 1816 determines that optimized shape adaptation will not be performed for the current bounding box (as shown by the "No" decision at step 1822).

Returning to FIG. 17, when optimized shape adaptation is determined to be performed for a current tracker bounding box (a "Yes" decision by the shape adaptation decision process 1704), optimized shape adaptation is performed for the current bounding box at step 1718 by adjusting one or more boundaries of the bounding box. In some examples, it is implied that the initial (or weak) shape adaptation assumes that the initial bounding box (in its initial location before being shape adjusted) is aligned with the optimization target by center. For example, both boundaries may be adjusted simultaneously by the initial shape adaptation. However, in more challenging cases (e.g., for small objects, for objects that overlap, or other challenging situations), this assumption might not hold. In such cases, in order to further adapt a bounding box, the optimized (or aggressive) shape adaptation can be performed by the optimized shape adaptation engine 1341. The optimized shape adaptation does not adjust boundary pairs, but instead applies for each boundary separately. For example, for each boundary, the optimized shape adaptation engine 1341 checks whether the boundary covers any foreground pixel of a merged blob. In some cases, the unique value within the foreground palette mask assigned to the merged blob can be checked to determine whether a boundary intersects with a foreground pixel of the merged blob. If, for a boundary of the bounding box, the optimized shape adaptation engine 1341 determines that the boundary does not intersect with a foreground pixel of the merged blob, the boundary is shifted towards the center of the bounding box. The boundary can be shifted until the boundary is determined to intersect with a foreground pixel of the merged blob. Otherwise, if the boundary is determined to intersect a foreground pixel of the merged blob in its initial location (before being adjusted by the optimized shape adaptation), the boundary is not adjusted.

Returning to FIG. 16 as an example, the optimized shape adaptation can adjust the shape of the bounding box 1606 associated with the merged blob 1602 to further adapt the bounding box 1606 to the shape of the merged blob 1602. In some examples, optimized shape adaptation can be performed on a current bounding box in addition to the initial shape adaptation that was previously performed on the current bounding box (e.g., at step 1510 of the process 1500). In some examples, the optimized shape adaptation can be performed on a current bounding box even when the initial shape adaptation was not previously performed on the current bounding box (e.g., when a history is identified at step 1504, when an individual tracker is not identified at step 1506, when a merge association is not identified in a merge association of a previous frame at step 1508, or the like).

The initial boundary locations (before optimized shape adaptation is applied) of boundaries of a bounding box can be used to determine whether any of the boundaries need to be shifted towards the center. For example, as noted above, the optimized shape adaptation engine 1341 can check whether a boundary of a bounding box covers any foreground pixel of a merged blob to determine whether to adjust the boundary. As shown in FIG. 16, top boundary 1608T, bottom boundary 1608B, left boundary 1608L, and right boundary 1608R are in their initial locations before optimized shape adaptation is applied. The optimized shape adaptation engine 1341 can check whether the boundaries 1608T, 1608B, 1608L, 1608R intersect with a foreground pixel of the merged blob. As shown in FIG. 16, the boundaries 1608T, 1608B, and 1608L initially intersect with foreground pixels of the merged blob 1602, and thus are not further adjusted by the optimized shape adaptation engine 1341. In the example of FIG. 16, the boundaries 1608B and 1608L intersect with foreground pixels of the merged blob 1602 due to the previous application of the initial shape adaptation described above. The boundary 1608T initially intersect with a foreground pixel of the merged blob and was not adjusted by the initial shape adaptation (as shown by boundary 1606T and 1608T being in a same location). In some examples, as noted above, the optimized shape adaptation can be applied to the boundaries of a bounding box for a current frame even when initial shape adaptation is not applied to the bounding box for the current frame.

The right boundary 1608R is determined not to initially intersect with a foreground pixel of the merged blob 1602. The right boundary 1608R is thus adjusted toward the center of the bounding box 1606 until the right boundary 1608R intersects with a foreground pixel of the merged blob 1602. The right boundary 1608R can be shifted using the iterative process described above with respect to the initial shape adaptation process. For example, at each iterative step, each boundary (that is determined to be shifted) can be shifted one pixel, or can be shifted by more than one pixel at a time. Once a shifted boundary intersects with a foreground pixel, the optimized shape adaptation process can be terminated for that boundary. For example, the right boundary 1608R is shifted until the optimized shifted right boundary 1610R intersects with a foreground pixel of the merged blob 1602, as shown in FIG. 16. A foreground pixel of the merged blob 1602 can be identified (to determine whether a boundary has intersect with a foreground pixel of the merged blob 1602) using the unique palette index value assigned to the merged blob 1602 in the palette foreground mask of the current frame. For example, the boundaries are made up of pixels, and at each shifting iteration, the pixels making up the shifted boundaries can be identified and compared to the unique palette index value of the merged blob 1602. The shifted right boundary 1610R can be determined to include a foreground pixel with a unique palette index value of 5, which can be determined to match the unique palette index value assigned to the merged blob 1602. The initial shape adaptation process ends once the shifted right boundary 1610R contacts a foreground pixel.

As can be seen in FIG. 16, the optimized shape adjusted bounding box with top boundary 1608T, bottom boundary 1608B, optimized shifted right boundary 1610R, and left boundary 1608L conforms to the shape of the merged blob 1602. The optimized shape adaptation (alone or in combination with the initial shape adaptation) allows the bounding box 1606 to better conform to the shape of the blob 1612 (within the merged blob 1602) that represents a merged object that will be tracked by the bounding box 1606, allowing the object to be more accurately tracked by the tracking system.

In some examples, a limitation or constraint may be applied on the amount of shifting that is allowed to be performed by optimized shape adaptation engine 1341 for each boundary. For example, the limitation of the shifting amount may be set to a certain percentage (P2%) of the initial width (before being adjusted by optimized shape adaptation) for each bounding box and/or of the initial height (before being adjusted by optimized shape adaptation) for each bounding box. The maximum shifting threshold P1 can be set to a percentage of the size (e.g., the width and the height) of the bounding box, such as 10%, 15%, 20%, 25%, or other suitable percentage. For example, the limitation may indicate that the bounding box cannot be reduced in width by more than 25% of the initial width of the bounding box. In another example, the limitation may indicate that the height of the bounding box cannot be reduced by more than 25% of the initial height of the bounding box. In another example, the limitation may limit the adjustment of the bounding box so that it cannot be reduced in width by more than 25% of the initial width of the bounding box and cannot be reduced in height by more than 25% of the initial height of the bounding box.

In some implementations, the modified bounding box resulting from the optimized shape adaptation (at step 1718) is provided as input to the Area Movement Optimization (AMO) process 1720. In such implementations, the AMO process 1720 might be performed to modify the location of the current shape-adapted bounding box (and in some cases position-adapted when step 1512 is performed) using normal AMO and/or to scale the size of the adapted bounding box using scaling AMO.

In other implementations, the AMO process 1720 may not be performed for the current bounding box if shape adaptation is performed for the current bounding box (using initial shape adaptation, optimized shape adaptation, or both initial and optimized shape adaptation). For example, the AMO process 1720 may not further scale and/or move the location of a bounding box that has gone through the optimized shape adaptation (and in some cases, the initial shape adaptation). In one illustrative example, after shape adaptation applies to a bounding box (due to the results of shape adaptation decision at step 1704), the AMO process 1720 can disable the current bounding box from being further aligned to the boundary of the container blob (as described in the AMO process discussed below, such as with respect FIG. 22A-FIG. 22B), in which case the movement for such a bounding box is considered to be zero. For instance, the movement for such a bounding box is considered to be zero and the AMO process 1720 will not change the position (and in some cases, the scale) of a bounding box that has been shape adapted. In some cases, the AMO process 1720 may not be performed because, when the associated bounding box is small enough for the optimized shape adaptation to apply, the scaling of the scaling AMO might not be effective for such a small sized bounding box. For example, a non-integer value may be output for the bounding box after scaling is performed, and the non-integer value may have to be rounded up or down to make the bounding box have an integer size, in which case the scaling may be ineffective. In some cases, the AMO process 1720 may not be performed because, when a bounding box is small, it may continue getting smaller, and the blob it is tracking may be absorbed into the background by the background subtraction process.

When optimized shape adaptation is determined not to be performed for a current bounding box (a "No" decision by the shape adaptation decision process 1704), the current bounding box is fed directly to the AMO process 1720. For example, the current bounding box can be fed directly to the history identification engine 1332 so that the AMO process 1720 can be performed (e.g., normal AMO or scaling AMO) for the current bounding box. The AMO process 1720 is described further below with respect to FIG. 19.

The merge association optimization system 1340 can perform the AMO process 1720 to optimize bounding boxes of one or more of the initial merge associations 1233 received for a current frame or, when optimized shape adaptation is performed, to optimize shape-adapted bounding boxes of one or more of the initial merge associations 1233. The AMO process 1720 can be performed to accommodate changes in location (or position) and size of the objects merged within a merged blob. For example, for a current frame being processed by the merge association optimization system 1340, an initial merge association can be adjusted by modifying a location of one or more of the associated bounding boxes, a size of one or more of the associated bounding boxes, or a combination of location and size of one or more of the associated bounding boxes. In some cases, an existing historical merge group may be updated by identifying and appending a merge association (after the associated bounding boxes are modified by the merge association optimization system 1340) to the existing historical merge group. In some cases, a new historical merge group can be created, as described in more detail below.

In some implementations, the merge association optimization system 1340 operates under one or more rules or constraints. For example, the merge association optimization system 1340 may operate under a first rule (or constraint) that provides simplicity and accuracy for the merge association optimization. The first rule can be used for handling changing object sizes for a merge (multiple objects and associated trackers merged into a merged blob) having a long time duration. According to the first rule, if an object is getting smaller (e.g., moving away from the camera), a scaling factor may be applied by the size optimization engine 1344 to accommodate for such a change. Scaling the size of an object's tracker bounding box to make it smaller can keep the prediction of the object location (and thus its tracker bounding box) more accurate. Also according to the first rule, if an object is getting bigger (e.g., moving closer to the camera), a scaling factor will not be applied to update the object and make it bigger. Ignoring objects that are turning bigger can be beneficial for the design of the whole video analytics system and algorithm, since it can not only simplify the relevant optimization problem, but can also remove possible temporal noises so that the results become more consistent.

Various motivations are relevant for ignoring the fact that objects are turning bigger when performing the merge association optimization process. For example, if an object is turning bigger (e.g., getting closer to the camera), the original bounding box of the object (as predicted from previous frames without any size change), although kept smaller according to the first rule, will likely be covered by the object because the object is getting bigger but the bounding box is not. Because the object will cover the bounding box as the object gets bigger, no confusion will be introduced to the video analytics system because the bounding box of the object will likely not cover other objects. As another example motivation, merged objects going towards the camera for a long period of time are likely to be split into two blobs by the blob detection system (after background subtraction) since the distance between the bounding boxes of the objects merged into the merged blob can become larger as the objects get closer to the camera. Because of this, the merge association optimization process may become irrelevant since the objects may no longer be merged into a merged blob during blob detection, providing less motivation to consider such a case. Another reason for the first rule is that objects can go infinitely far from the camera, but not infinitely close, in which case a longer merge duration is more likely to happen for cases when the objects within a merged blob are becoming smaller or have a constant size.

The merge association optimization system 1340 may also operate under a second rule (or constraint) that also provides simplicity and accuracy for the merge association optimization. The second rule can be used for handling more accurate positioning of the objects within a blob. According to the second rule, it is assumed for a simple case when two objects are associated with one blob, the optimal solution should have all the boundaries of the blob bounding box aligned with at least one bounding box (to-be predicted) of an containing object. When a blob contains multiple bounding boxes, it is assumed that the blobs are ordered in a way that once a blob is fixed, the remaining boxes formulate the smallest union with the associated blob. This way, a multiple objects problem may be simplified to a two objects problem.

Figure 19:
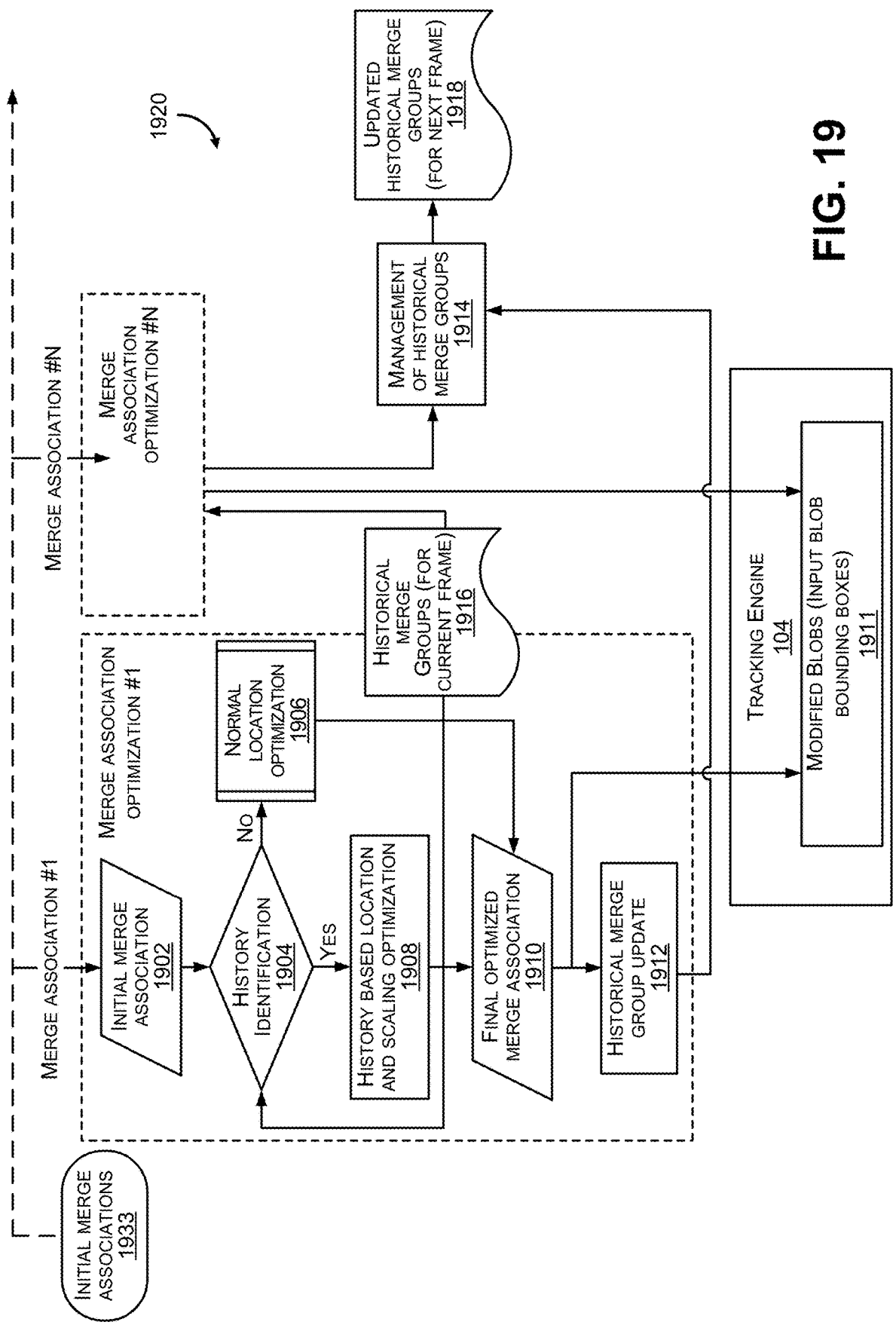
FIG. 19 is a flowchart illustrating an example of a process of optimizing merge associations for merged blobs containing multiple tracker bounding boxes, in accordance with some examples.

The AMO process 1920 performed by the merge association optimization system 1340 will now be described using FIG. 19 as an illustrative example. The AMO process 1920 is performed on each merge association for a current frame that is being processed by the merge association optimization system 1340. For example, the merge association optimization system 1340 can analyze each merge association for each merged blob detected for the current frame. The initial merge associations 1933 (e.g., merge association #1 through merge association # N) are used as input to the process 1920, which generates final optimized merge associations (e.g., including a final optimized merge association 1310). For each detected merged blob, there is an initial merge association and a final optimized merge association. The associated bounding boxes of an initial merge association for a merged blob can include any predicted bounding boxes, such as the shape-adjusted bounding boxes output from the initial and/or optimized shape adaptation processes, the predicted tracker bounding boxes from a previous frame (e.g., derived by a Kalman filter or the like) that are determined to be associated with the merged blob by the tracker association engine 624, the bounding boxes that the blob splitting system 620 determines the merged blob should be split into (e.g., the modified blobs 611), intermediate results of the blob splitting process performed by the blob splitting system 620, or a combination thereof. In some cases, the process 1920 can also use the foreground mask for a current frame as input. As described previously, the foreground mask can include a first value (e.g., a 0 or 1) for background pixels and a different value (e.g., a 1 or 0) for foreground pixels. In such cases, the palette foreground mask is not used for the AMO process 1920.

At step 1904, for a current initial merge association 1902 (one blob and multiple associated bounding boxes), a list of the historical merge groups 1916 (for the current frame) are searched to identify a relevant historical merge group. As noted above, a history identification process can be used to search the historical merge groups 1916 for a historical merge group corresponding to an initial merge association. For example, to perform history identification for the initial merge association 1902, the history identification engine 1332 attempts to match the tracker ID labels of the associated bounding boxes of the initial merge association 1902 with the associated bounding boxes in each historical merge group. A historical merge group from historical merge groups 1916 is identified as corresponding to the initial merge association 1902 if the associated bounding boxes of the historical merge group have the same tracker bounding box IDs as the associated bounding boxes of the initial merge association 1902. Referring back to FIG. 14 as an example, the current initial merge association 1302 can include two associated bounding boxes with tracker IDs equal to 3 and 4, respectively, in which case the historical merge group 1402 would be selected by the history identification engine 1332 as corresponding to the current initial merge association 1302.

The type of AMO optimization that is applied to the current initial merge association 1902 may depend on whether a historical merge group is found for the current initial merge association 1902. An AMO optimization process in this context refers to the possibility of changing the location as well as the size (e.g., width and height) of one or more of the associated bounding boxes of an initial merge association, so as to better accommodate a recent change as reflected by the detected blob, its bounding box, as well as the foreground mask of the current frame. In some cases, if no history is found for the current initial merge association 1902, only the normal location optimization is applied at step 1906 (in which case the size optimization engine 1344 is bypassed). In some cases, the scaling optimization can be performed even when no history is found. The normal optimization can be performed by the location optimization engine 1346. In the event a historical merge group is found for the current initial merge association 1902, the history based location and scaling optimization is applied at step 1908. The history based location and scaling optimization can be performed by the size optimization engine 1344.

The normal location optimization is designed using the second rule (or constraint) described above, and is applied to a given merged blob (also referred to as a container bounding box) as well as two or more initial associated bounding boxes (with initial positions or locations known). In some implementations, the normal location optimization can be implemented using an AMO process that is provided to first maximize the coverage of the foreground pixels within the container bounding box while minimizing the movement of the initial associated bounding boxes, under the condition that the union of all bounding boxes is still equal to the container blob. The AMO optimization is defined as follows:

$$\text{argmax } AMO(B_i | i=0 \ldots n-1) := \{B_i | \cup_{i=0}^{n-1} B_i = B_c, B_i \in B_c\}, \text{ wherein } AMO(B_i | i=0 \ldots n) = \text{Area}(\Sigma_{i=0}^{n-1} B_i) / \text{Area}(B_c) - \lambda(\Sigma_{i=0}^{n-1} \text{Move}(B_i - \overline{B}_i)) \quad \text{Eq. (4)}$$

The initial merge association is denoted with a container bounding box of $B_c$ with n initial associated bounding boxes $\overline{B}_i$ (corresponding to merged objects), with i equal to 0 through n−1, inclusive. The optimized merge association keeps the container blob $B_c$ unchanged, but modifies the bounding boxes $\overline{B}_i$ to $B_i$. The "+" operation of two bounding boxes A and B are defined as a union of the set of pixel locations in A and the set of pixel locations in B. Therefore, $\Sigma_{i=0}^{n-1} B_i$ contains all pixel locations of all bounding boxes $B_i$, i=0 ... n−1. Function Area(PS) returns the number of foreground pixels in the pixel location set PS. Move $(B_i - \overline{B}_i)$ returns the movement of the i-th bounding box from an initial bounding box $\overline{B}_i$ to $B_i$. The portion of equation (4) $\text{Area}(\Sigma_{i=0}^{n-1} B_i)/\text{Area}(B_c) - \lambda(\Sigma_{i=0}^{n-1} \text{Move}(B_i - \overline{B}_i))$ is denoted as the AMO accuracy for simplicity.

Equation (4) defines the argmax of the AMO accuracy function, providing points of the domain ($B_i | i=0 \ldots n$) of the AMO accuracy function at which the AMO achieves its maximized value, under the condition ($\cup_{i=0}^{n-1} B_i = B_c$) that the union of all bounding boxes is still equal to the container bounding box. Accordingly, the optimized modified bounding box locations ($B_i$) for the associated bounding boxes ($\overline{B}_i$) within the container bounding box ($B_c$) are determined, while satisfying the condition that the union of all final, optimized bounding boxes is equal to (or approximately equal to, as discussed below) the container bounding box.

The condition $\cup_{i=0}^{n-1} B_i = B_c$ can be approximated to $\cup_{i=0}^{n-1} B_i \approx B_c$, in which case the union of all final, optimized bounding boxes does not have to be equal to the container bounding box $B_c$, but instead may be approximately equal to $B_c$. The union of the optimized bounding boxes can be determined to be approximately equal to $B_c$ if the union has an intersecting region with $B_c$ with a very large percentage. In one illustrative example, the union of the optimized bounding boxes can be determined to be approximately equal to $B_c$ if $I = \cup_{i=0}^{n-1} B_i \cap B_c$ and size(I)/size ($B_c$)>T, with I denoting the intersection, size(x) denoting the size of input x, and T denoting a minimum intersection threshold. In some cases, the size of a bounding box is defined as its width multiplied by its height. The units of such width and height can be a length, a number of pixels, or any other suitable unit. The minimum intersection threshold T can be any suitable value, such as a value close to 1 (e.g., 0.8, 0.85, 0.9, or other suitable value).

Figures 20A, 20B:
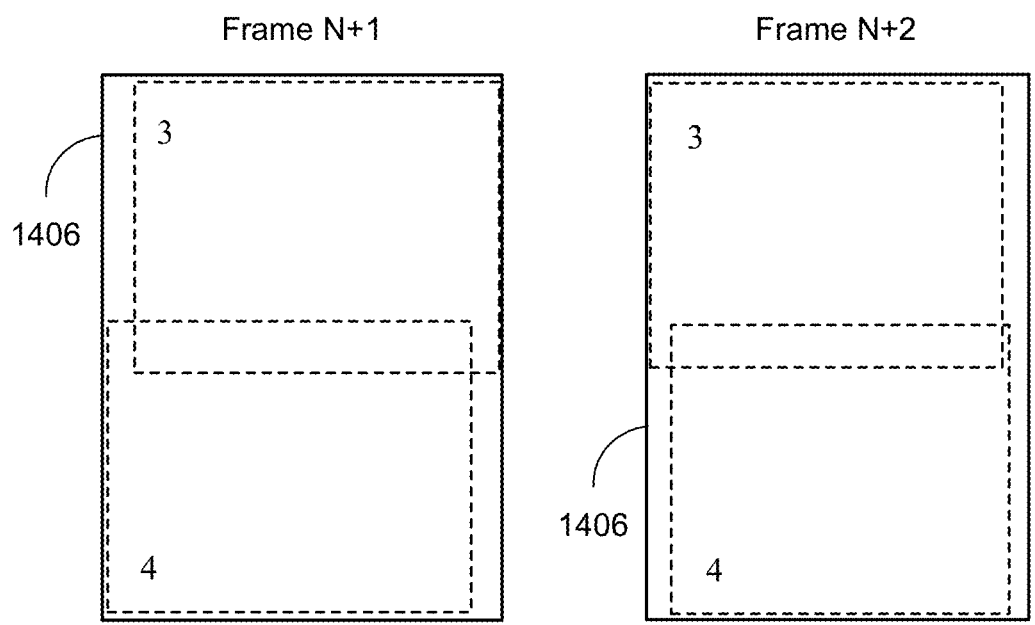
FIG. 20A and FIG. 20B are diagrams illustrating examples of merge associations for a merged blob in consecutive frames, in accordance with some examples.

A motivation of tolerating approximation of the condition is to accommodate the case when one bounding box has its status of aligning with one boundary (in a previous frame) changed to the status of aligning with a different boundary (in the current frame), an example of which is shown in FIG. 20A and FIG. 20B. FIG. 20A and FIG. 20B illustrate tracker bounding boxes with tracker IDs 3 and 4 associated with the container bounding box 1406 in Frames N+1 and N+2 from the historical merge group 1402 shown in FIG. 14. As shown, the associated bounding box 3 is aligned with the right boundary of the container bounding box 1406 in frame N+1, while the bounding box 3 is aligned with the left boundary of the container bounding box 1406 in frame N+2. Furthermore, the associated bounding box 4 is not aligned with the right boundary of the container bounding box 1406 in frame N+2, which may prevent the strict condition $\cup_{i=0}^{n-1} B_i = B_c$, from being satisfied since the union of bounding boxes 3 and 4 may not fully overlap the container bounding box 1406.

In some implementations, the AMO of a merge association for multiple objects can be realized in a recursive manner, in which case the AMO problem is firstly solved when n is equal to 2: argmax AMO($B_i | i=0, 1$). Such an AMO is referred to herein as a 2-order AMO. For each merged blob (a container bounding box), an optimal bounding box $\overline{B}_J$ is chosen so that the union of the size of remaining bounding boxes is minimized. The minimized union bounding box is denoted as $\overline{A_1}$ and the optimal bounding box $\overline{B}_J$ is denoted as $\overline{A_0}$. Using such denotations, the 2-order AMO optimization problem is first solved for argmax AMO($A_0, A_1$):=($A_i | \cup_{i=0}^{1} A_i = \{B_c, A_i \in B_c\}$. After the 2-order AMO is resolved, the remaining AMO problem is solved for argmax AMO($B_i | i=0 \ldots n-1, i \neq j$):={$B_i | \cup_{i=0, i \neq j}^{n-1} B_i = B_c, B_i \in A_1$}, which is the optimization for the remaining associated bounding boxes (excluding the optimal bounding box $\overline{B}_J$, as denoted by i=0, i≠j).

An example of recursive AMO is shown in FIG. 21A-FIG. 21C. As shown in FIG. 21A, the initial input to the AMO is an initial merge association, including the container bounding box 2102 (of a merged blob), the associated bounding box 2104, the associated bounding box 2106, and the associated bounding box 2108. In some implementations, the foreground mask for the current frame can also be used (e.g., as a reference point for the locations or positions of the bounding boxes relative to the detected blobs). The first step of the recursive AMO is done with a 2-order AMO, with the input including an optimal bounding box $\overline{B}_J$ and one bounding box that is a union of two smaller bounding boxes. As noted above, the optimal bounding box $\overline{B}_J$ is chosen so that the union of the size of remaining bounding boxes is minimized. For example, the optimal bounding box $\overline{B}_J$ may be defined in a way that the union of the remaining associated bounding boxes has the smallest size. Referring to FIG. 21B and FIG. 21C, the union of the bounding box 2106 and the bounding box 2108 (shown as combined bounding box 2110 in FIG. 21C) provide the smallest size union among the possible unions between bounding boxes 2104 and 2106, between bounding boxes 2104 and 2108, and between bounding boxes 2106 and 2108. Because the union between the bounding boxes 2106 and 2108 provides the smallest size union among the possible unions, bounding box 2104 is selected as the optimal bounding box $\overline{B}_J$. Any other suitable technique for selecting the optimal bounding box can also be performed. For example, the associated bounding box with the largest intersection region (e.g., similar to intersecting region 808 in FIG. 8) with the container bounding box 2102 can be defined or selected as the optimal bounding box. In another illustrative example, the associated bounding box having highest size ratio (ratio of the intersection of the container bounding box and associated bounding box over a size of the container bounding box) can be defined or selected as the optimal bounding box. According to any of these illustrative techniques, the associated bounding box 2104 would be selected as the optimal bounding box.

The optimal bounding box 2104 and the minimized union bounding box 2110 are used as input to the 2-order AMO. The 2-order AMO provides the optimized bounding box position of the optimal bounding box 2104 (the largest bounding box) as well as the optimized bounding box position of the union bounding box 2110 (the union of the remaining bounding boxes associated with the merged blob). After the 2-order AMO is resolved, a new 2-order AMO can be applied to optimize the remaining bounding boxes associated with the merged blob, in which case the container blob (and bounding box) can be equal to the union of remaining bounding box. For example, the new container bounding box is the bounding box 2110, and the two associated bounding boxes input to the AMO are the bounding box 2106 and the bounding box 2108.

In some examples, the 2-order AMO can be solved by checking possible candidate positions of an associated bounding box within the container blob (the merged blob). For each initial bounding box $\overline{B}_i$, a certain number of vertical and horizontal positions are defined and the size of the optimized bounding box $B_i$ is the same size as that of $\overline{B}_i$. In one illustrative example, three possible vertical positions and three possible horizontal positions are possible and the optimized bounding box $B_i$ is with the same size as that of $\overline{B}_i$. FIG. 22A-FIG. 22B illustrate an example of candidate positions for an associated bounding box within a container bounding box of a merged blob. The initial bounding box 2204 is shown at its initial position within the container bounding box 2202. As shown in FIG. 22A, the candidate positions of the initial bounding box 2204 may include the bounding box aligned towards the left boundary of the container bounding box (shown as candidate position 2208), aligned towards the right boundary (shown as candidate position 2210), aligned towards the top boundary (shown as candidate position 2206), and aligned towards the bottom boundary (shown as candidate position 2212). As shown in FIG. 22B, the candidate positions of the initial bounding box 2204 may include the bounding box aligned with corners of the container bounding box, including the top-left corner (shown as candidate position 2214), the top-right corner (shown as candidate position 2216), the bottom-right corner (shown as candidate position 2218), and the bottom-left corner (shown as candidate position 2220). Using the example of FIG. 22A-FIG. 22B, nine candidates may be used to calculate the 2-order AMO for each associated bounding box $\overline{B}_i$, i=0, 1. One of ordinary skill will appreciate that one or more of the possible candidate positions can be used, such as only the candidate positions shown in FIG. 22A, only the candidate positions shown in FIG. 22B, all of the candidate positions shown in FIG. 22A and FIG. 22B, or any combination of the candidate positions shown in FIG. 22A and FIG. 22B. A potential candidate bounding box for use as an optimized bounding box $B_i$ is denoted as $B_i'$. Each of the candidate positions can be input into the AMO equation (4) to determine which candidate position maximizes the AMO function.

In some implementations, an early termination may apply to exclude some candidate bounding boxes from being tested. Candidate bounding boxes can be excluded so that there is no need to access the foreground mask image, which can reduce complexity. In some examples, the distance between an initial associated bounding box $\overline{B}_i$ and its candidate bounding box $B_i'$ is used to determine whether to use the candidate bounding box in the AMO calculation or to exclude the candidate from being used. The distance between an initial associated bounding box $\overline{B}_i$ and its candidate $B_i'$ is denoted as $d_i'$. If the distance $d_i'$ is larger than a threshold distance, the candidate will not be considered as a final candidate, and can be terminated from the process of calculating AMO for the current merged blob. In some examples, the threshold distance is equal to the diagonal length of the initial associated bounding box $\overline{B}_i$.

The term Move $(B_i - \overline{B}_i)$ is the movement from the position of the initial bounding box $\overline{B}_i$ to the position of the optimized bounding box $B_i$. In some cases, the term Move $(B_i - \overline{B}_i)$ can be defined as $d_i / diag_i$, wherein $d_i$ is the distance between $\overline{B}_i$ to $B_i$. Since the bounding boxes $\overline{B}_i$ and $B_i$ are the same size, the distance $d_i$ between two bounding boxes $\overline{B}_i$ and $B_i$ can be defined as the distance between any two corresponding points on the two bounding boxes $\overline{B}_i$ and $B_i$ (e.g., the distance between the centers of the two bounding boxes $\overline{B}_i$ and $B_i$, the distance between the top-left corners of the two bounding boxes $\overline{B}_i$ and $B_i$, or any other two corresponding points). The term $diag_i$ is the length of the diagonal of the initial associated bounding box $B_1$.

In some implementations, the movement Move $(B_i - \overline{B}_i)$ may be further normalized by the number of associated bounding boxes in the AMO problem. In such implementations, Move $(B_i - \overline{B}_i) = d_i / diag_i / n$. For example, in a 2-order AMO, Move $(B_i - \overline{B}_i) = d_i / diag_i / 2$. The term A from equation (4) may be set to any suitable value (e.g., −0.3, −0.5, −0.7, or any other suitable value). In some cases, if there is no historical merge group identified for the current initial merge association, the AMO problem might be more sensitive to the movement, in which case λ may be set to a higher value (e.g., −0.9, −1.0, or other suitable value).

Using the AMO process described above, the normal location optimization (at step 1906 of the process 1920) determines the optimized modified bounding box locations for the associated bounding boxes within the container bounding box of the current initial merge association 1902, while satisfying the condition that the union of the optimized bounding boxes is equal to or approximately equal to the container bounding box.

In order to accommodate the possibility of non-rigid object shapes overtime (e.g., an object changing shape), a history based location and scaling optimization can be performed at step 1910. For example, the history based location and scaling optimization can be applied at step 1908 when a historical merge group is found for the current initial merge association 1902. The history based location and scaling optimization introduces a scaling based optimization that can be accommodated into the AMO problem described above. Accordingly, using the history based location and scaling optimization, both normal optimization and a scaling optimization are performed. The normal optimization shifts the bounding boxes, while scaling optimization further enables the scaling (e.g., shrinking) of the associated bounding boxes, allowing the merge association optimization system 1340 to accommodate the movement of objects overtime. In some examples, the scaling optimization of the history based location and scaling optimization operates according to the first rule, in which case the merge association optimization system 1340 does not scale bounding boxes for objects that are getting bigger (e.g., moving closer to the camera). In some cases, the scaling optimization can scale bounding boxes for objects that are getting bigger.

The history based location and scaling optimization is also referred to herein as scaling AMO. The scaling AMO follows the same AMO problem definition described above, with the initial merge associations being changed (based on the scaling of one or more associated initial bounding boxes $\overline{B}_i$ that are input to the AMO problem). The container blob for the normal AMO problem (location only) is kept the same for the scaling AMO. Each associated initial bounding box $\overline{B}_i$ is firstly scaled by a scaling factor, with the center location of the initial bounding box $\overline{B}_i$ being unchanged. A scaled associated bounding box is denoted as $\overline{B}_i$.

The scaling factor is calculated according to the historical container blob size of the historical merge group (the historical size of the container bounding box) and the size of the current container blob (the size of the container bounding box in the current frame). For example, an initial scaling measurement can be calculated based on the first merge association in the historical merge group (corresponding to the current initial merge association). A current scaling measurement can be calculated based on the current initial merge association. The initial scaling measurement and the current scaling measurement can be calculated using the same information. The initial scaling measurement can be denoted as ism, and the current scaling measurement can be denoted as csm.

In some examples, the current scaling measurement is set to the be size of the current container bounding box $B_c$ of the merged blob. In some examples, for 2-order AMO, the current scaling measurement is set to be the size of current container bounding box $B_c$ of the merged blob plus the size of an intersected bounding box of two associated bounding boxes. Similarly, the initial scaling measurement can be set to the size of the container bounding box of the merged blob in the first merge association in the corresponding historical merge group, or can be set to the size of the container bounding box in the first merge association plus the size of an intersected bounding box of two associated bounding boxes. In one illustrative example, referring to FIG. 14, the initial scaling measurement can be set to the size of the container bounding box 1406 in frame N, which is the first merge association of the historical merge group 1402. In another illustrative example, referring again to FIG. 14, the initial scaling measurement can be set to the size of the container bounding box 1406 in frame N plus the size of the intersected bounding box 1410, which includes the intersection region between bounding boxes 3 and 4.

The scaling factor (sf) is calculated based on the initial scaling measurement (ism) and the current scaling measurement (csm). A temporary scaling measurement is defined as tsm, which can initially be set as ism. To calculate the scaling factor, the following equation is used:

$$sf = csm/tsm; \text{ if } sf \text{ is smaller than 1, adjust } sf, \text{ and } tsm \text{ is set equal to } tsm*sf \qquad \text{Eq. (5)}$$

To adjust the scaling factor (sf), the size optimization engine 1344 may be configured so that the scaling factor is not set too aggressively, especially when there is noise (of container blob sizes) and objects are merging very fast. For example, the scaling factor can be adjusted as follows: sf=MAX(sf, $T_s$), and the minimum scaling factor threshold ($T_s$) may set to a high value (e.g., 0.95, 0.96, 0.97, 0.98, or the like). In one illustrative example, if the scaling factor is greater than or equal than 1 (e.g., 1.1, 1.2, or the like), the scaling factor is ignored and no scaling is applied by the size optimization engine 1344. In another illustrative example, if the scaling factor is less than 1, the size optimization engine 1344 can determine if the scaling factor is too small (in which case the scaling is too much). For instance, whether the scaling factor is too small can be based on the minimum scaling factor threshold ($T_s$). If the scaling factor is determined to be too small (e.g., sf<$T_s$), the size optimization engine 1344 can adjust the scaling factor to a higher number that can include the value of $T_s$. For instance, if the scaling factor is 0.9, and the minimum scaling factor threshold $T_s$ is 0.95, the scaling factor can be adjusted to 0.95.

A center based scaling can be used to scale the associated bounding boxes and thus adjust the size of the bounding boxes. For example, center based scaling of an initial associated bounding box can be applied to get a scaled associated bounding box $\overline{B}_i$ by keeping the center of the scaled associated bounding box $\overline{B}_i$ as the center of the initial bounding box $\overline{B}_i$, and by setting the width and height of the scaled associated bounding box $\overline{B}_i$ to sqrt(sf) times the width and height, respectively, of the initial associated bounding box. For example, a bounding box with width (W) and height (H) can be scaled to have a scaled width $W_s$ ($W_s$=sqrt(sf)*W) and a scaled height $H_s$ ($H_s$=sqrt(sf)*H). During the scaling process, a rounding process may be applied to convert a floating point value to integer by adding 0.5 to the floating point value and truncating only the integer part.

In some examples, when sf is larger than 1, the history based optimization is simplified by just the normal optimization (according to the first rule noted above). When sf is smaller than 1, it can be assumed that the results of normal AMO is {$B_i$} (with the inputs of $\overline{B}_i$) and the results of the scaling AMO is {B} (with the inputs of $\overline{B}_i$), with i equal from 0 through n−1. As described in more detail below, if the AMO accuracy based on {$B_i$} is larger than AMO accuracy based on {$B_i'$}, {$B_i$} is the final results of the history based optimization, otherwise, $\{B_i'\}$ is the final results of the history based optimization. Note that $\{B_i'\}$ are bounding boxes that have been scaled.

In some implementations, once scaling is enabled for a merged blob and its container bounding box, the size optimization engine 1344 applies the scaling to all associated bounding boxes for that merged blob. In other implementations, while the same scaling factor is used, some associated bounding boxes may be bypassed from scaling. For bounding boxes that are bypassed from scaling, $\overline{B}_i$ is equal to $\overline{B}_i$. In one example, the foot distance (or foot position) to the camera is considered for bypassing associated bounding boxes. For instance, the foot distance of an associated bounding box in a current merge association can be compared with its counterpart associated bounding box from the first merge association of the historical merge group. Using FIG. 14 as an example for a current associated bounding box with tracker ID equal to 4, the foot distance of the current associated bounding box can be compared to the foot distance of the associated bounding box 4 in frame N, which is the first merge association of the historical merge group 1402 that corresponds to the current initial merge association. If the foot distance for the current associated bounding box is further as compared with the counterpart associated bounding box (e.g., bounding box 4 in frame N), scaling can be applied. Otherwise, if the foot distance of the current associated bounding box is not farther than the prior counterpart associated bounding box, scaling will not be applied. In one illustrative example, the foot distance of a bounding box can be calculated as the vertical boundary of the bounding box. For instance, a bounding box can have XStart, XEnd, YStart, and YEnd to form a rectangle. The vertical boundary of the bounding box can be defined to be YEnd.

In some implementations, whether scaling AMO is enabled or not can be determined by the history of the container blobs. For example, if the foot distance (or foot position) of the current container bounding box of a merged blob is closer to the foot distance of the first container bounding box (in the historical merge group) for the merged blob (e.g., YEnd of the current container bounding box is larger than YEnd of the first container bounding box, indicating the bounding box is getting larger), the current merge association is not adjusted by scaling AMO, in which case only normal AMO applies.

When simplifying the AMO process by converting the original AMO problem to recursive 2-order AMO problems, the intermediate container blobs that are used to identify the optimal information of remaining bounding boxes may also be scaled. For example, referring to FIG. 21A-FIG. 21C, the bounding boxes 2106 and 2108, or the combined container bounding box 2110, may also be scaled using the scaling techniques described above.

FIG. 23A-FIG. 23C illustrate examples of inputs for normal AMO and scaling AMO processes. An initial merge association is shown in FIG. 23A, including a container bounding box 2302 of a merged blob and the associated bounding boxes 2304, 2306, and 2308. The input for the 2-order AMO process is shown in FIG. 23B, including the container bounding box 2302, the unscaled optimal bounding box 2304 (denoted as $\overline{A}_0$ above), and the unscaled combined bounding box 2310 (denoted as minimized union bounding box $\overline{A}_1$ above). The input for the 2-order scaled AMO process is shown in FIG. 23C, including the container bounding box 2302, the scaled optimal bounding box 2305 (denoted as $\overline{A}_0$ above), and the scaled combined bounding box 2311 (denoted as minimized union bounding box $\overline{A}_1$ above). As can be seen from FIG. 23B and FIG. 23C, the scaled bounding boxes 2305 and 2311 are smaller than their unscaled counterparts 2304 and 2310.

In some examples, the history based location and scaling optimization can compare AMO accuracy of the normal location optimization and the AMO accuracy of the scale optimization (which includes location and scaling adjustments). In such examples, whichever version of AMO provides a better (larger) AMO accuracy, the final merge association providing such accuracy will be the solution of the history based optimization, and will be included in the modified blobs 1911. In some cases, since AMO itself optimizes the bounding box locations of a merge association with a given scaling factor (or with no scaling), the AMO accuracy may not be sufficient to determine whether the scaling AMO or the normal AMO is better.

In some examples, a foreground coverage cost function can be used to determine whether the optimal normal AMO solution is better or the optimal scaling AMO solution is better. For example, for a given merge association, regardless of whether normal AMO or scaling AMO is applied, its foreground coverage cost (FCC) function is calculated to be the number of foreground pixels not covered by the merge association (to be minimized) plus the number of pixels covered by each bounding box that are not foreground pixels (e.g., the number of background pixels). One specific illustrative example of such an implementation is as follows:

a. Derive the merge association region as: $A = \Sigma_{i=0}^{n-1} B_i \cap B_c$. The area A covers all the pixels within the container bounding box $B_c$ that belong to at least one bounding box $B_i$, i from 0 through n–1.

b. Denote parameter NonCoveredPixels as foreground pixels within the container bounding box $B_c$ that are not covered by A.

c. Denote parameter InBoxSize as the sum of the bounding box sizes (of bounding boxes $B_i$).

d. Denote parameter InBoxArea as the sum of foreground pixels covered by each bounding box $B_i$. Note that due to the overlap, InBoxArea is larger than the number of foreground pixels within A.

e. The FCC cost of the merge association for $B_c$ is calculated as NonCoveredPixels+$\lambda$'(InBoxSize–InBoxArea), wherein $\lambda$' can be set to a positive value (e.g., 0.5 or other suitable value), so that the FCC minimize both the number of non-covered foreground pixels and the number of covered background pixels by the merge association.

Using the above implementation example, the FCC of the solution of the normal AMO and the FCC of the solution of the scaling AMO are both calculated. The FCCs are compared, and the one provides the least FCC will be chosen as the final optimal merge association and included in the modified blobs 1911.

Once either the normal location optimization is performed at step 1906 or the history based location and scaling optimization is performed at step 1908, a final optimized merge association 1910 is provided. The final optimized merge association 1910 includes the associated bounding boxes of the initial merge association 1902, but with an adjusted location and/or size. The final optimized merge association 1910 containing the adjusted bounding boxes is included as part of the list of modified blobs 1911 that are to be fed into the tracking engine for tracking the various objects (represented by blobs) for a current frame.

A historical merge group update can be performed at step 1912 by the merge group update engine 1348. For example, the final optimized merge association 1910 is used to update the historical merge group that was determined to correspond to the initial merge association 1902 at step 1904. In some cases, the history can be updated by appending the container blob and all the associated bounding boxes of the final optimized merge association 1910 to the historical merge group. In some implementations, the associated bounding boxes of the final optimized merge association 1910 may need to be ordered so that each index to each list of associated bounding boxes of each time instance identifies a bounding box associated with the same tracker label (for history identification 1904 of future frames).

Management of historical merge groups is performed at step 1914. The merge group update engine 1348 can perform the historical merge group management. In some implementations, two kinds of mechanisms can be used to maintain a historical merge group, including implicit management and explicit management. Both implicit management and explicit management occur after the optimization of a merge association (after the locations and/or sizes of the bounding boxes have been adjusted). The implicit management can be applied to those historical merge groups that could not be matched to any initial merge association. For such a historical merge group, the historical merge group is set to inactive and will be removed (e.g., immediately, after processing of the current frame, or at some other suitable time).

The explicit management contains two steps. The first step is to adaptively merge the bounding boxes 1) that have too much overlap over time, and/or 2) that have too much movement over time. The results of the first step may lead to a lower number of bounding boxes due to bounding boxes being merged together, thus the previously matched historical merge group will not be valid any longer and will need to be set to inactive and removed (e.g., immediately, after processing of the current frame, or at some other suitable time). In one example, two or three bounding boxes can be merged back into one bounding box. In such an example, the container box instead of any associated bounding box within it will be added into the list of modified blobs 1911, resulting in no splitting at all. When N bounding boxes merge into two or more bounding boxes, a new historical merge group is generated. If the first step does not result in merging of bounding boxes, a second step will be applied. The second step includes adding the current merge association into the historical merge group that is found to match the current merge association.

A detailed implementation of management of historical merge groups is now described using pseudo code. The pseudo code of historical merge group management is provided below:

1) Calculate the overlap ratio between the first two bounding boxes of the merge association and denote it as curOverlapRatio as follows
    a) Assume the two bounding boxes are B0 and B1.
    b) If size(B0)>Size(B1), curOverlapRatio=size(B0∩B11)/size(B1), size ratio sizeRatio=size(B0)/Size(B1); otherwise, curOverlapRatio=size(B0∩B1)/size(B0) and size ratio sizeRatio=size(B1)/Size(B0)
    c) Add curRatio into the ratio list hisOverlapRatio.
2) Denote ratio look-up table as LutRatio[3]={0.925, /*2 frames, 95%*/925, 0.825, /*10 frames, 90%*/, 0.725/*30 frames*/}; Denote number of frames-to-confirm as toConfirmedFrames[3]={2, 10, 30}; Denote more frames to confirm as MoreFrames=(sizeRatio−1)*10);
3) A global parameter for the whole historical merge group is denoted as InCreasedAccumutive and can be modified by the remaining steps.
4) For each bounding box Bi in the merge association, the following applies:
    a) Derive the previous horizontal and vertical movement as ePreHor and ePreVer respectively and the current horizontal and vertical movement as eCurHor and eCurVer respectively. Note that the movement is calculated during the process of AMO. For simplicity, it has three values: no_move, move left or top or move_right or bottom.
    b) InCreasedAccumutive is creased by one if all of the following conditions are true:
        i) eCurHor is unequal to ePreHor
        ii) The horizontal movement of the center pixel of the bounding box from the corresponding bounding box in the previous frame and the current bounding box is larger than half of the width of the current bounding box
    c) InCreasedAccumutive is creased by one if all of the following conditions are true:
        i) eCurVer is unequal to ePreVer
        ii) The vertical movement of the center pixel of the bounding box from the corresponding bounding box in the previous frame and the current bounding box is larger than half of the height of the current bounding box
5) Adjust the tables by the parameter InCreasedAccumutive as follows:
    a) Calculate the array lessOverlapRatio as follows:
        i) lessOverlapRatio[0]=InCreasedAccumutive*0.15
        ii) lessOverlapRatio[1]=InCreasedAccumutive*0.15
        iii) lessOverlapRatio[2]=InCreasedAccumutive*0.15
    b) If InCreasedAccumutive is positive and smaller than 3, the following applies
        i) toConfirmedFrames[1]=5
        ii) toConfirmedFrames[2]=10
    c) Otherwise, if InCreasedAccumutive is larger than or equal to 3, the following applies
        i) toConfirmedFrames[1]=1
        ii) toConfirmedFrames[1]=3
        iii) toConfirmedFrames[2]=5
        iv) MoreFrames=0
6) Determine whether the overlap ratio has kept on being larger than a certain threshold for a certain number of frames.

```
iCurIdx =0;
bToMergeLastTwo = false
for (int i = 0; i<duration of the historical merge group; i++, iLastIdx--)
{
    while (hisOverlapRatio[iLastIdx]<(LutPermille[iCurIdx] -
    lessOverlapRatio[iCurIdx]))
    {
        iCurIdx++;
        if (iCurIdx >=3) return false;
    }
    if (i >= (toConfirmedFrames[iCurIdx] + MoreFrames*(iCurIdx+1)))
    {
        return true;
    }
}
return false;
```

If this historical merge group management process returns true, this indicates that at least the first two bounding boxes are to be merged. When the above process returns true, this also indicates that the historical merge group is set to be inactive and removed. Furthermore, if exist other bounding boxes, the other bounding boxes may be further merged or may not be further merged. For example, whether a current bounding box is to be merged or not can be based on the overlap ratio between the already merged bounding boxes (as one bigger bounding box) and the current bounding box. If the process returns false, this indicates no bounding boxes are merged and the merge association will be used to update the matched historical merge group.

FIG. 24 illustrates an example of a process 2400 of splitting one or more merged blobs for one or more video frames using the shape adaptation techniques described herein. At step 2402, the process 2400 includes identifying a merged blob detected for a current video frame. The merged blob includes pixels of at least a portion of at least two foreground objects in the current video frame. At step 2404, the process 2400 includes associating the merged blob with a first blob tracker and a second blob tracker. In one illustrative example, the merged blob and the associated first blob tracker (e.g., a bounding region of the first blob tracker) and second blob tracker (e.g., a bounding region of the second blob tracker) can be included in the preliminary merge associations 1231 (shown in FIG. 12) for the current frame. For example, the first blob tracker bounding region can include a first blob tracker bounding box, and the second blob tracker bounding region can include a second blob tracker bounding box. Any other suitable type of bounding region can be used for the first and second blob tracker bounding regions. For example, the first and second bounding regions can include bounding boxes, bounding circles, bounding ellipses, or any other suitably-shaped region representing the associated trackers.

In some cases, the first blob tracker and the second blob tracker can be part of a plurality of blob trackers that are received from an object tracking operation performed for a previous video frame. For example, the first and second blob trackers can be received as feedback from the object tracking engine, as described above. In one illustrative example, the first and second blob trackers can be part of the preliminary merge associations 1231 (shown in FIG. 12) for the current frame. In some cases, locations of the first and second blob tracker bounding regions in the current video frame, before being adjusted, are based on locations of blobs tracked by the blob trackers for a previous video frame. For example, the first and second blob trackers can include predicted bounding regions of the blob trackers (and the tracker IDs) predicted from the previous frame. The previous frame is obtained before the current frame (e.g., a frame immediately prior to the current frame or a frame earlier in the video sequence).

At step 2406, the process 2400 includes adjusting a shape of the first blob tracker. Adjusting the shape of the first blob tracker includes shifting at least one boundary of a bounding region of the first blob tracker based on the shape of the merged blob. In some examples, adjusting the shape of the first blob tracker includes shifting the at least one boundary of the bounding region of the first blob tracker towards a center of the bounding region of the first blob tracker. For instance, the at least one boundary can be shifted until the at least one boundary intersects with a foreground pixel of the merged blob. Various illustrative examples of adjusting the shape of the first blob tracker are given below.

At step 2408, the process 2400 includes splitting the merged blob into a first blob and a second blob. The first blob is associated with the adjusted bounding region of the first blob tracker and the second blob is associated with a bounding region of the second blob tracker. At step 2410, the process 2400 includes outputting the first blob and the second blob for object tracking for the current video frame. In one illustrative example, the output first blob and second blob can be included in the modified blobs 811 that are provided to a tracking system for performing object tracking for the current frame. The first blob and the second blob replace the merged blob, in which case the first blob and the second blob are used to track the separate objects, while the identified blob is no longer itself tracked as a whole. For example, the identified merged blob is not output for object tracking for the current frame. In some cases, the process 1900 can include obtaining a list of blobs detected for the current frame (the list of blobs include the identified blob), and modifying the list of blobs by including the first blob and the second blob in the list and by removing the identified merged blob from the list. In such cases, the process 1500 can include outputting the modified list of blobs (e.g., modified blobs 811) to the object tracking system, which can use the modified list of blobs to perform the object tracking for the current frame. In some examples, the list of modified blobs that are provided to the object tracking system for performing object tracking for the current frame can include a list of blob bounding regions (e.g., blob bounding boxes), in which case the first blob is represented in the modified list of blobs as the first blob tracker bounding region and the second blob is represented in the modified list of blobs as the second blob tracker bounding region. Using the object tracking techniques described above, the data association engine (e.g., data association engine 414) of the object tracking system can then use the blobs (or blob bounding regions) in the modified list of blobs to associate blob trackers (or tracker bounding regions) with the blobs for object tracking.

In some examples, adjusting the shape of the first blob tracker includes performing a first shape adjustment. The first shape adjustment can include the initial shape adaptation described above. For example, the first shape adjustment can be performed by shifting at least one boundary pair of the first blob tracker towards a center of the bounding region of the first blob tracker. The at least one boundary pair includes the at least one boundary. The at least one boundary pair is shifted until one or more boundaries of the at least one boundary pair intersects with a foreground pixel of the merged blob. In one illustrative example, a foreground pixel of the merged blob can be identified (to determine whether the one or more boundaries have intersected with a foreground pixel of the merged blob) using a unique palette index value assigned to the foreground pixels of the merged blob in a palette foreground mask of the current frame. For example, at each shifting iteration (e.g., one pixel, two pixels, or other number of pixels), pixels of the shifted one or more boundaries can be identified and compared to the unique palette index value assigned to the merged blob. A shifted boundary can be determined to have intersected with a foreground pixel of the merged blob when the shifted boundary includes a foreground pixel with a unique palette index value matching the unique palette index value assigned to the merged blob.

In some examples, the process 2400 includes maintaining a list of historical merge groups. An illustrative example of a historical merge group is described above with respect to FIG. 14. The historical merge groups include associations between merged blobs and blob trackers associated with the merged blobs across one or more previous video frames. The one or more previous video frames are obtained earlier in time than the current video frame. In such examples, the process 2400 further includes searching the maintained list of historical merge groups to identify a historical merge group that corresponds to a preliminary association of the merged blob. The preliminary association includes at least the bounding region of the first blob tracker associated with the merged blob and the bounding region of the second blob tracker associated with the merged blob. In such examples, the process 2400 further includes performing the first shape adjustment when a historical merge group corresponding to the preliminary association of the merged blob is not identified.

In some examples, the at least one boundary pair of the first blob tracker includes at least one or more of a left boundary and a right boundary of the bounding region of the first blob tracker or a top boundary and a bottom boundary of the bounding region of the first blob tracker. For example, a first boundary pair can include the right boundary and the left boundary, while a second boundary pair can include the top boundary and the bottom boundary.

In some examples, the process 2400 includes determining, before the shape of the first blob tracker is adjusted, a first boundary and a second boundary of the at least one boundary pair do not intersect with any foreground pixel of the merged blob. In such examples, shifting the at least one boundary pair includes shifting the first boundary and the second boundary towards the center of the bounding region of the first blob tracker when the first boundary and the second boundary do not intersect with any foreground pixel of the merged blob before the shape of the first blob tracker is adjusted.

In some examples, the process 2400 includes determining, before the shape of the first blob tracker is adjusted, a first boundary of the at least one boundary pair intersects with a foreground pixel of the merged blob. In such examples, the process 2400 further includes determining, before the shape of the first blob tracker is adjusted, a second boundary of the at least one boundary pair does not intersect with any foreground pixel of the merged blob. In such examples, shifting the at least one boundary pair includes shifting the second boundary towards the center of the bounding region of the first blob tracker when the first boundary intersects with the foreground pixel and the second boundary does not intersect with any foreground pixel of the merged blob before the shape of the first blob tracker is adjusted.

In some examples, adjusting the shape of the first blob tracker associated with the merged blob includes performing a second shape adjustment. The second shape adjustment can include the optimized shape adaptation described above. For example, the second shape adjustment can be performed by individually shifting each boundary of the bounding region of the first blob tracker towards the center of the bounding region of the first blob tracker. In such examples, each boundary is shifted until each boundary intersects with a foreground pixel of the merged blob.

In some examples, the process 2400 includes determining that the shape of the first blob tracker was adjusted in a previous video frame. The previous video frame is obtained earlier in time than the current video frame. For example, the previous video frame can capture a scene at an earlier point in time than the current video frame. In such examples, the process 2400 further includes performing the second shape adjustment when the shape of the first blob tracker was adjusted in a previous video frame.

In some examples, the process 2400 includes determining a size of the bounding region of the first blob tracker is less than a size threshold, and performing the second shape adjustment when the size of the bounding region of the first blob tracker is less than the size threshold. The size threshold can include the size threshold L described above. In one illustrative example, the width and the height of the bounding region of the first blob tracker can be compared to the size threshold L to determine whether the width and height are small enough for optimized shape adaptation. The size of the width and height can be measured as a number of pixels, a length, or any other suitable measurement. The width and height can be individually compared to the size threshold L, or can be compared together as an area of the bounding region (width times height).

In some examples, the process 2400 includes determining a size ratio that includes a size of the bounding region of the first blob tracker over a size of a bounding region of the merged blob. The ratio of the size of the bounding region of the first blob tracker over the size of the bounding region of the merged blob can be denoted as $$R = \frac{BB_{current}}{BB_{container}}.$$

In such examples, the process 2400 further includes determining the size ratio is less than a size ratio threshold, and performing the second shape adjustment when the size ratio is less than the size ratio threshold. The size ratio threshold can be used to determine whether the size of the bounding region of the first blob tracker relative to the size of the bounding region of the merged blob is small enough for optimized shape adaptation.

In some examples, the process 2400 includes determining a size of the bounding region of the first blob tracker is less than the size threshold, and determining the size ratio size ratio is less than the size ratio threshold. As noted above, the size ratio includes the size of the bounding region of the first blob tracker over the size of the bounding region of the merged blob. In such examples, the process 2400 further includes performing the second shape adjustment when the size of the bounding region of the first blob tracker is less than the size threshold and when the size ratio is less than the size ratio threshold.

In some examples, a palette foreground mask can be used. For example, in some implementations, the process 2400 includes obtaining a background-foreground mask for the current frame. The background-foreground mask includes a first value assigned to background pixels of the current frame and a second value assigned to foreground pixels of the current frame. For example, a 0 can be assigned to all background pixels, and a 1 can be assigned to all foreground pixels. In another example, a 1 can be assigned to all background pixels, and a 0 can be assigned to all foreground pixels. In such examples, the process 2400 further includes modifying the background-foreground mask by assigning a common value to each foreground pixel of the merged blob. The common value is different than the first value and the second value. The modified background-foreground mask is referred to as a palette foreground mask.

In examples in which the palette foreground mask is used, adjusting the shape of the first blob tracker can include shifting the at least one boundary of the bounding region of the first blob tracker towards a center of the bounding region of the first blob tracker, in which case the at least one boundary is shifted until the at least one boundary intersects with a foreground pixel having the common value.

In some examples, associating the merged blob with the first blob tracker and the second blob tracker includes determining an intersection region between the bounding region of the first blob tracker and a bounding region of the merged blob, and determining a size ratio. The size ratio can include a size of the intersection region over a size of the bounding region of the merged blob. Associating the merged blob with the first blob tracker and the second blob tracker can further include determining the size ratio is greater than a minimum size ratio, and determining the first blob tracker is associated with the merged blob when the size ratio is greater than the minimum size ratio.

In some examples, the process 2400 further includes re-associating the merged blob with the first blob tracker and the second blob tracker after the shape of the first blob tracker is adjusted. The re-association can be performed using a second size ratio that is less than the size ratio. The second size ratio can be the minimum re-association size ratio described above. For example, as previously described, the threshold required for a bounding region to be associated with a merged blob may be made smaller than the minimum size ratio used by the tracker association engine 624 to determine the preliminary associations, in which case a bounding region can more easily be associated with the container bounding region of the merged blob.

In some examples, the process 2400 may be performed by a computing device or an apparatus, such as the video analytics system 100. In some examples, the process 2400 can be performed by the video analytics system 100 shown in FIG. 1. In some examples, the process 2400 can be performed by the initial shape adaptation system 2340 and/or the merge association optimization system 1340 shown in FIG. 13. In some cases, the computing device or apparatus may include a processor, microprocessor, microcomputer, or other component of a device that is configured to carry out the steps of process 2400. In some examples, the computing device or apparatus may include a camera configured to capture video data (e.g., a video sequence) including video frames. For example, the computing device may include a camera device (e.g., an IP camera or other type of camera device) that may include a video codec. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data.

Process 2400 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 2400 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Using the blob splitting methods and systems described above to split certain blobs for a current frame before tracking is performed on the current frame resolves the merging issue with minimal complexity. Furthermore, splitting merged blobs into associated bounding boxes (or other suitable bounding regions) while adjusting the shapes, sizes, and positions or locations of the bounding boxes allows the video analytics system to accurately track objects that are small in size, largely overlapping, changing in size, and that remain merged for long durations.

The proposed techniques can be evaluated in an end-to-end IP camera (IPC) system, wherein the frame level accuracy as well as the object level accuracy are measured by comparing with ground truth. In addition to the overall accuracy, the proposed systems and methods are also able to evaluate the number of merges that happened wherein objects within the merged bounding boxes are actually identified as containing individual bounding boxes in ground truth.

As shown in Table 1 below, the proposed shape adaptation systems and methods are implemented on top of a simple blob splitting technique performed by the blob splitting system 620. The proposed shape adaptation systems and methods are compared with both an anchor technique (which has no splitting of detected merged objects at all) and with examples in which only the simple blob splitting technique described with respect to the blob splitting system 620 is performed. Wrong merge counters, tracking accuracy, true positive rate and false positive rate are used as measurements for comparison. Average numbers of over 40 VIRAT test sequences and 6 IPCVA test sequences are compared and per-sequence results are provided for typical test sequences which include merge events.

As shown in Table 1, a significantly less amount of wrong merge counters are achieved with the proposed shape adaptation systems and methods, while comparable false positive and true positive rates are maintained. Compared with examples in which only the simple blob splitting techniques were performed, the shape adaptation systems and methods are able to more frequently split merged objects and, in addition, significantly increase the tracking rates (e.g., for sequence VIRAT_S_000201_02_000590_000623, ipcva_20150908142345 and VIRAT_S_010208_06_000671_000744).

In addition to the significant improvements from an objective results perspective, the subjective results are also provided, comparing the proposed shape adaptation systems and methods with blob splitting techniques performed using the simple blob splitting combined with the AMO processes described above (when shape adaptation is not used).

TABLE 1

| Method | Sequence (set) | Wrong Merge Counter | Tracking Accuracy | True Positive Rate | False Positive Rate |
|---|---|---|---|---|---|
| Anchor | VIRAT_S_000201_02_000590_000623 | 449 | 0.63 | 0.78 | 0.00 |
| Simple Splitting | VIRAT_S_000201_02_000590_000623 | 292 | 0.65 | 0.78 | 0.00 |
| Shape Adaptation | VIRAT_S_000201_02_000590_000623 | 254 | 0.9969 | 0.7778 | 0 |
| Anchor | ipcva_20150908142345 | 602 | 0.80 | 0.86 | 0.24 |
| Simple Splitting with AMO | ipcva_20150908142345 | 474 | 0.80 | 0.86 | 0.24 |
| Shape Adaptation | ipcva_20150908142345 | 412 | 0.9998 | 0.8636 | 0.2308 |
| Anchor | VIRAT_S_010208_06_000671_000744 | 338 | 0.9983 | 0.8889 | 0 |
| Simple Splitting with AMO | VIRAT_S_010208_06_000671_000744 | 315 | 0.57 | 0.78 | 0.00 |
| Shape Adaptation | VIRAT_S_010208_06_000671_000744 | 284 | 0.9983 | 0.8889 | 0 |
| Anchor | Average IPCVA | 294 | 0.55 | 0.89 | 0.10 |
| Simple Splitting with AMO | Average IPCVA | 242.33 | 0.54 | 0.89 | 0.10 |
| Shape Adaptation | Average IPCVA | 197.3 | 1.0 | 0.9 | 0.1 |
| Anchor | Average VIRAT | 329 | 0.64 | 0.87 | 0.08 |
| Simple Splitting with AMO | Average VIRAT | 277.57 | 0.64 | 0.86 | 0.08 |
| Shape Adaptation | Average VIRAT | 242.9 | 1.0 | 0.9 | 0.1 |

Examples are shown in FIG. 25A-FIG. 27 comparing video sequences for which the shape adaptation process is applied to video sequences for which an anchor method is applied, which does not apply a blob splitting technique. For convenience, the results of the proposed systems and methods and the results of the anchor method are overlaid together, with bounding boxes with labels ending with an "a" showing results of the proposed shape adaptation systems and methods and bounding boxes with labels ending with a "b" showing results of the anchor method.

Figure 25A:
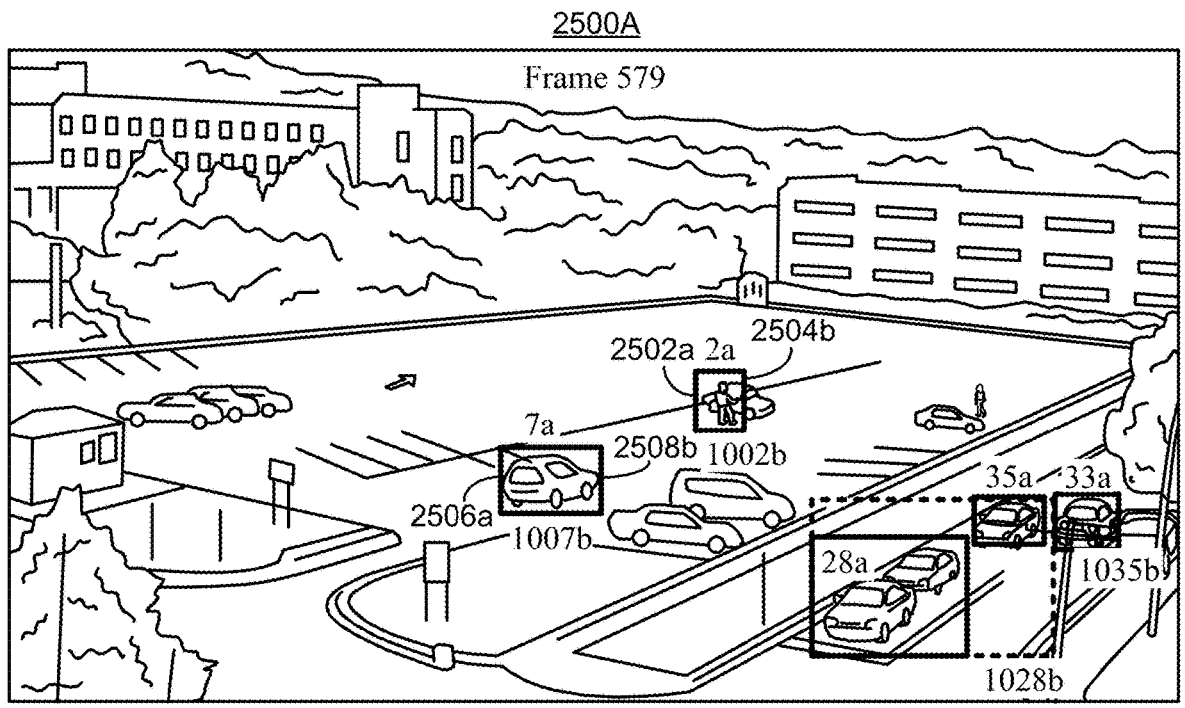
FIG. 25A and FIG. 25B are illustrations of video frames of an environment in which objects are detected, in accordance with some examples.
Figure 25B:
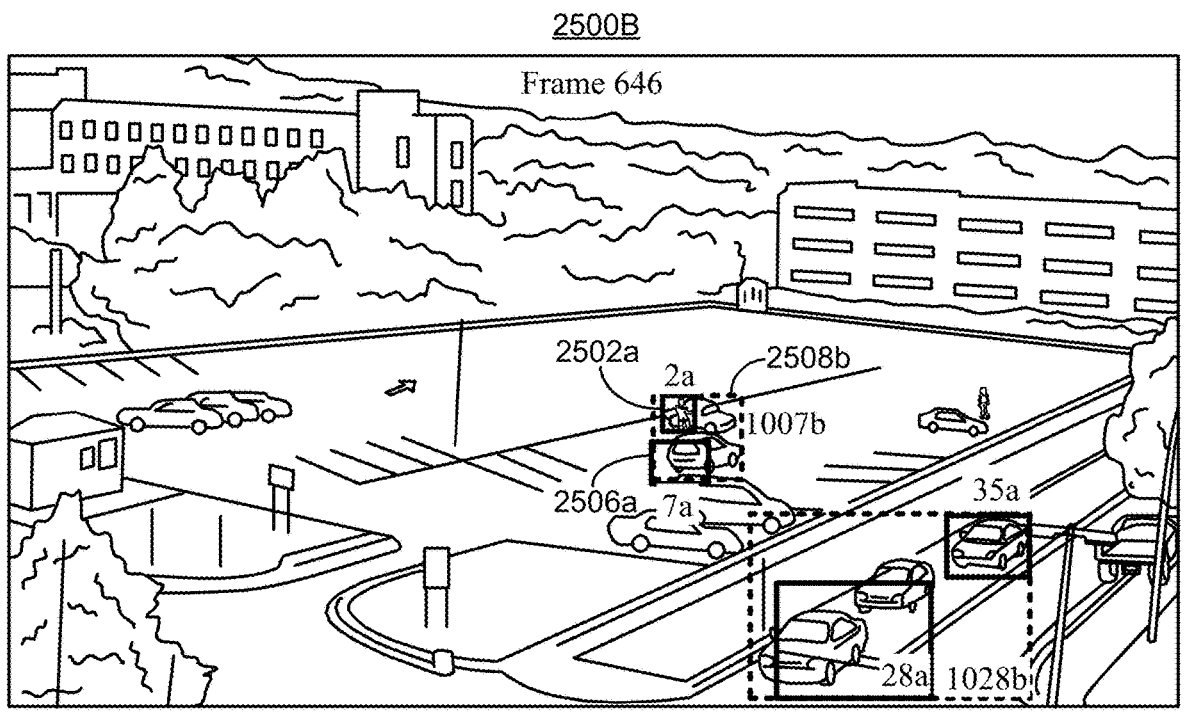

FIG. 25A-FIG. 25B are examples of video frames 2500A (with frame number 579) and 2500B (with frame number 646) of an environment in which objects are detected and tracked, illustrating that the proposed shape adaptation blob splitting techniques can split merged objects even in complicated scenarios when objects are small. As shown in frame 2500A, a truck is tracked using bounding box 2506a labeled with tracker ID 7a and bounding box 2508b with tracker ID 1007b. A person is tracked using bounding box 2502a with tracker ID 2a and bounding box 2504b with tracker ID 1002b. The tracker bounding boxes 2506a and 2508b, and the tracker bounding boxes 2502a and 2504b, are the same in frame 2500A. In frame 2500B, however, using the anchor method, the truck and the person are merged together several frames later and are both tracked using the single tracker bounding box 2508b with tracker ID 1007b. Using the shape adaptation systems and methods described herein, the truck and the person can be separately tracked (as shown in FIG. 25B by the continued tracking of the truck by the bounding box 2506a with tracker ID 7a and continued tracking of the person by the bounding box 2502a with tracker ID 2a).

Figure 26:
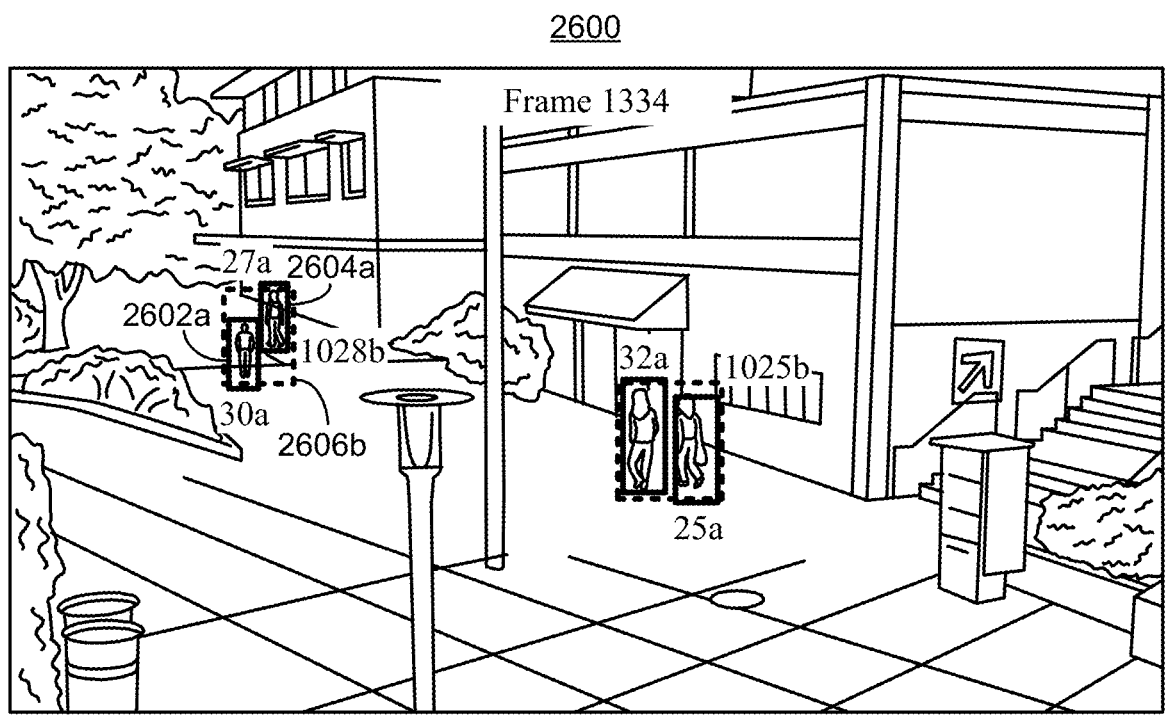
FIG. 26 is an illustration of a video frame of an environment in which objects are detected, in accordance with some examples.

FIG. 26 is another example of a video frame 2600A (with frame number 1334) of an environment in which objects are detected and tracked. The person tracked with shape-adapted bounding box 2602a and the person tracked with shape-adapted bounding box 2604a are close together. Because the two people are close together, the initial bounding boxes (that are not shape adjusted) associated with the merged blob containing the people are largely overlapping with one another, which causes a single tracker 2606b with tracker ID 1028b to track both people when the anchor method is used. When the shape adaptation is performed when splitting the merged objects, the two people are separately tracked with bounding box 2602a having tracker ID 30a and bounding box 2604a having tracker ID 27a. For example, by adapting the shapes of the bounding boxes 2602a and 2064a to conform to the blobs representing the people, the bounding boxes have less overlap and are able to separately track the people.

Figure 27:
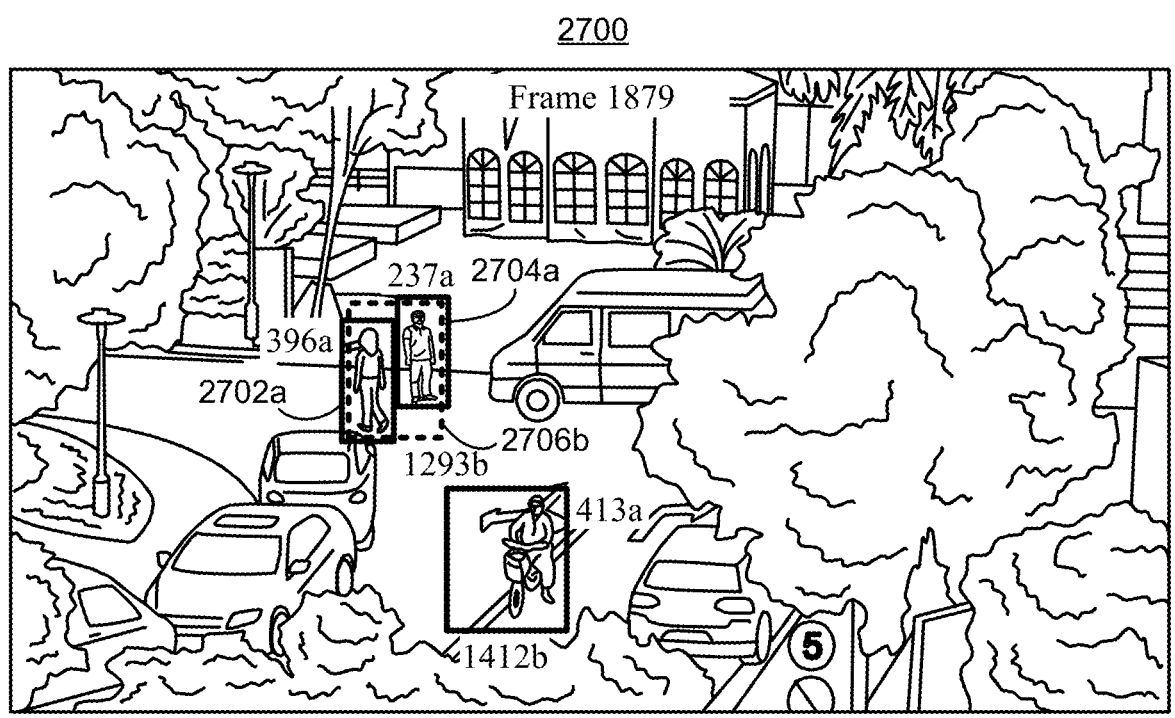
FIG. 27 is an illustration of a video frame of an environment in which objects are detected, in accordance with some examples.

FIG. 27 is another example of a video frame 2700A (with frame number 1879) of an environment in which objects are detected and tracked, illustrating a similar scenario as that shown in the frame 2600A of FIG. 26. The person tracked with shape-adapted bounding box 2702a and the person tracked with shape-adapted bounding box 2704a are close together, causing a single tracker 2706b with tracker ID 1293b to track both people when the anchor method is used. For example, because the two people are close together, the initial bounding boxes (that are not shape adjusted) associated with the merged blob containing the people are largely overlapping with one another when the boxes are not shape-adjusted. When the shape adaptation is performed when splitting the merged objects, the two people are separately tracked with bounding box 2702a having tracker ID 396a and bounding box 2704a having tracker ID 237a.

Examples are shown in FIG. 28A-FIG. 30 comparing video sequences for which the shape adaptation process is applied to video sequences for which a simple blob splitting technique is applied (e.g., using the blob splitting process performed by blob splitting system 620 without using shape adaptation or AMO). The results of the proposed systems and methods and the results of the simple blob splitting technique are overlaid together, with bounding boxes with labels ending with an "a" showing results of the proposed shape adaptation systems and methods and bounding boxes with labels ending with a "b" showing results of the simple blob splitting technique.

Figure 28A:
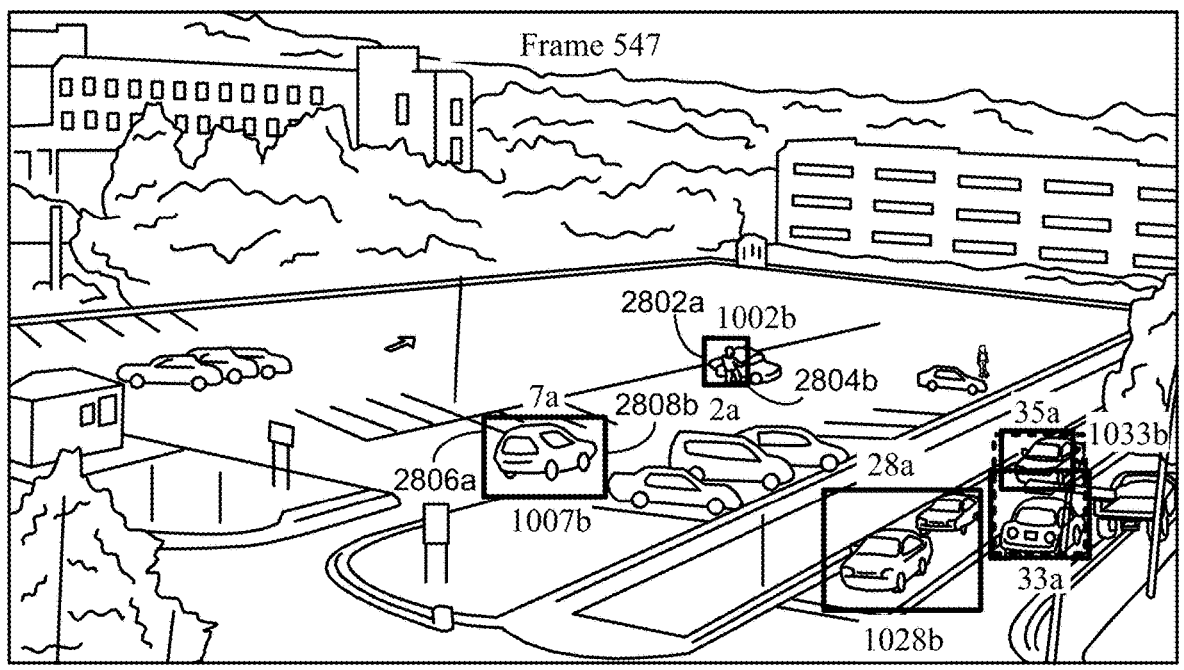
FIG. 28A and FIG. 28B are illustrations of video frames of an environment in which objects are detected, in accordance with some examples.
Figure 28B:
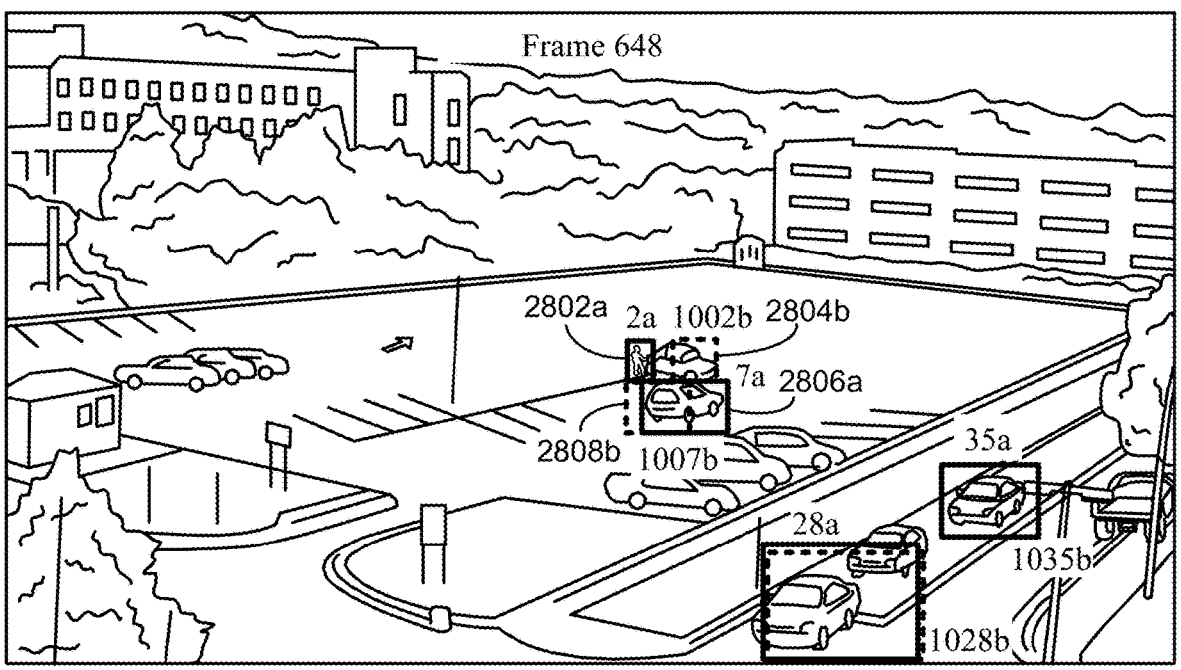

FIG. 28A-FIG. 28B are examples of video frames 2800A (with frame number 547) and 2800B (with frame number 648) of an environment in which objects are detected and tracked. As shown in frame 2800A, a truck is tracked using bounding box 2806a labeled with tracker ID 7a and bounding box 2808b with tracker ID 1007b. A person is tracked using bounding box 2802a with tracker ID 2a and bounding box 2804b with tracker ID 1002b. The tracker bounding boxes 2806a and 2808b, and the tracker bounding boxes 2802a and 2804b, are the same in frame 2800A. In frame 2800B, however, using the anchor method, the tracker 2804b (ID 1002b) that was tracking the person is now tracking a car instead of the person, and the tracker 2808b (ID 1007b) that was tracking the truck is offset from the center of the truck. Using the shape adaptation systems and methods described herein, the car and the person can be more accurately tracked. For example, as shown in FIG. 28B, the bounding box 2806a with tracker ID 7a is centered on the truck. Further, the bounding box 2802a with tracker ID 2a accurately tracks the person.

Figure 29:
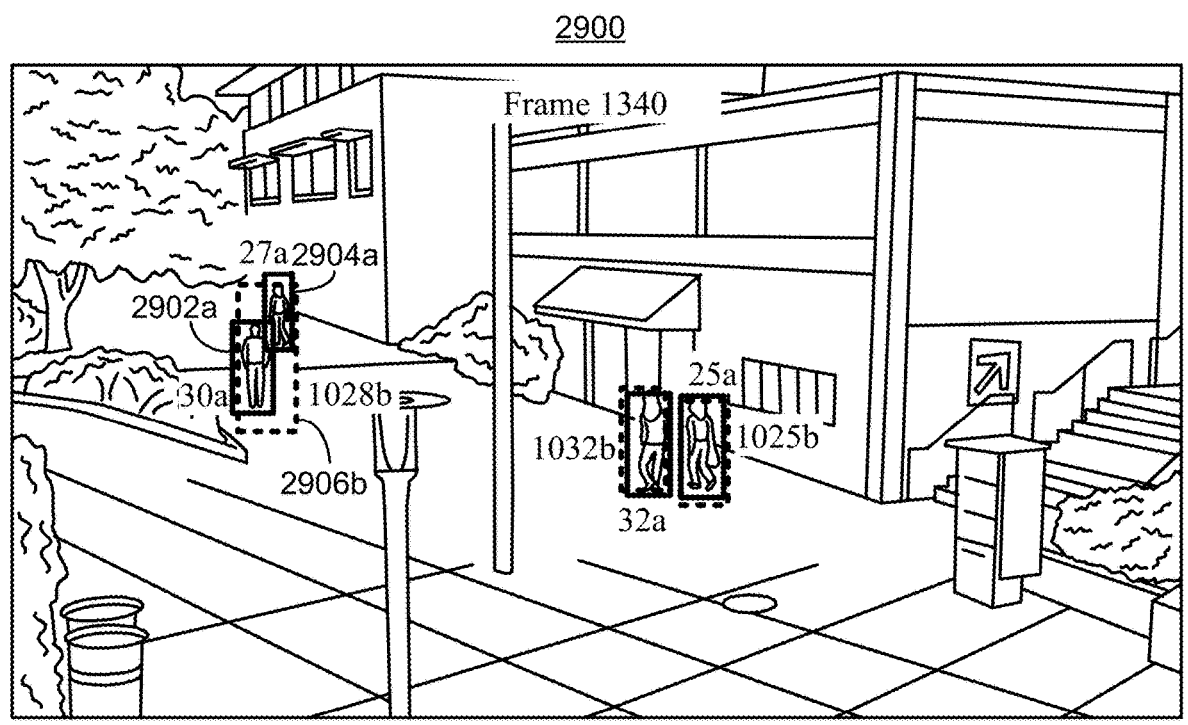
FIG. 29 is an illustration of a video frame of an environment in which objects are detected, in accordance with some examples.

FIG. 29 is another example of a video frame 2900A (with frame number 1340) of an environment in which objects are detected and tracked. The person tracked with shape-adapted bounding box 2902a and the person tracked with shape-adapted bounding box 2904a are close together. Because the two people are close together, the initial bounding boxes (that are not shape adjusted) associated with the merged blob containing the people are largely overlapping with one another. The large amount of overlap causes a single tracker 2906b with tracker ID 1028b to track both people when the anchor method is used. When the shape adaptation blob splitting is performed to split the merged objects, the two people are separately tracked with bounding box 2902a having tracker ID 30a and bounding box 2904a having tracker ID 27a. For example, by adapting the shapes of the bounding boxes 2902a and 2064a to conform to the blobs representing the people, the bounding boxes have less overlap and are able to separately track the people.

Figure 30:
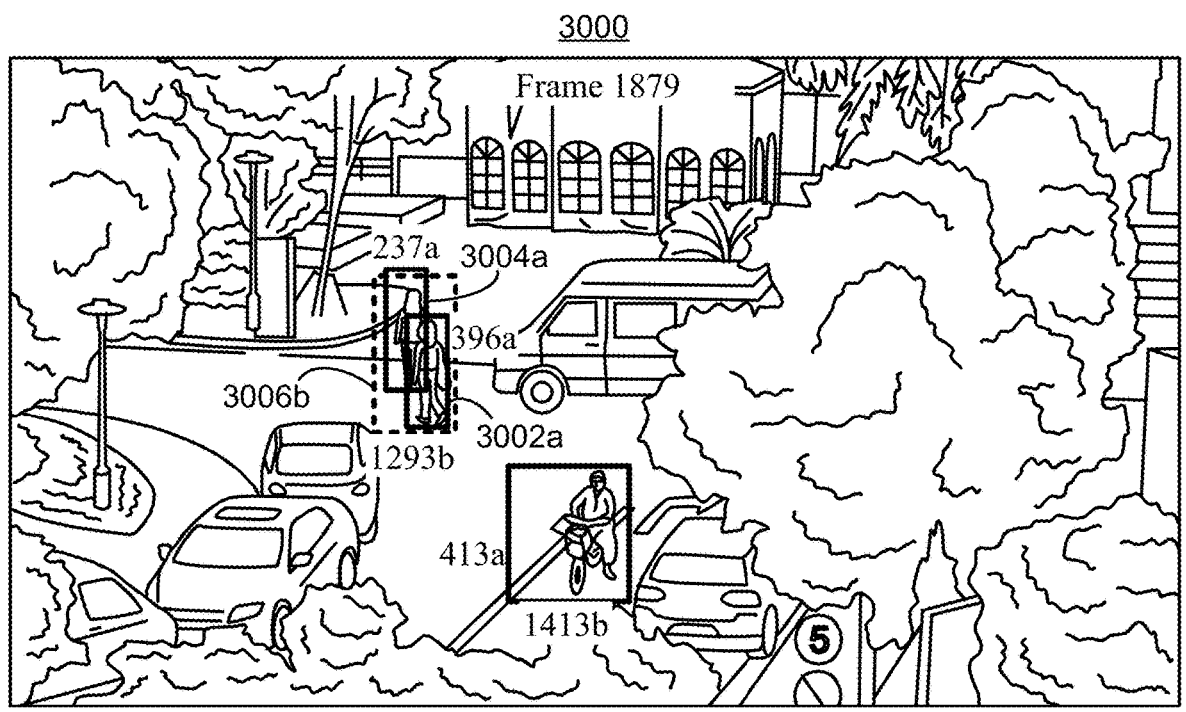
FIG. 30 is an illustration of a video frame of an environment in which objects are detected, in accordance with some examples.

FIG. 30 is another example of a video frame 3000A (with frame number 1879) of an environment in which objects are detected and tracked, illustrating a similar scenario as that shown in the frame 2900A of FIG. 29. The person tracked with shape-adapted bounding box 3002a and the person tracked with shape-adapted bounding box 3004a are close together, causing a single tracker 3006b with tracker ID 1293b to track both people when the anchor method is used. For example, because the two people are close together, the initial bounding boxes (that are not shape adapted) associated with the merged blob containing the people are largely overlapping with one another when the boxes are not shape-adjusted. When the shape adaptation is performed when splitting the merged objects, the two people are separately tracked with bounding box 3002a having tracker ID 396a and bounding box 3004a having tracker ID 237a.

The blob detection and tracking operations discussed herein may be implemented using compressed video or using uncompressed video frames (before or after compression). An example video encoding and decoding system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of splitting one or more merged blobs for one or more video frames, the method comprising:
    identifying a merged blob detected for a current video frame, wherein the merged blob includes pixels of at least a portion of at least two foreground objects in the current video frame;
    associating the merged blob with a first blob tracker and a second blob tracker, wherein the first blob tracker includes a first bounding region and the second blob tracker includes a second bounding region;
    adjusting a shape of the first blob tracker, wherein adjusting the shape of the first blob tracker includes shifting at least one boundary of the first bounding region relative to a boundary of the merged blob to generate an adjusted first bounding region;
    splitting the merged blob into a first blob and a second blob, the first blob being contained within the adjusted first bounding region and the second blob being contained within the second bounding region; and
    outputting the first blob and the second blob obtained from splitting the merged blob, for object tracking for the current video frame.

2. The method of claim 1, wherein shifting the at least one boundary of the first bounding region includes:
    shifting the at least one boundary of the first bounding region towards a center of the first bounding region, wherein the at least one boundary is shifted until the at least one boundary intersects with a foreground pixel of the merged blob.

3. The method of claim 1, wherein shifting the at least one boundary of the first bounding region includes:
    performing a first shape adjustment by shifting at least one boundary pair of the first blob tracker towards a center of the first bounding region, the at least one boundary pair including the at least one boundary, wherein the at least one boundary pair is shifted until one or more boundaries of the at least one boundary pair intersect with a foreground pixel of the merged blob.

4. The method of claim 3, further comprising:
    maintaining a list of historical merge groups, the historical merge groups including associations between merged blobs and blob trackers associated with the merged blobs across one or more previous video frames;
    searching the maintained list of historical merge groups to identify a historical merge group that corresponds to a preliminary association of the merged blob, the preliminary association including at least the first bounding region associated with the merged blob and the second bounding region associated with the merged blob; and
    performing the first shape adjustment when a historical merge group corresponding to the preliminary association of the merged blob is not identified.

5. The method of claim 3, wherein the at least one boundary pair of the first blob tracker includes at least one or more of a left boundary and a right boundary of the first bounding region or a top boundary and a bottom boundary of the first bounding region.

6. The method of claim 3, further comprising:
    determining, before the shape of the first blob tracker is adjusted, a first boundary and a second boundary of the at least one boundary pair do not intersect with any foreground pixel of the merged blob; and
    wherein shifting the at least one boundary pair includes shifting the first boundary and the second boundary towards the center of the first bounding region when the first boundary and the second boundary do not intersect with any foreground pixel of the merged blob before the shape of the first blob tracker is adjusted.

7. The method of claim 3, further comprising:
    determining, before the shape of the first blob tracker is adjusted, a first boundary of the at least one boundary pair intersects with a foreground pixel of the merged blob;
    determining, before the shape of the first blob tracker is adjusted, a second boundary of the at least one boundary pair does not intersect with any foreground pixel of the merged blob; and
    wherein shifting the at least one boundary pair includes shifting the second boundary towards the center of the first bounding region when the first boundary intersects with the foreground pixel and the second boundary does not intersect with any foreground pixel of the merged blob before the shape of the first blob tracker is adjusted.

8. The method of claim 1, wherein adjusting the shape associated with the merged blob further includes:
    performing a second shape adjustment by individually shifting each boundary of the first bounding region towards the center of the first bounding region, wherein each boundary is shifted until each boundary intersects with a foreground pixel of the merged blob.

9. The method of claim 8, further comprising:
    determining the shape of the first blob tracker was adjusted in a previous video frame, the previous video frame being obtained earlier in time than the current video frame; and
    performing the second shape adjustment when the shape of the first blob tracker was adjusted in the previous video frame.

10. The method of claim 8, further comprising:
    determining a size of the first bounding region is less than a size threshold; and
    performing the second shape adjustment when the size of the first bounding region is less than the size threshold.

11. The method of claim 8, further comprising:
determining a size ratio, the size ratio including a size of the first bounding region over a size of a bounding region of the merged blob;
determining the size ratio is less than a size ratio threshold; and
performing the second shape adjustment when the size ratio is less than the size ratio threshold.

12. The method of claim 8, further comprising:
determining a size of the first bounding region is less than a size threshold;
determining a size ratio, the size ratio including a size of the first bounding region over a size of a bounding region of the merged blob;
determining the size ratio is less than a size ratio threshold; and
performing the second shape adjustment when the size of the first bounding region is less than the size threshold and when the size ratio is less than the size ratio threshold.

13. The method of claim 1, further comprising:
obtaining a background-foreground mask for the current frame, the background-foreground mask including a first value assigned to background pixels of the current frame and a second value assigned to foreground pixels of the current frame; and
modifying the background-foreground mask by assigning a common value to each foreground pixel of the merged blob, wherein the common value is different than the first value and the second value.

14. The method of claim 13, wherein shifting the at least one boundary of the first bounding region includes:
shifting the at least one boundary of the first bounding region towards a center of the first bounding region, wherein the at least one boundary is shifted until the at least one boundary intersects with a foreground pixel having the common value.

15. The method of claim 1, wherein associating the merged blob with the first blob tracker and the second blob tracker includes:
determining an intersection region between the first bounding region and a bounding region of the merged blob;
determining a size ratio, the size ratio including a size of the intersection region over a size of the bounding region of the merged blob;
determining the size ratio is greater than a minimum size ratio; and
determining the first blob tracker is associated with the merged blob when the size ratio is greater than the minimum size ratio.

16. The method of claim 15, further comprising:
re-associating the merged blob with the first blob tracker and the second blob tracker after the shape of the first blob tracker is adjusted, wherein the re-association is performed using a second size ratio that is less than the size ratio.

17. An apparatus for splitting one or more merged blobs for one or more video frames, comprising:
a memory configured to store video data associated with one or more video frames; and
a processor configured to:
identify a merged blob detected for a current video frame, wherein the merged blob includes pixels of at least a portion of at least two foreground objects in the current video frame;
associate the merged blob with a first blob tracker and a second blob tracker, wherein the first blob tracker includes a first bounding region and the second blob tracker includes a second bounding region;
adjust a shape of the first blob tracker, wherein adjusting the shape of the first blob tracker includes shifting at least one boundary of the first bounding region relative to a boundary of the merged blob to generate an adjusted first bounding region;
split the merged blob into a first blob and a second blob, the first blob being contained within the adjusted first bounding region and the second blob being contained within the second bounding region; and
output the first blob and the second blob obtained from splitting the merged blob, for object tracking for the current video frame.

18. The apparatus of claim 17, wherein adjusting the shape of the first blob tracker includes:
shifting the at least one boundary of the first bounding region towards a center of the first bounding region, wherein the at least one boundary is shifted until the at least one boundary intersects with a foreground pixel of the merged blob.

19. The apparatus of claim 17, wherein adjusting the shape of the first blob tracker includes:
performing a first shape adjustment by shifting at least one boundary pair of the first blob tracker towards a center of the first bounding region, the at least one boundary pair including the at least one boundary, wherein the at least one boundary pair is shifted until one or more boundaries of the at least one boundary pair intersect with a foreground pixel of the merged blob.

20. The apparatus of claim 19, wherein the processor is further configured to:
maintain a list of historical merge groups, the historical merge groups including associations between merged blobs and blob trackers associated with the merged blobs across one or more previous video frames;
search the maintained list of historical merge groups to identify a historical merge group that corresponds to a preliminary association of the merged blob, the preliminary association including at least the first bounding region associated with the merged blob and the second bounding region associated with the merged blob; and
perform the first shape adjustment when a historical merge group corresponding to the preliminary association of the merged blob is not identified.

21. The apparatus of claim 19, wherein the processor is further configured to:
determine, before the shape of the first blob tracker is adjusted, a first boundary and a second boundary of the at least one boundary pair do not intersect with any foreground pixel of the merged blob; and
wherein shifting the at least one boundary pair includes shifting the first boundary and the second boundary towards the center of the first bounding region when the first boundary and the second boundary do not intersect with any foreground pixel of the merged blob before the shape of the first blob tracker is adjusted.

22. The apparatus of claim 19, wherein the processor is further configured to:
determine, before the shape of the first blob tracker is adjusted, a first boundary of the at least one boundary pair intersects with a foreground pixel of the merged blob;

determine, before the shape of the first blob tracker is adjusted, a second boundary of the at least one boundary pair does not intersect with any foreground pixel of the merged blob; and wherein shifting the at least one boundary pair includes shifting the second boundary towards the center of the first bounding region when the first boundary intersects with the foreground pixel and the second boundary does not intersect with any foreground pixel of the merged blob before the shape of the first blob tracker is adjusted.

23. The apparatus of claim 17, wherein adjusting the shape associated with the merged blob further includes:

performing a second shape adjustment by individually shifting each boundary of the first bounding region towards the center of the first bounding region, wherein each boundary is shifted until each boundary intersects with a foreground pixel of the merged blob.

24. The apparatus of claim 23, wherein the processor is further configured to:

determine the shape of the first blob tracker was adjusted in a previous video frame, the previous video frame being obtained earlier in time than the current video frame; and perform the second shape adjustment when the shape of the first blob tracker was adjusted in a previous video frame.

25. The apparatus of claim 23, wherein the processor is further configured to:

determine a size of the first bounding region is less than a size threshold; and perform the second shape adjustment when the size of the first bounding region is less than the size threshold.

26. The apparatus of claim 23, wherein the processor is further configured to:

determine a size ratio, the size ratio including a size of the first bounding region over a size of a bounding region of the merged blob;

determine the size ratio is less than a size ratio threshold; and perform the second shape adjustment when the size ratio is less than the size ratio threshold.

27. The apparatus of claim 23, wherein the processor is further configured to:

determine a size of the first bounding region is less than a size threshold;

determine a size ratio, the size ratio including a size of the first bounding region over a size of a bounding region of the merged blob;

determine the size ratio is less than a size ratio threshold; and perform the second shape adjustment when the size of the first bounding region is less than the size threshold and when the size ratio is less than the size ratio threshold.

28. The apparatus of claim 17, wherein the processor is further configured to:

obtain a background-foreground mask for the current frame, the background-foreground mask including a first value assigned to background pixels of the current frame and a second value assigned to foreground pixels of the current frame; and modify the background-foreground mask by assigning a common value to each foreground pixel of the merged blob, wherein the common value is different than the first value and the second value.

29. The apparatus of claim 28, wherein adjusting the shape of the first blob tracker includes:

shifting the at least one boundary of the first bounding region towards a center of the first bounding region, wherein the at least one boundary is shifted until the at least one boundary intersects with a foreground pixel having the common value.

30. A non-transitory computer-readable medium having stored thereon instructions that, when executed by one or more processors, cause the one or more processor to:

identify a merged blob detected for a current video frame, wherein the merged blob includes pixels of at least a portion of at least two foreground objects in the current video frame;

associate the merged blob with a first blob tracker and a second blob tracker, wherein the first blob tracker includes a first bounding region and the second blob tracker includes a second bounding region;

adjust a shape of the first blob tracker, wherein adjusting the shape of the first blob tracker includes shifting at least one boundary of the first bounding region relative to a boundary of the merged blob to generate an adjusted first bounding region;

split the merged blob into a first blob and a second blob, the first blob being contained within the adjusted first bounding region and the second blob being contained within the second bounding region; and output the first blob and the second blob obtained from splitting the merged blob, for object tracking for the current video frame.

\* \* \* \* \*